United States Patent
Aydar et al.

(10) Patent No.: US 8,117,130 B2
(45) Date of Patent: Feb. 14, 2012

(54) BATCH LOADING AND SELF-REGISTRATION OF DIGITAL MEDIA FILES

(75) Inventors: Ali Aydar, San Francisco, CA (US); Jordan Mendelson, San Francisco, CA (US); Shawn Fanning, San Francisco, CA (US)

(73) Assignee: Stragent, LLC, Longview, TX (US)

( * ) Notice: Subject to any disclaimer, the term of this patent is extended or adjusted under 35 U.S.C. 154(b) by 132 days.

(21) Appl. No.: 11/314,732

(22) Filed: Dec. 20, 2005

(65) Prior Publication Data

US 2006/0167803 A1    Jul. 27, 2006

Related U.S. Application Data

(63) Continuation-in-part of application No. 10/547,171, filed as application No. PCT/US2004/005517 on Feb. 24, 2004.

(60) Provisional application No. 60/638,009, filed on Dec. 20, 2004, provisional application No. 60/450,015, filed on Feb. 25, 2005.

(51) Int. Cl.
  *G11B 20/00* (2006.01)
  *G06F 12/14* (2006.01)
(52) U.S. Cl. ............................. 705/59; 726/26
(58) Field of Classification Search .................. 709/200; 370/392
  See application file for complete search history.

(56) References Cited

U.S. PATENT DOCUMENTS

| | | | |
|---|---|---|---|
| 5,491,795 A * | 2/1996 | Beaudet et al. ............... | 715/804 |
| 5,502,766 A | 3/1996 | Boebert et al. | |
| 5,590,319 A * | 12/1996 | Cohen et al. ........................... | 1/1 |
| 5,629,980 A | 5/1997 | Stefik et al. | |
| 5,717,925 A * | 2/1998 | Harper et al. ......................... | 1/1 |
| 5,721,911 A * | 2/1998 | Ha et al. ................................. | 1/1 |
| 5,765,152 A | 6/1998 | Erickson | |
| 5,790,935 A | 8/1998 | Payton | |
| 5,857,203 A * | 1/1999 | Kauffman et al. .................... | 1/1 |
| 5,862,260 A | 1/1999 | Rhoads | |
| 5,862,325 A * | 1/1999 | Reed et al. ................... | 709/201 |
| 5,892,900 A | 4/1999 | Ginter et al. | |
| 5,903,892 A | 5/1999 | Hoffert et al. ................... | 707/10 |
| 5,924,090 A * | 7/1999 | Krellenstein ......................... | 1/1 |

(Continued)

FOREIGN PATENT DOCUMENTS

EP    0808048    11/1997

(Continued)

OTHER PUBLICATIONS

Definition of Commercialize, obtained from the internet at. http://www.thefreedictionary.com/commercialize, 1 pg.

(Continued)

*Primary Examiner* — Evens J Augustin
(74) *Attorney, Agent, or Firm* — The Caldwell Firm, LLC; Patrick E. Caldwell, Esq.

(57) ABSTRACT

Methods and apparatus for batch loading and self-registration of digital media files is provided. The system provides numerous methods of interfacing with a content outlet. The methods further include comparing attributes of content to be downloaded with attributes of content in a media database. The methods also includes providing restrictions based on a result of the comparing. The methods further include monetizing the methods between both retailers and right-holders using the system. Additionally, the method may include providing retail analysis, resolving disputes, and distributing royalty payments to rights-holders of content.

35 Claims, 45 Drawing Sheets

U.S. PATENT DOCUMENTS

| | | | | |
|---|---|---|---|---|
| 5,956,482 | A | 9/1999 | Agraharam et al. | |
| 5,990,884 | A | 11/1999 | Douma et al. | |
| 6,028,605 | A * | 2/2000 | Conrad et al. | 715/840 |
| 6,041,411 | A | 3/2000 | Wyatt | |
| 6,055,543 | A * | 4/2000 | Christensen et al. | 1/1 |
| 6,061,692 | A * | 5/2000 | Thomas et al. | 707/613 |
| 6,122,641 | A * | 9/2000 | Williamson et al. | 707/793 |
| 6,131,100 | A * | 10/2000 | Zellweger | 1/1 |
| 6,144,726 | A | 11/2000 | Cross | 379/114.03 |
| 6,163,781 | A * | 12/2000 | Wess, Jr. | 1/1 |
| 6,199,059 | B1 * | 3/2001 | Dahan et al. | 1/1 |
| 6,212,524 | B1 * | 4/2001 | Weissman et al. | 707/600 |
| 6,226,618 | B1 | 5/2001 | Downs et al. | |
| 6,233,682 | B1 | 5/2001 | Fritsch | 713/168 |
| 6,236,971 | B1 | 5/2001 | Stefik et al. | 705/1 |
| 6,240,407 | B1 * | 5/2001 | Chang et al. | 707/711 |
| 6,256,031 | B1 * | 7/2001 | Meijer et al. | 715/854 |
| 6,263,341 | B1 * | 7/2001 | Smiley | 707/812 |
| 6,269,394 | B1 * | 7/2001 | Kenner et al. | 709/217 |
| 6,282,548 | B1 * | 8/2001 | Burner et al. | 1/1 |
| 6,311,194 | B1 * | 10/2001 | Sheth et al. | 715/236 |
| 6,363,377 | B1 * | 3/2002 | Kravets et al. | 1/1 |
| 6,374,260 | B1 | 4/2002 | Hoffert et al. | 707/104.1 |
| 6,389,426 | B1 * | 5/2002 | Turnbull et al. | 707/661 |
| 6,405,215 | B1 * | 6/2002 | Yaung | 1/1 |
| 6,430,575 | B1 * | 8/2002 | Dourish et al. | 1/1 |
| 6,449,341 | B1 * | 9/2002 | Adams et al. | 379/9 |
| 6,546,114 | B1 | 4/2003 | Venkatesan et al. | 382/100 |
| 6,574,348 | B1 | 6/2003 | Venkatesan et al. | 382/100 |
| 6,598,164 | B1 | 7/2003 | Shepard | |
| 6,658,568 | B1 | 12/2003 | Ginter et al. | 713/193 |
| 6,760,721 | B1 * | 7/2004 | Chasen et al. | 1/1 |
| 6,763,148 | B1 | 7/2004 | Sternberg et al. | |
| 6,772,225 | B1 | 8/2004 | Jennings, III et al. | |
| 6,832,239 | B1 | 12/2004 | Kraft et al. | |
| 6,871,200 | B2 | 3/2005 | MacQueen et al. | |
| 6,895,392 | B2 | 5/2005 | Stefik et al. | |
| 6,941,324 | B2 * | 9/2005 | Plastina et al. | 1/1 |
| 6,947,947 | B2 * | 9/2005 | Block et al. | 1/1 |
| 6,959,326 | B1 * | 10/2005 | Day et al. | 709/217 |
| 6,968,366 | B1 | 11/2005 | Zhang et al. | 709/219 |
| 6,990,656 | B2 * | 1/2006 | Ersek et al. | 717/121 |
| 6,993,748 | B2 * | 1/2006 | Schaefer | 717/124 |
| 7,020,704 | B1 | 3/2006 | Lipscomb et al. | |
| 7,043,477 | B2 * | 5/2006 | Mercer et al. | 1/1 |
| 7,043,479 | B2 * | 5/2006 | Ireton | 1/1 |
| 7,092,953 | B1 | 8/2006 | Heynes | 707/100 |
| 7,110,984 | B1 | 9/2006 | Spagna et al. | |
| 7,200,575 | B2 | 4/2007 | Hans et al. | 705/59 |
| 7,363,278 | B2 | 4/2008 | Schmelzer et al. | 705/67 |
| 2001/0037319 | A1 | 11/2001 | Edwards et al. | |
| 2002/0002541 | A1 | 1/2002 | Williams | |
| 2002/0010679 | A1 | 1/2002 | Felsher | |
| 2002/0010759 | A1 | 1/2002 | Hitson et al. | 709/219 |
| 2002/0042706 | A1 | 4/2002 | Rodriguez | 703/22 |
| 2002/0049910 | A1 | 4/2002 | Salomon et al. | |
| 2002/0114522 | A1 | 8/2002 | Seeber | 382/218 |
| 2002/0143791 | A1 * | 10/2002 | Levanon et al. | 707/200 |
| 2002/0143819 | A1 | 10/2002 | Han et al. | |
| 2002/0169694 | A1 | 11/2002 | Stone et al. | |
| 2003/0028896 | A1 | 2/2003 | Swart et al. | |
| 2003/0031176 | A1 * | 2/2003 | Sim | 370/392 |
| 2003/0074322 | A1 | 4/2003 | Wu | 705/57 |
| 2003/0080999 | A1 | 5/2003 | Stone et al. | |
| 2003/0093790 | A1 | 5/2003 | Logan et al. | |
| 2003/0105739 | A1 | 6/2003 | Essafi et al. | 707/1 |
| 2003/0110126 | A1 | 6/2003 | Dunkeld et al. | 705/39 |
| 2004/0052378 | A1 | 3/2004 | Shiragami et al. | |
| 2004/0059938 | A1 * | 3/2004 | Hughes et al. | 713/200 |
| 2004/0093278 | A1 | 5/2004 | Burchetta | |
| 2004/0133927 | A1 | 7/2004 | Sternberg et al. | 725/136 |
| 2004/0148191 | A1 | 7/2004 | Hoke, Jr. | |
| 2005/0004873 | A1 | 1/2005 | Pou et al. | |
| 2005/0004875 | A1 | 1/2005 | Kontio et al. | |
| 2005/0021398 | A1 | 1/2005 | McCleskey et al. | |
| 2005/0042983 | A1 | 2/2005 | Borgward | 455/3.06 |
| 2005/0080692 | A1 | 4/2005 | Padam et al. | 705/30 |
| 2005/0102260 | A1 | 5/2005 | Spring et al. | 707/1 |
| 2005/0119976 | A1 | 6/2005 | Taylor et al. | |
| 2005/0125359 | A1 | 6/2005 | Levin et al. | |
| 2005/0171932 | A1 | 8/2005 | Nandhra | 707/3 |
| 2006/0167803 | A1 | 7/2006 | Aydar et al. | |
| 2006/0167804 | A1 | 7/2006 | Aydar et al. | |
| 2006/0167807 | A1 | 7/2006 | Aydar et al. | |
| 2006/0167813 | A1 | 7/2006 | Aydar et al. | |
| 2006/0167881 | A1 | 7/2006 | Aydar et al. | |
| 2006/0167882 | A1 | 7/2006 | Aydar et al. | |
| 2006/0212403 | A1 | 9/2006 | Fanning et al. | 705/52 |
| 2007/0038574 | A1 | 2/2007 | Fanning et al. | 705/59 |
| 2007/0078769 | A1 | 4/2007 | Way | |
| 2007/0118792 | A1 | 5/2007 | O'Donnell | 705/14 |
| 2007/0192194 | A1 | 8/2007 | O'Donnell | 705/14 |
| 2007/0203841 | A1 | 8/2007 | Maes | |
| 2010/0042652 | A1 | 2/2010 | O'Donnell | 705/51 |

FOREIGN PATENT DOCUMENTS

| | | | |
|---|---|---|---|
| EP | 0808048 A2 | 11/1997 | |
| EP | 0808048 A3 | 9/2002 | |
| JP | 2004/813421 | 4/2004 | |
| WO | WO02077847 | 10/2002 | |
| WO | WO02103968 | 12/2002 | |
| WO | WO 2004/077265 | 9/2004 | 713/200 |
| WO | WO2006/069046 | 6/2006 | 705/57 |
| WO | WO2006/069161 | 6/2006 | 713/200 |
| WO | WO2006/069225 | 6/2006 | 726/27 |
| WO | WO2006/069226 | 6/2006 | 713/200 |
| WO | WO2006/069391 | 6/2006 | 713/200 |
| WO | WO2006/069394 | 6/2006 | 705/59 |

OTHER PUBLICATIONS

Muller, Desktop Encyclopedia of the Internet,: 1999, Artech House Inc., Norwood, MA 51 pages.

White, "How Computers Work," Millennium Edition, 1999, Que Corporation, Indianapolis, IN 83 pages.

Derfier, "How Networks Work," Bestseller Edition, 1996, Ziff-Davis Press, Emeryville, CA, 69 pages.

Grailia, "How the Internet Works," Millennium Edition, 1999, Que Corporation, Indianapolis, IN, 35 pages.

International Search Report and Written Opinion for PCT/US2004/005517 mailed on Sep. 17, 2007.

International Search Report and Written Opinion for PCT/US2005/047618 mailed onOct. 23, 2007.

International Search Report and Written Opinion for PCT/US2005/046553 mailed on Jan. 29, 2007.

International Search Report and Written Opinion for PCT/US2005/046094 mailed on Feb. 8, 2007.

International Search Report and Written Opinion for PCT/US2005/046552 mailed on Apr. 23, 2007.

International Search Report and Written Opinion for PCT/US2005/046396 mailed on Mar. 20, 2007.

International Search Report and Written Opinion for PCT/US2005/047626 mailed on May 10, 2007.

Office Action Summary for U.S. Appl. No. 11/314,168 dated Jun. 8, 2009.

Office Action Summary for U.S. Appl. No. 11/314,167 dated Jan. 14, 2010.

Office Action Summary for U.S. Appl. No. 11/314,167 dated Apr. 2, 2009.

Office Action Summary for U.S. Appl. No. 11/314,753 dated Jun. 12, 2009.

Office Action Summary for U.S. Appl. No. 11/314,749 dated Mar. 29, 2010.

Office Action Summary for U.S. Appl. No. 10/547,171 dated Jul. 13, 2010.

Office Action Summary for U.S. Appl. No. 10/547,171 dated Mar. 5, 2009.

Office Action Summary for U.S. Appl. No. 10/547,171 dated Oct. 16, 2008.

Office Action Summary for U.S. Appl. No. 10/547,171 dated Dec. 27, 2007.

Office Action Summary for U.S. Appl. No. 11/314,752 dated Aug. 11, 2010.

Office Action Summary for U.S. Appl. No. 11/314,752 dated Apr. 28, 2009.
Office Action Summary for U.S. Appl. No. 11/314,752 dated Aug. 14, 2008.
International Preliminary Report on Patentability from PCT Application No. PCT/US2005/046094 issued on Jun. 26, 2007.
International Written Opinion and Search Report from PCT Application No. PCT/US2005/046094 mailed on Feb. 8, 2007.
International Preliminary Report on Patentability and Written Opinion from PCT Application No. PCT/US2005/047618 issued on Dec. 11, 2007.
Definition of configuration, IEEE 100 The Authoritative Dictionary of IEEE Standards Terms, 7th Edition, IEEE, Inc., New York, NY, Dec. 2000.
Definition of p2p Rodriguez (US 2002/0042706 A1). p. 0025.
Definition of point-to-multipoint connection IEEE 100 The Authoritative Dictionary of IEEE Standards Terms, 7th Edition, IEEE, Inc., New York, NY, Dec. 2000.
Definition of point-to-point communications, IEEE 100 The Authoritative Dictionary of IEEE Standards Terms, 7th Edition, IEEE, Inc., New York, NY, Dec. 2000.
Definition of point-to-point configuration, IEEE 100 The Authoritative Dictionary of IEEE Standards Terms, 7th Edition, IEEE, Inc., New York, NY, Dec. 2000.
Definition of point-to-point connection, IEEE 100 The Authoritative Dictionary of IEEE Standards Terms, 7th Edition, IEEE, Inc., New York, NY, Dec. 2000.
Definition of point-to-point, IEEE 100 The Authoritative Dictionary of IEEE Standards Terms, 7th Edition, IEEE, Inc., New York, NY, Dec. 2000.
Definition of system, Computer Dictionary, 5th Edition, Microsoft Press, Redmond, WA, 2002.
Senior Contributor: JoAnne Woodcock, 1994, Microsoft Press Computer Dictionary, (Second Edition), p. 355.
Office Action Summary from U.S. Appl. No. 10/547,171 which was mailed on Mar. 30, 2011.
Office Action Summary from U.S. Appl. No. 11/314,168 which was mailed on Jan. 13, 2009.
Office Action Summary from U.S. Appl. No. 11/314,168 which was mailed on May 18, 2011.
Office Action Summary from U.S. Appl. No. 11/314,749 which was mailed on Dec. 28, 2010.
Office Action Summary from U.S. Appl. No. 11/314,749 which was mailed on Jun. 1, 2009.
Office Action Summary from U.S. Appl. No. 11/314,752 which was mailed on Jul. 9, 2008.
Office Action Summary from U.S. Appl. No. 11/314,753 which was mailed on Jan. 7, 2009.
Office Action Summary from U.S. Appl. No. 11/434,409 which was mailed on Oct. 7, 2010.
Office Action Summary from U.S. Appl. No. 11/434,409 which was mailed on Dec. 29, 2009.
Office Action Summary from U.S. Appl. No. 11/434,409 which was mailed on Apr. 29, 2011.
Office Action Summary from U.S. Appl. No. 11/434,409 which was mailed on Apr. 6, 2009.
Office Action Summary from U.S. Appl. No. 11/434,409 which was mailed on Jun. 25, 2010.
Office Action Summary from U.S. Appl. No. 11/441,417 which was mailed on Dec. 21, 2006.
Office Action Summary from U.S. Appl. No. 11/441,417 which was mailed on Jun. 13, 2007.
Office Action Summary from U.S. Appl. No. 11/441,417 which was mailed on Jun. 27, 2008.
Office Action Summary from U.S. Appl. No. 11/441,417 which was mailed on Sep. 21, 2007.
International Search Report and Written Opinion from PCT Application No. PCT/US05/46552 which was mailed on Apr. 23, 2007.
PCT Written Opinion and Search Report from application No. PCT/US2005/47626 which was mailed on May 10, 2007.

* cited by examiner

FIG. 26

SNOCAP IDOL Account Manager User Accounts https://idol.snocap.com/account/useraccounts.php IDOL » Account Manager » User Accounts Log Out / Search SNOCAP, Inc.

| Overview | Account Manager | My Catalog | All Works | Use Terms |

Organization Information | User Accounts | Track Categories

User Accounts

| Name | Permissions —466 | Department —468 | Phone —470 | Email —472 |
|---|---|---|---|---|
| Steven, Kelley | Administrator | Server Engineer | +1 (415) 555-1212 | kelley@snocap.com |
| Fletcher, Rick | Regular User | asdf | +1 (123) 123-1321 | rick@snocap.com |
| Guy, Steven | Read Only | King | +1 (123) 123-1231 | steven@snocap.com |
| Hamilton Z, Ralph | Read Only | Slacker | +1 (215) 555-1212 | slacker@slacker.org |
| Williams, Thomas | Administrator | No department specified | +1 (916) 224-2527 | tom@snocap.com |
| Rotman, Alex | Administrator | Buz Dev | +1 (301) 403-3803 | alex@snocap.com |
| Brown, Anthony | Regular User | No department specified | +(123)-123-1231 | tony@snocap.com |
| Test, Another | Regular User | xxxxx | +1 (321) 3213 | asdf@asdf.com |
| User, Test | Regular User | DOO | +1 (321) 3213 | test@snocap.com |
| Villarta, Antonette | Administrator | | +1 (415) 321-1234 | antonette@snocap.com |

©2004 SNOCAP, Inc. All Rights Reserved.

Terms of Use

SNOCAP IDOL My Catalog All Tracks Track Information
https://idol.snocap.com/catalog/track.php?id=470257    Google IDOL » My Catalog » All Tracks » Track Information SNOCAP, Inc.    Log Out / Search

⟨SNOCAP⟩    500

| Overview | Account Manager | My Catalog | All Works | Use Terms |

Track Information | Recording Rights | Composition Rights

502 — Track Information    Edit

Title         Seven Below
Artist        Phish
Duration      08:31
SNOCAP ID Cap A1-56954-FK68BT3880-A Rights Status
                          Royalties 504 — Track Categories
Categories    No categories specified 506 — Applicable Use Terms
No use terms applied 508 — Album Information
No album information available ©2004 SNOCAP, Inc. All Rights Reserved.    Terms of Use

FIG. 30

SNOCAP IDOL All Works PowerMatch Tracks
https://idol.snocap.com/works/
Q▼ Google

⟨⟨SNOCAP⟩⟩ — 510

| Overview | Account Manager | My Catalog | All Works — 512 | Use Terms | | Log Out / Search |

PowerMatch Tracks | Missing Masters | All Tracks

IDOL » All Works » PowerMatch Tracks

SNOCAP, Inc.

PowerMatch Tracks — 514                                    67 Tracks

| Track Title — 516 | Artist — 518 | Popularity — 520 |
|---|---|---|
| Like A Virgin | Madonna | 18 |
| Smooth Criminal | Michael Jackson | 18 |
| WestBound | Jerry Reed | 14 |
| Creep | Radiohead | 14 |
| Stay Away to Heaven | Madonna | 4 |
| Frozen | Madonna | 4 |
| I Didn't Do It | R. Kelly | 4 |
| I Believe I Can Fly | R. Kelly | 4 |
| I Wish | Blues Brothers | 3 |
| Paranoid Android | Radiohead | 3 |
| I'm Really Hot | Alicia Keys | 1 |
| Butterflyz | Alicia Keys | 1 |
| Birds and the Bees | Alicia Keys | 1 |
| Piano And I | Alicia Keys | 1 |
| When the Damn Breaks | Led Zeplin | 1 |

1 2 3 4 5 6

©2004 SNOCAP, Inc. All Rights Reserved.                Terms of Use

FIG. 33

SNOCAP IDOL Search — 558 https://idol.snocap.com/search/ — Google

Log Out / Search
IDOL » Search — 580

| Overview | Account Manager | My Catalog | All Works | Use Terms |

Search [Artist Names] in [All Works] for [missy elliot] [Search] — SNOCAP, Inc.

562 — 564 — 566 — 568

9 Results for "missy elliot" — 574

| Track Title | Artist | Popularity | Recording | Composition |
|---|---|---|---|---|
| I'm Really Hot | Missy Elliot | 74 | ● | ○ |
| I'm Really Hot | Missy Elliot | 62 | ○ | ○ |
| I'm Really Hot | Missy Elliot | 52 | ● | ○ |
| Get Ur Freak On (Duo Maxwell) | Missy Elliot | 26 | ○ | ○ |
| Get Ur Freak On | Missy Elliot | 14 | ● | ○ |
| One Minute Man | Missy Elliot | 11 | ○ | ○ |
| I'm Speachless | Missy Elliot | 4 | ○ | ○ |
| I'm Really Hot | Missy Elliot | 1 | ○ | ○ |
| Let's Do it | Missy Elliot | 1 | ○ | ○ |

576 — 578 — 582

©2004 SNOCAP, Inc. All Rights Reserved.  Terms of Use 560, 570, 572

BATCH LOADING AND SELF-REGISTRATION OF DIGITAL MEDIA FILES

CROSS-REFERENCE TO RELATED APPLICATION

This present application claims priority to Aydar et. Al's Provisional Patent Application No. 60/638,009 entitled DIGITAL RIGHTS MANAGEMENT SYSTEM ARCHITECTURE filed Dec. 20, 2004, the contents of which is incorporated herein by reference. The present application is also a continuation in part of Fanning et al's patent application Ser. No. 10/547,171, filed on Jun. 20, 2006, which application is a 35 U.S.C. §371 application of International Application No. PCT/US2004/005517 filed Feb. 24, 2004 (designating the United States), which in turn claims priority to Fanning et al's Provisional Patent Application No. 60/450, 015, filed Feb. 25, 2003, both of which are incorporated herein by reference.

TECHNICAL FIELD

The present application generally relates to the field of regulating access to content. The present application relates more specifically to regulating downloading and other machine reproductions of digitally stored memory contents based on the rights of the owners of the content.

BACKGROUND OF THE INVENTION

Bootlegging, surreptitious copying and other methods of acquiring content without compensating a rights-holder for content is an old problem. From the advent of movable type (and relatively easy printing) through the introduction of photocopying, technology has made copying and effectively stealing content easier and easier. The march of technology has recently caught audio and video content in its wake, particularly with the rise of the Internet.

However, this latest technology is based on digital representations of contents in memory, which can also incorporate various forms of copy protection and can allow for monitoring of transactions. Peer-to-peer networks and centralized content outlets presently exist. Exemplary of peer-to-peer content outlets are Gnutella™ and Kazaa™. Exemplary of centralized content outlets are iTunes™, Audible.com™ and the defunct Napster™. Such content outlets provide access to a repository of content available typically as individual tracks of either audio (songs for example) or audiovisual/visual (movies for example) works. Presently, most content outlets may also be categorized as either authorized or unauthorized, with authorized content outlets providing content under a license from rights-holders and unauthorized content outlets providing unlicensed content. While some digital content may not require a license, most content of interest to consumers exists under restrictions of copyright held by authors and performers or their assignees.

Many of the rights-holders of digital content are assignees of performers. Examples of rights-holders include media controllers such as studios, record labels and media companies, along with individual authors or performers. With current downloading technology and methodologies, many of the copies of content made in the downloading process are not licensed, and the rights-holders are not compensated for these copies.

In addition to problems regarding unlicensed copies, problems also arise with tracking the individual rights to each individual song or other type of content. Some rights-holders have lost records of what content they hold rights to. Disputes over ownership between multiple potential rights-holders over content commonly arise, with these disputes consuming large amounts of resources to resolve. Further, some rights-holders have rights to vast amounts of content whereas other rights-holders may be concerned with small amounts of content.

In addition to the burdens on the rights-holder, the above issues also place a substantial burden on retailers who must ascertain what the rights are, who holds them, and what is the correct amount of compensation for each individual piece of content.

Currently there is no solution that allows both retailers and rights-holders a complete way to monitor and compensate for the sale of digital content.

SUMMARY

The present invention is described and illustrated in conjunction with systems, apparatuses and methods of varying scope. Various exemplary embodiments are described herein relating to a system, database and interface that provide a plurality of exemplary processes and methods that manage digital content. Numerous exemplary methods are provided that relate to digital file identification and the management of the digital files by the rights-holder. Various embodiments are also provided relating to interfaces and services that enable the rights-holder to self register, manage and monitor the commerce and disputes related to each file. Other embodiments include searching networks and providing a list of potentially owned files to a rights-holder and a track listening service that allows tracks to be played for a rights-holder, so that rights to the track may be asserted. In addition to the aspects of the present invention described in this summary, further aspects of the invention will become apparent by reference to the drawings and by reading the detailed description that follows.

A method and apparatus for regulating content is provided. In one embodiment, the invention is a method that includes interfacing with a content outlet. The method further includes comparing attributes of content to be downloaded with attributes of content in a media database. The method also includes providing restrictions based on a result of the comparing. The method may further include monetizing the method and additionally, distributing royalty payments to rights-holders of content.

In an alternate embodiment, the invention is a system that includes a database of content. The system also includes a rights-holder interface for allowing a rights-holder to assert rights and enter or download tracks into the system. The system further includes a content outlet interface. The system may further include a web crawler and a financial interface.

In another alternate embodiment, the invention is a method that includes receiving a song selection. The method also includes comparing the song selection to records of a database of songs. The method further includes indicating results of the comparing. The method may also include monetizing the method. The method may further include providing restrictions to the song. The method may also include indicating the song is unclaimed. The method may further include prohibiting copying of the song.

In yet another alternate embodiment, the invention is an apparatus that includes means for tracking content. The apparatus also includes means for interfacing between content users and the means for tracking content. The apparatus further includes means for interfacing between content rights-holders and the means for tracking content.

In yet another alternate embodiment, the invention is a method that includes receiving a song claim. The method also includes comparing the song claim to records of a database of songs. The method further includes indicating results of the comparing. The method may further include indicating a dispute exists. The method may also include resolving the dispute. The method may further include forwarding royalties.

In still another embodiment, the invention is a method. The method includes crawling a network with an intelligent agent to find content. The method further includes evaluating the content. The method also includes transmitting a digital fingerprint of the content to a database of content. The method further includes storing the digital fingerprint of the content in the database of the content.

In still another embodiment, the invention is a method that searches for content and provides a list to a rights-holder of potentially owned files. The method may further include providing a track listening service that provides the ability to retrieve, store and listen to selected and potentially owned files.

In still another embodiment, the invention is a system that provides a dispute resolution services that enables collections of royalties while disputes are settled, and a retail system that provides analysis of earnings and potential earnings based on commerce data.

Embodiments of the invention presented are exemplary and illustrative in nature, rather than restrictive. The scope of the invention is determined by the appended claims.

BRIEF DESCRIPTION OF THE DRAWINGS

Embodiments of the invention are illustrated in the figures. However, the embodiments and figures are illustrative rather than limiting, they provide examples of the invention.

FIG. 26 is another screen shot provided by an account manager interface of one embodiment of the present system;

FIG. 29 is a screen shot provided by a track information interface of one embodiment of the present system;

FIG. 30 is a screen shot provided by an interface of one embodiment of the system of determining rights-holders of content;

FIG. 33 is a screen shot provided by a search interface of one embodiment of the system;

FIG. 40 is a screen shot provided by a disputed tracks interface of one embodiment of the system;

FIG. 43 is a screen shot provided by a billing interface of one embodiment of the system;

DETAILED DESCRIPTION OF THE PREFERRED EMBODIMENT(S)

The present invention is described and illustrated in conjunction with systems, apparatuses and methods of varying scope. Various exemplary embodiments are described herein relating to a system, a database and interfaces that provide a plurality of exemplary processes and methods that track and manage digital content stored in media files.

Numerous exemplary methods are provided that relate to digital file identification and the management of the digital files by the rights-holder. Various other embodiments are also provided relating to interfaces and services that enable the rights-holder to self register, manage and monitor the commerce and disputes related to each file for both rights-holders and retailers. Other embodiments include searching networks and providing a list of potentially owned files to a rights-holder and a track listening service that allows tracks to be played for a rights-holder, so that rights to the track may be asserted. Further embodiments relate to financial analysis and collections and disbursement of royalties from the sale of content. In addition to the aspects of the present invention described, further aspects of the invention will become apparent by reference to the drawings and by reading the detailed description that follows.

Note, preferably, the systems and methods described herein operate in a real-time or near real-time manner. For example, a query may be sent by a content outlet to a database, with a response from the database delivered with minimal delay based on results of the query. This may be achieved in part based on local caching of responses at the content outlet system. This may also be achieved through use of known database technology.

Figure 1:
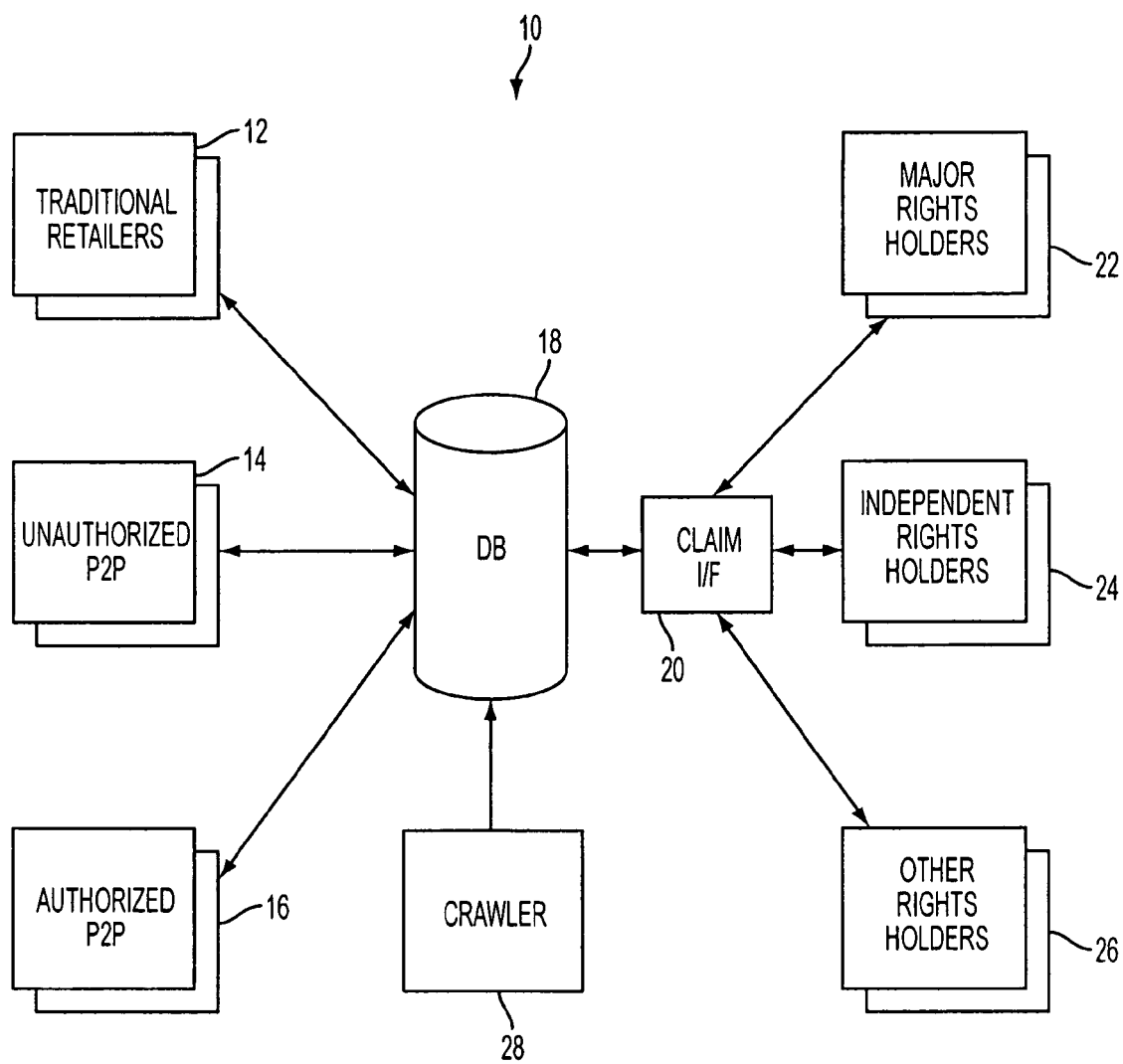
FIG. 1 illustrates an embodiment of a system for controlling access to content.

The apparatus and methods may be understood by reference to an embodiment of a system. FIG. 1 illustrates an embodiment of a system for controlling access to content stored in media files. The system may be used to determine who holds rights to content, identify content to be downloaded, and restrict access to content based on preferences of the rights-holder. Moreover, the system allows for monetization of this process. System 10 includes a database 18, content outlets 12, 14 and 16, a claim interface 20, rights-holders 22, 24 and 26, and a crawler 28.

Database 18 includes attributes related to content. For example, a media file or item of content may have attributes for title, author, performer, rights-holders, size/length, type of content, digital fingerprint, rights restrictions, and other attributes as subsequently described. Moreover, a piece of content may have an authorized copy of the content, and the authorized copy may incorporate digital rights management or other restrictive parameters used to implement rights restrictions specified by rights-holders.

Traditional retailers 12 are content media file outlets which operate using licensed content and provide compensation to rights-holders. Unauthorized peer-to-peer (p2p) networks 14 are content outlets which provide content regardless of licensing status and without attempting to compensate rights-holders. Authorized peer-to-peer (p2p) networks 16 are downloading networks using peer-to-peer technology which use licensed content and provide compensation to rights-holders. Note that not all of content outlets 12, 14 and 16 all exist (are in business or organized as a network for example) at one time.

When a content outlet 12, 14 or 16 is ready to provide a media file, song or other content for download, it may query database 18 and determine if there are any restrictions on the content. If the content in question is identifiable in comparison to content for which attributes are stored in the database 18, then other attributes of the content will provide information about restrictions on the content (such as limited copying, play-only versions, limited-use versions for example). These restrictions may then be embedded with the content which is provided for download by the content outlet. Alternatively, an authorized copy of content may be provided, thereby embedding desired restrictions and preserving quality at a certain level.

Determining the restrictions on content requires determining who owns or has rights to the content (the rights-holders). Claim interface 20 allows for access to the database 18 by rights-holders. Rights-holders 22, 24 and 26 may all use claim interface 20 to assert ownership or other rights in content. Preferably, rights-holders provide content which they have rights in, and that content may then be evaluated to determine attributes such as title, type of content, and digital fingerprint. Alternatively, media files or content may be discovered on the Internet or other networks, and rights-holders may then use the claim interface to assert rights in the work embodied in the content so discovered. For example, the crawler 28 may be implemented to traverse links on the World Wide Web and thereby discover content, which may then be evaluated by rights-holders to determine whether anyone has a claim to ownership of the content.

Note, in some embodiments, claim interface 20 is an API, or application programming interface for example. The claim interface 20 may operate in a variety of ways. For example, it may be a graphical user interface, allowing for entry of information about content, such as attributes including author, title, performer, for example. This information may be used to query database 18 to determine if such a file or content is known to the database 18, or it may be used to enter these attributes into the database 18. Alternatively, the claim interface 20 may be implemented for some form of bulk or batch data entry, whereby a stream or file of data is provided to the claim interface related to numerous separate or related pieces of content, either for query purposes or for data entry purposes for example. Moreover, the claim interface 20 may allow for entry of actual content into the database 18. Whether actual content or a digital fingerprint of the content (or both) is stored, querying the database 18 based on content may occur by comparing digital fingerprints.

On occasion, rights-holders 22, 24 and 26 may assert multiple conflicting claims to a media file or content. Not all multiple claims will conflict. For example, authorship and performance of a song may both provide copyright rights for a separate author and performer, without an outright conflict. That the two rights-holders disagree about how to handle content is not the same as a conflict where two entities purport to be the owner of an authorship copyright on a song. When the same rights are asserted by multiple parties, some form of conflict resolution may be necessary. Royalties may be held in trust, or the song (or other content) may be restricted from any copying. Alternatively, ownership conflicts may be initially decided based on a reputation rating maintained by the claim interface, with high reputation rankings assigned to reputable companies or companies having previously proven content ownership, and low rankings assigned to those having asserted false claims or with little prior experience. Preferably, an appeal process may be implemented to allow for human intervention after a determination based on reputation rankings occurs. For example, a reputable label may assert claims to its catalog as it stood on a particular date. Another small label may assert claims to a set of songs within this catalog. The reputations may be such that the reputable label wins. However, the small label may be able to show an assignment of rights to a human and thus prove its claims. Alternatively, the small label may be acting improperly, and thus correctly have its claims rejected.

In addition to the features provided by the system of FIG. 1 relating to interfaces and services that enable the rights-holder to self register, manage and monitor the commerce and disputes related to each content file, other embodiments include searching the p2p networks and providing a list of potentially owned files to a rights-holder and a track listening service that allows tracks to be played for a rights-holder, so that rights to the track may be asserted. It is noted that the processes and interfaces subsequently described herein would be enable by the system of FIG. 1 and would also be enabled by the systems described in FIGS. 4-10 and FIGS. 14-15.

Figure 2:
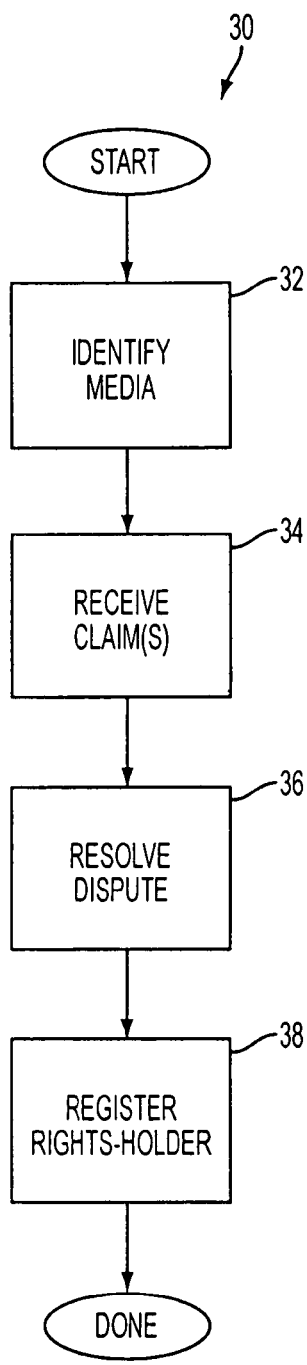
FIG. 2 illustrates an embodiment of a method of determining rights-holders of content.

Various exemplary methods may be used to determine who is legitimately a rights-holder to content. FIG. 2 illustrates an embodiment of one method 30 of determining rights-holders of content. The method may be implemented in conjunction with a system such as that described with respect to FIG. 1, or with an alternative systems as subsequently described. The method 30 includes a series of modules for identifying media, receiving claims to the media, resolving disputed claims, and registering the rights-holder. Note that not all of these modules may be required for a working method, as a useful method may be implemented using some subset of the modules described. At module 32, the media file or content is identified. This may occur as a result of content submitted for identification by a content outlet, content submitted as part of a claim by a rights-holder, or content discovered by a software process or agent which crawls a network. The identification of media files is described in further detail below.

At module 34, claims to the content are asserted. Note that these modules may interact in a fashion other than linearly, such that claims may be asserted well after content is identified, and even after a rights-holder has been identified. With a claim asserted, information about the content will also be supplied, such as author, performer, title, digital fingerprint of content, even an authorized copy of content.

If multiple claims are asserted, at module 36 disputes between claims are resolved. As mentioned with respect to FIG. 1, this may involve reputation based resolution, or may involve only human intervention. At module 38, rights-holder (s) to the content are registered, along with their requirements of restrictions on copying the content. At this point, access to the file content may be controlled based on rights asserted by the rights-holders, and royalties on the content may be distributed to the rights-holders as copying occurs. Moreover, changes in rights to the file content may be tracked, allowing for assignments or expirations of copyrights (should that ever be allowed). Note that not all of these modules may be required for a working method, as a useful method may be implemented using some subset of the modules described. Also, note that monetization of this method may occur, such as through a fee for asserting claims or resolving disputes, or through some form of subscription or periodic fee for example.

Figure 3:
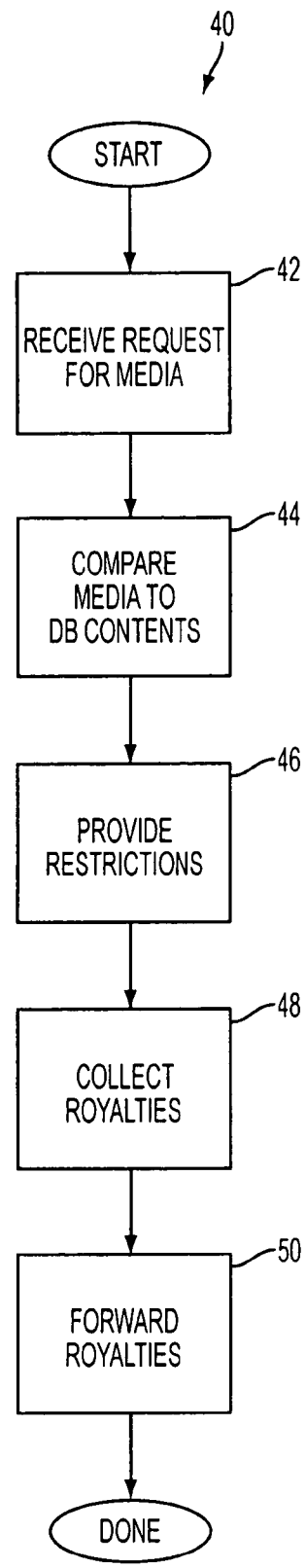
FIG. 3 illustrates an embodiment of a method of providing content.

Whether the rights-holders to content are clear or not, some content may be provided by various methods. FIG. 3 illustrates an exemplary embodiment of a method 40 of providing media files and content. The method 40 may be implemented in conjunction with a system such as that described with respect to FIGS. 1, 10, 14-15, or with alternative systems for example. The method includes receiving a request for media or content, comparing media to contents of a database, providing restrictions to the media, collecting royalties, and forwarding royalties. Again, note that not all of these modules may be required for a working method, as a useful method may be implemented using some subset of the modules described.

At module 42, a request for media or content is received. This request may come from a content outlet for example, which is attempting to satisfy requirements imposed by copyright law. At module 44, the media or content is compared to records in a database to determine what the content is. Preferably, a digital fingerprint or similar technology is used to identify the content, such that digital fingerprints may be compared. Alternatively, attributes such as title, author, and/or performer for example may be compared. Moreover, content may be compared bodily, such that two digital files representing songs may be compared on a bitwise level for example. When a hit or a match is found, the database may have information about copyright restrictions and rights-holders who are due royalties.

At module 46, any available restrictions are provided. This may be as simple as providing a message or set of parameters, with the parameters embedded or otherwise including as digital rights management restrictions. Alternatively, this may involve providing an authorized copy with embedded restrictions. As another alternative, a rights-holder may prohibit copying, such that the content outlet must not perform the download.

At module 48, royalties are collected. This may occur in the form of a payment from the content outlet to the operator of the database, with records of the database used to account for such payments. Note that rather than processing a micropayment for each song or other piece of content, periodic payments of many individual royalties may be made (such as monthly payments for example). Moreover, at module 50, royalties are forwarded to rights-holders. This may again involve a periodic payment based on multiple individual micropayments. Additionally, royalties may be forwarded after deduction of a fee for handling the royalties, either as a percentage or as some form of fixed fee. Likewise, payments may be required for each request for media, each successful request (a match is found), or each request resulting in a download for example. Other options for monetization may also be employed, such as a subscription model for example.

Figures 4, 5:
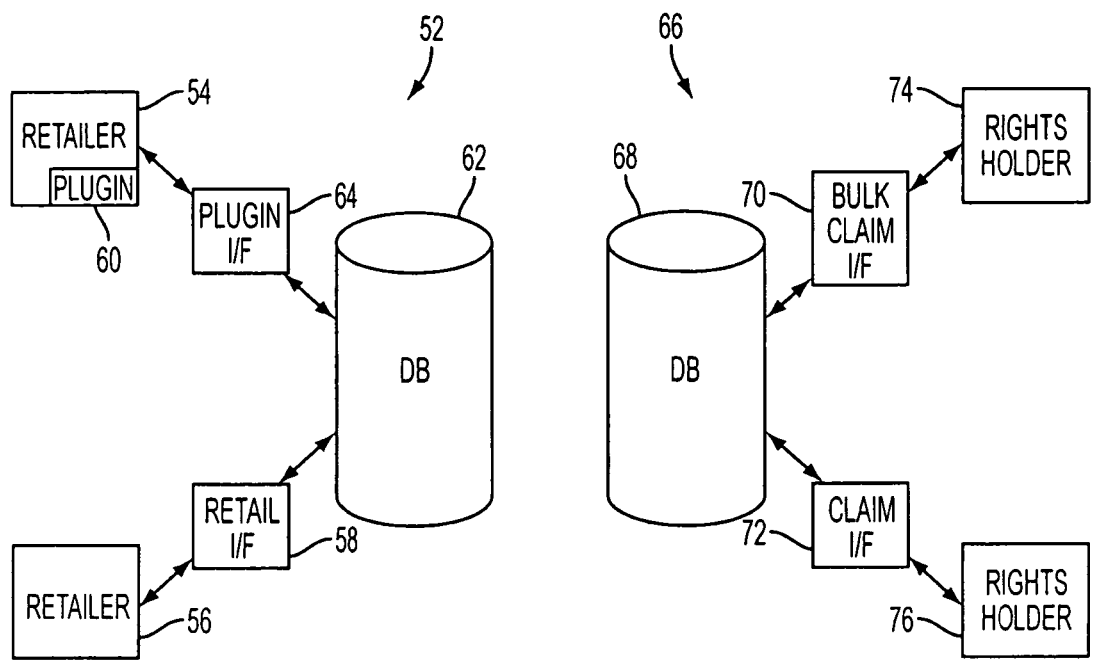
FIG. 4 illustrates an embodiment of a system for providing content.
FIG. 5 illustrates an embodiment of a system for determining rights-holders of content.

FIG. 4 illustrates another exemplary embodiment of a system 52 for providing media files and content. The system may allow for interaction between content outlets (retailers) and a database of media files to determine restrictions on content and collect royalties. The system 52 includes a database 62, plug-in interface 64, retail interface 58, plug-in 60, and may be used in conjunction with retailers 54 and 56. The system 52 may be part of a larger network or system, the portion illustrated is useful for working with content outlets.

Database 62 is a database of content, attributes related to content, or both. It may be accessed through plugin interface 64 or through retail interface 58. Retailer 56 is a content outlet which accesses database 62 through retail interface 58.

Retailer 56 may allow for download of music through its system for example, and may query database 62 to determine the status of songs to be downloaded. The query may be sent with attributes of the songs/content or with the actual songs/content. The return information from database 62 may include an indication the content has not been claimed, restrictions on the content, an authorized copy of the content, or an indication of prohibition of copying content. As illustrated, retailer 56 must handle these signals and properly format its queries for use with interface 58, but otherwise directly queries database 62.

Alternatively, retailer 54 may be a content outlet which integrates into its software plugin 60. Plugin 60 may be a local interface module which works with software used by retailer 54 in either a previously specified or a customized manner. Retailer 54 may query plugin 60 about availability of content (such as a song) for download. Plugin 60 may then pass the query to plugin interface 64, which may then properly query database 62 about the content in question. The response from database 62 may then be interpreted or reformatted by plugin interface 64 and plugin 60 such that retailer 54 may use the response in its processing. Generally, the response would be the same as that provided to retailer 56 in the above description. Note that plugin 60 may perform relatively simple activities such as reformatting data, or more complex activities, such as determining a digital fingerprint for content provided by retail outlet 54.

Just as various methods of providing content may use various systems, various methods of determining rights-holders may use various systems. FIG. 5 illustrates an exemplary embodiment of a system 66 for determining rights-holders of content. The system illustrated may be part of a larger system, the portion illustrated is useful for working with rights-holders. The system 66 may allow for interaction between rights-holders and a content database to register rights-holders and resolve disputes. The system 66 includes a database 68, bulk claim interface 70, claim interface 72, and is designed to work with rights-holders 74 and 76 (among others).

Database 68 is a content database, such as database 18 of FIG. 1. Database 68 may include content, attributes of content, or both. Bulk claim interface 70 is an interface that allows for submission of multiple or numerous claims (such as submission of claims for performance copyright to a set of songs and the associated collections of those songs for example). Bulk claim interface 70 may be restricted to access by rights-holders known to submit multiple claims, or may be provided for any rights-holder willing to use a stream of information rather than a user interface. As an example, rights-holder 74 may assert claims to all songs in a catalog it has just purchased from another rights-holder by providing a file with information about all of the content in the catalog in question.

Alternatively, for assertions of rights to only a few songs or pieces of content, claim interface 72 may be used. Claim interface 72 may be a graphical user interface or other human-interactive interface which an employee of a rights-holder to an individual rights-holder may use. For example, rights-holder 76 may assert authorship copyright to his or her set of published songs (which may be a small number for many authors) using claim interface 72. One may expect that claim interface 72 would allow for entry of all available attributes, along with submission of a digital fingerprint or authorized copy of content.

For each interface (70, 72), results may come in the form of registration of the rights-holder, indication of a conflict (with or without resolution), indication of a match between the content registered and previously entered content (such as found by a crawler or requested by a content outlet), or some other result. In the case of the bulk claim interface 70, these results may be provided as a file or stream of results sent to the rights-holder 74, or as information available for access by the rights-holder 76 at convenience of the user. In the case of claim interface 72, these results may be provided graphically or in another manner intelligible to a user, or may be available for lookup after periodic processing/updates of the database occur. Note that the operations of this system may be monetized, such that rights-holders may pay to register claims, to receive royalties, or for some other form of service. Payment of royalties, such as due to registration of a rights-holder for an item of content, are not illustrated in the figure, but are subsequently described and may be understood as to occur either electronically or by means of mailing of checks to rights-holders for example.

Figure 6:
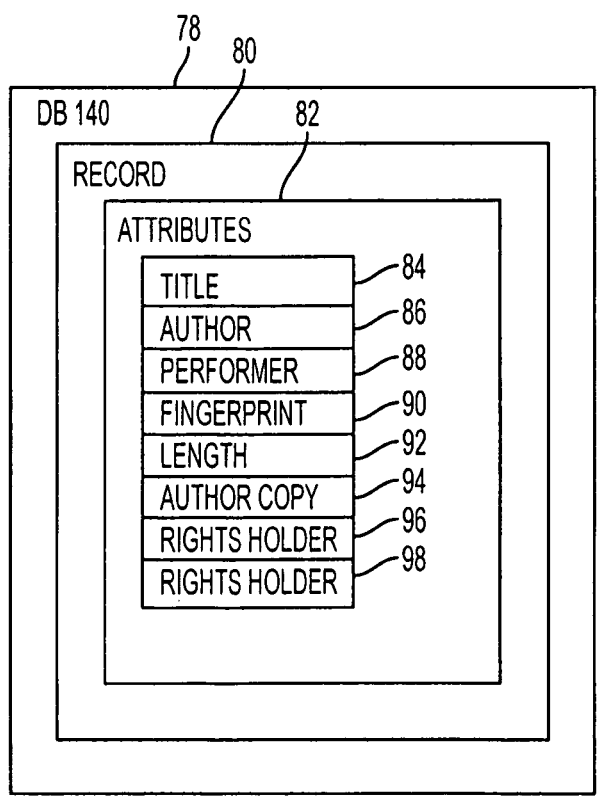
FIG. 6 illustrates an embodiment of a record of content in a database.

To track information related to content and rights-holders, various data structures may be used. FIG. 6 illustrates an exemplary embodiment of a record of content 80 in a database 78. The record 80, in one embodiment, is organized into a set of attributes 82, which may be stored as name-value pairs (or code-value pairs). Note that none of the attributes 82 are necessarily mandatory. Attributes illustrated include title 84 (title of a song for example), author 86 (author/composer of a song for example), performer 88 (performer of a song for example), fingerprint 90 (digital fingerprint of a song in digital format for example), length 92 (playing time of a song for example), authorized copy 94 (copy to be provided when content is requested for example), rights-holder 96 (first rights-holder associated with content for example), and rights-holder 98 (second rights-holder associated with content for example).

Figure 37:
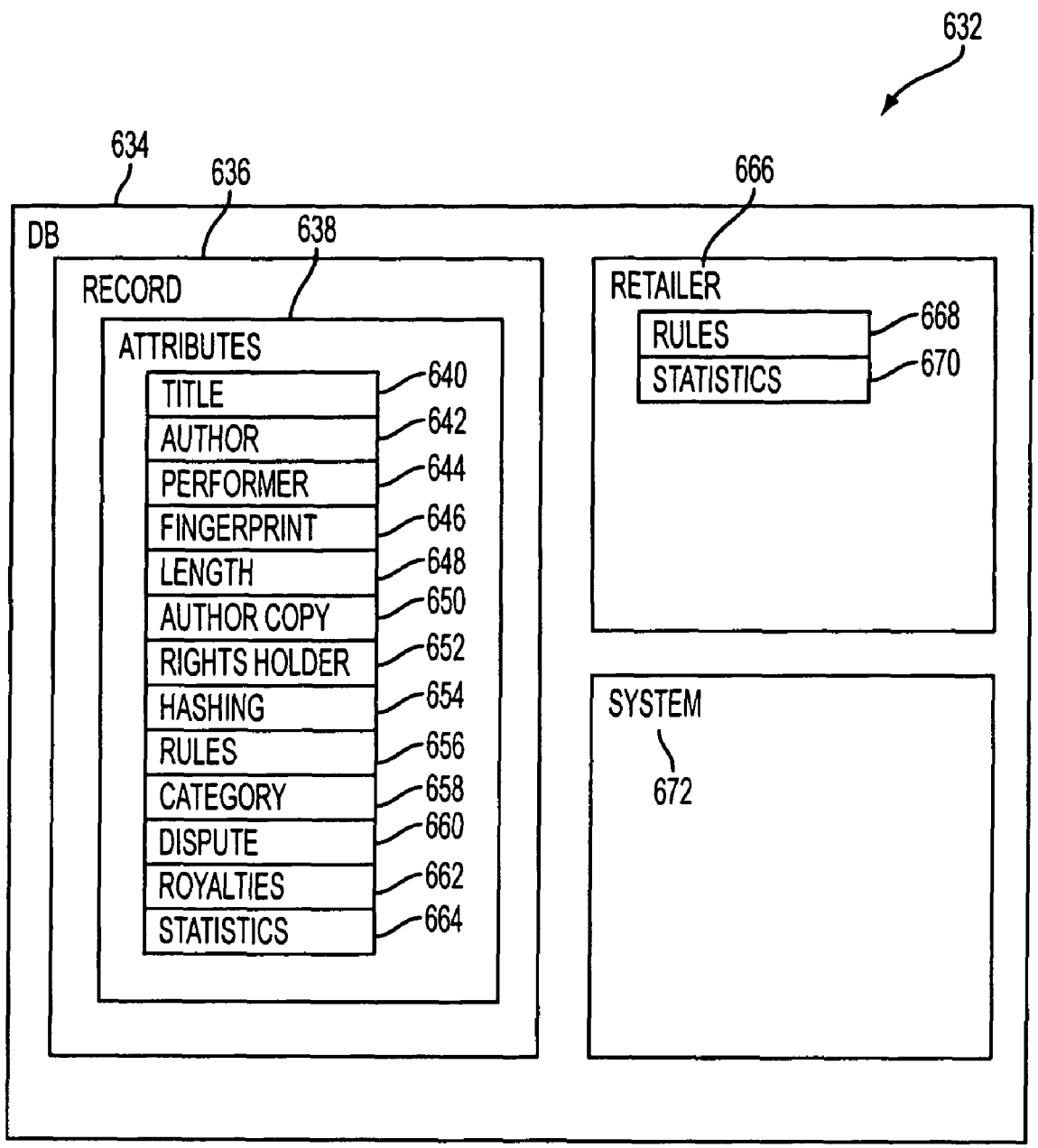
FIG. 37 illustrates a diagram of data stored in one embodiment of the system of determining rights-holders of content.

Note that each of these attributes may also apply to a movie, comedic performance, document (maybe not the performer 88 in that case) or other form of content in a media file. Also, note that other attributes may be stored, such as restrictions for DRM purposes or prohibitions on copies for example. Similarly, other formats or relationships for the data in question may be utilized, such as formats dictated by metadata in a database for example. Thus, the data structure or record of FIG. 6 is illustrative rather than restrictive in nature. FIG. 37 also shows another embodiment of data stored in the system database.

Figure 7:
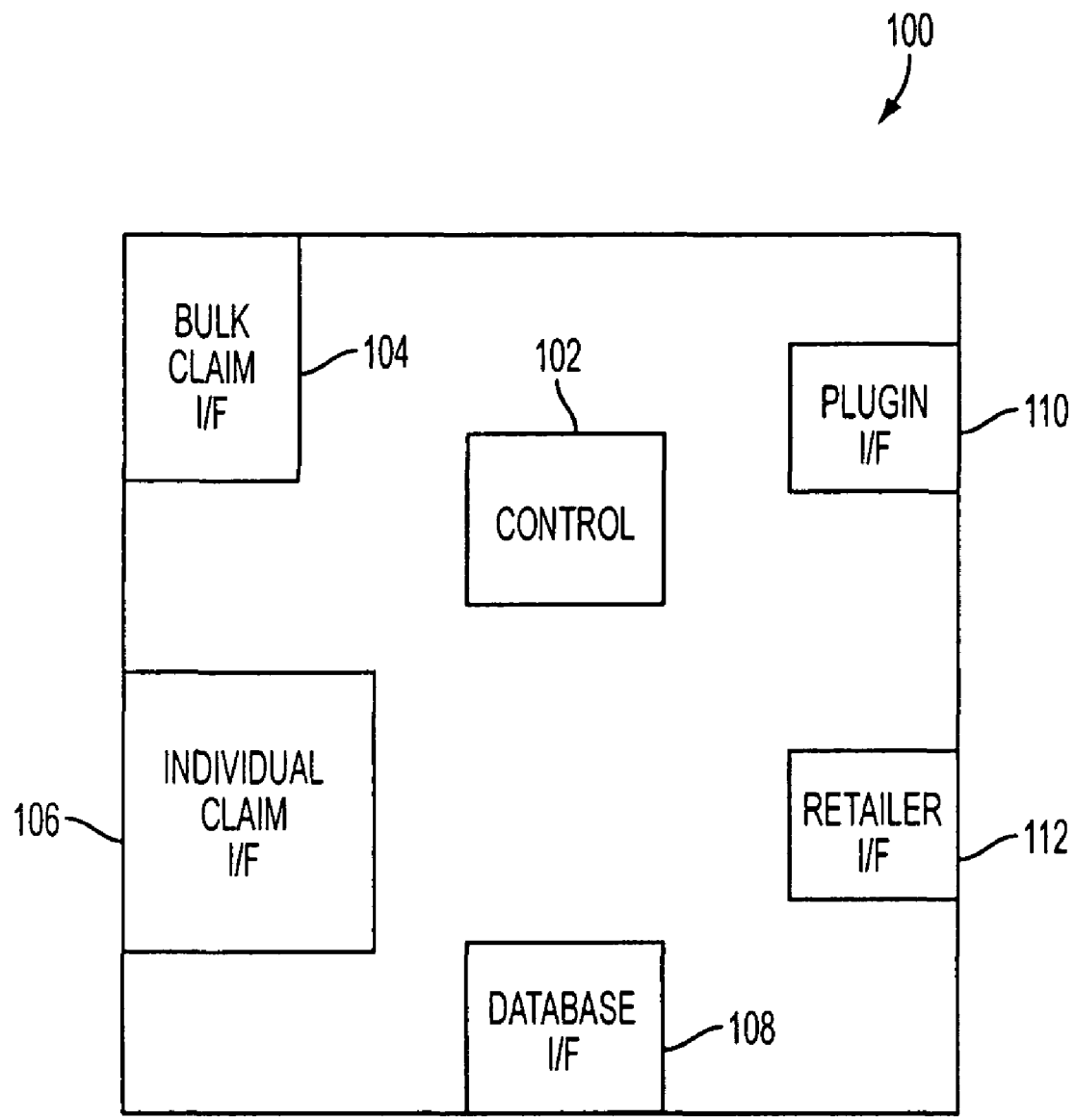
FIG. 7 illustrates an embodiment of a medium (or media) which may in turn embody instructions which, when executed by a processor, may cause the processor to perform a method.

Data structures of various types may be used with programs, which are typically embodied in media or a medium. FIG. 7 illustrates an exemplary embodiment of a medium (or media) which may in turn embody instructions which, when executed by a processor, may cause the processor to perform a method. A medium may be a single piece of media or a collection of media, without materially changing the medium. In the embodiment illustrated in FIG. 7, the medium includes a control module, claim interfaces (for rights-holders), outlet interfaces, and a database interface. More specifically, medium 100 includes a control module 102, bulk claim interface 104, individual claim interface 106, database interface 108, plugin interface 110, and retailer interface 112.

Bulk claim interface 104 and individual claim interface 106 are modules which implement the claim interface for rights-holders. Rights-holders with large numbers of claims to content or a steady stream of claims to content may use bulk claim interface 106 to provide claim information. Rights-holders with few claims or infrequent claims may use individual claim interface 106. Similarly, plugin interface 110 and retailer interface 112 are modules which implement the interface with content outlets. Content outlets may include a plugin, and thereby use plugin interface 110, or not include a plugin, and communicate directly with retailer interface 112.

Database interface 108 interfaces with a database of content and rights-holder information. Control module 102 controls each of the other modules. Thus, control module 102 may process a request from a retailer through plugin interface 110 or retailer interface 112 by causing database interface 108 to search for content within an associated database. Upon finding a match, information from database interface 108 may be directed back to either plugin interface 110 or retailer interface 112 and thereby to the content outlet originally submitting the request.

Similarly, control module 102 may receive a claim either through bulk claim interface 104 or individual claim interface 106, and direct that information through database interface 108 to the associated database. Control module 102 may manage resolution of conflicting claims based on feedback from database interface 108. Moreover, control module may send information about royalty rates and download frequency through claim interfaces 104 and 106 to rights-holders, along with electronic payments of royalties. Note that control 102 may also direct a crawler interface (not shown) which may be used to receive information about content and populate a database through database interface 108. Such a medium may be used in conjunction with various computer or machine embodiments.

Figure 8:
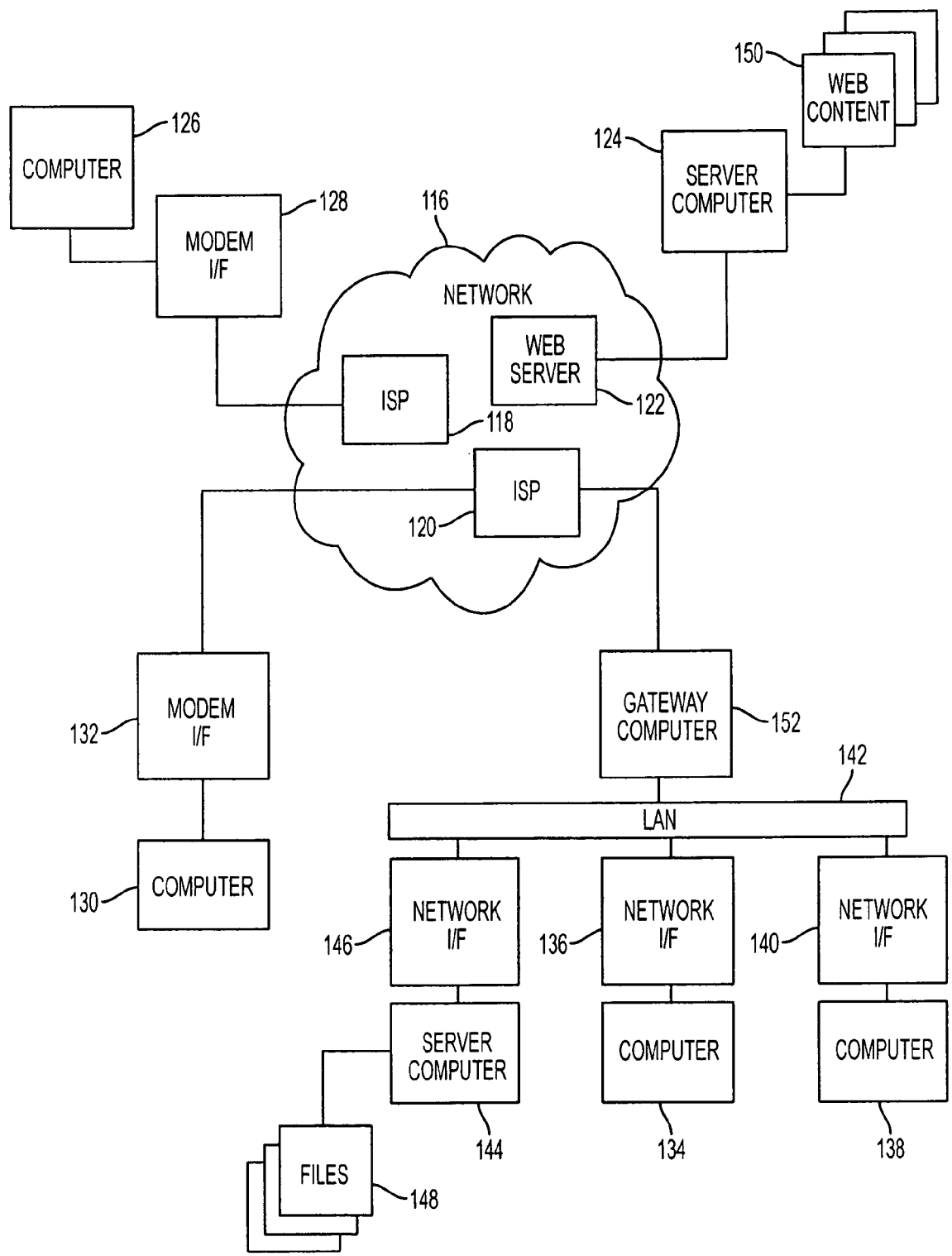
FIG. 8 shows embodiments of several computer systems that are coupled together through a network.
Figure 9:
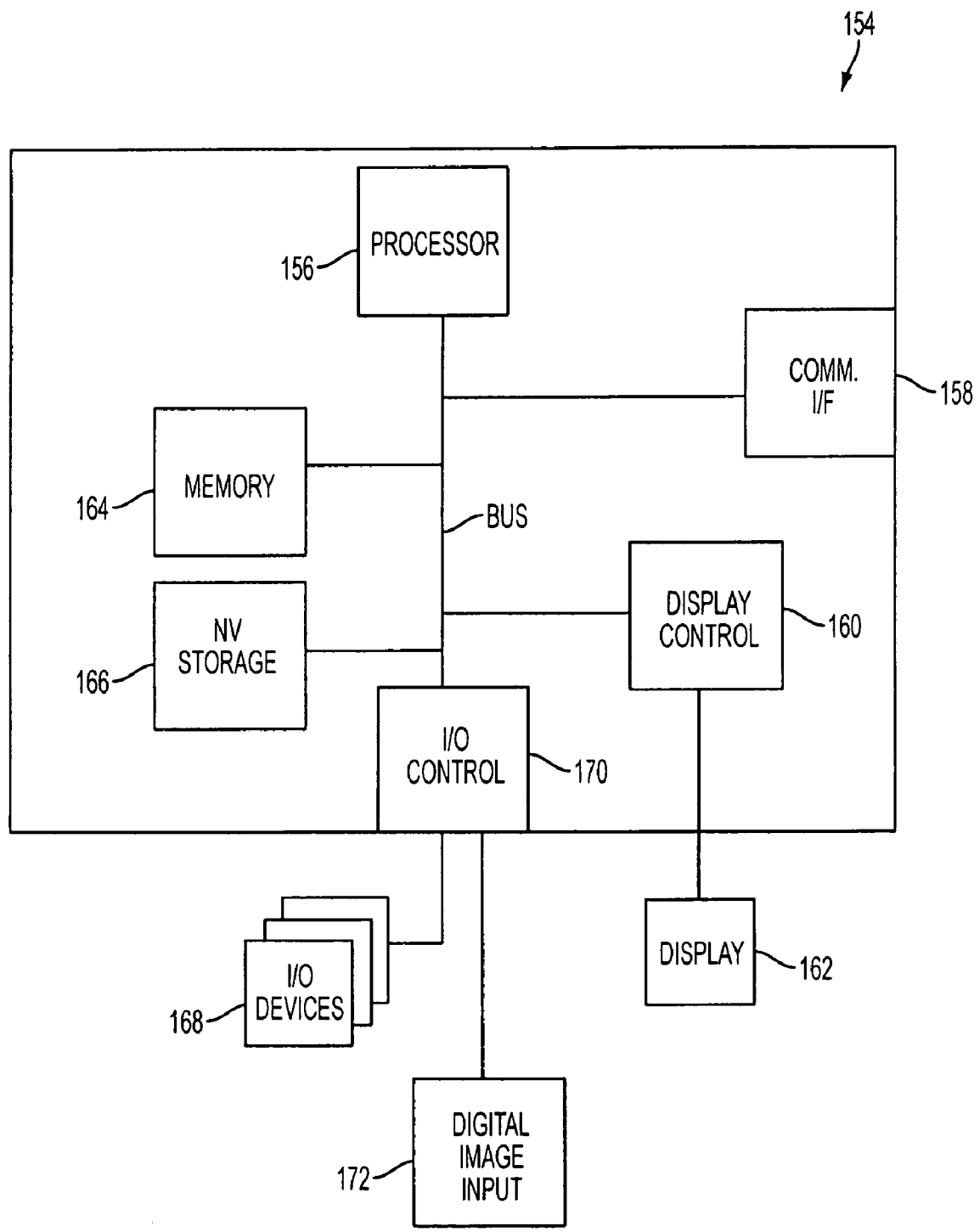
FIG. 9 shows one embodiment of a conventional computer system that can be used as a client computer system or a server computer system or as a web server system.

The following description of FIGS. 8-9 is intended to provide an overview of computer hardware and other operating components suitable for performing the methods of the invention described above, but is not intended to limit the applicable environments. Similarly, the computer hardware and other operating components may be suitable as part of the apparatuses of the invention described above. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 8 shows several computer systems 114 that are coupled together through a network 116, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art.

Access to the Internet 116 is typically provided by Internet service providers (ISP), such as the ISPs 118 and 120. Users on client systems, such as client computer systems 126, 130, 134, and 138 obtain access to the Internet through the Internet service providers, such as ISPs 118 and 120. Access to the Internet allows users of the client computer systems to exchange information, receive and send e-mails, and view documents, such as documents which have been prepared in the HTML format. These documents are often provided by web servers, such as web server 122 which is considered to be "on" the Internet. Often these web servers are provided by the ISPs, such as ISP 118, although a computer system can be set up and connected to the Internet without that system also being an ISP.

The web server 122 is typically at least one computer system which operates as a server computer system and is configured to operate with the protocols of the World Wide Web and is coupled to the Internet. Optionally, the web server 122 can be part of an ISP which provides access to the Internet for client systems. The web server 122 is shown coupled to the server computer system 124 which itself is coupled to web content 150, which can be considered a form of a media database. While two computer systems 122 and 124 are shown in FIG. 8, the web server system 122 and the server computer system 124 can be one computer system having different software components providing the web server functionality and the server functionality provided by the server computer system 124 which will be described further below.

Client computer systems 126, 130, 134, and 138 can each, with the appropriate web browsing software, view HTML pages provided by the web server 122. The ISP 118 provides Internet connectivity to the client computer system 126 through the modem interface 128 which can be considered part of the client computer system 126. The client computer system can be a personal computer system, a network computer, a Web TV system, or other such computer system.

Similarly, the ISP 120 provides Internet connectivity for client systems 130, 134, and 138, although as shown in FIG. 8, the connections are not the same for these three computer systems. Client computer system 130 is coupled through a modem interface 132 while client computer systems 134 and 138 are part of a LAN. While FIG. 8 shows the interfaces 128 and 132 as generically as a "modem," each of these interfaces can be an analog modem, ISDN modem, cable modem, satellite transmission interface (e.g. "Direct PC"), or other interfaces for coupling a computer system to other computer systems.

Client computer systems 134 and 138 are coupled to a LAN 142 through network interfaces 136 and 140, which can be Ethernet network or other network interfaces. The LAN 142 is also coupled to a gateway computer system 152 which can provide firewall and other Internet related services for the local area network. This gateway computer system 152 is coupled to the ISP 120 to provide Internet connectivity to the client computer systems 134 and 138. The gateway computer system 152 can be a conventional server computer system. Also, the web server system 122 can be a conventional server computer system.

Alternatively, a server computer system 144 can be directly coupled to the LAN 142 through a network interface 146 to provide files 148 and other services to the clients 134, 138, without the need to connect to the Internet through the gateway system 152.

FIG. 9 shows one example of a conventional computer system 154 that can be used as a client computer system or a server computer system or as a web server system. Such a computer system 154 can be used to perform many of the functions of an Internet service provider, such as ISP 118. The computer system 154 interfaces to external systems through the modem or network interface 158. It will be appreciated that the modem or network interface 158 can be considered to be part of the computer system 154. This interface 158 can be an analog modem, ISDN modem, cable modem, token ring interface, satellite transmission interface (e.g. "Direct PC"), or other interfaces for coupling a computer system to other computer systems.

The computer system 154 includes a processor 156, which can be a conventional microprocessor such as an Intel Pentium microprocessor or Motorola Power PC microprocessor. Memory 164 is coupled to the processor 156 by a bus 174. Memory 164 can be dynamic random access memory (DRAM) and can also include static RAM (SRAM). The bus 174 couples the processor 156 to the memory 164, also to non-volatile storage 166, to display controller 160, and to the input/output (I/O) controller 170.

The display controller 160 controls in the conventional manner a display on a display device 162 which can be a cathode ray tube (CRT) or liquid crystal display (LCD). The input/output devices 168 can include a keyboard, disk drives, printers, a scanner, and other input and output devices, including a mouse or other pointing device. The display controller 160 and the I/O controller 170 can be implemented with conventional well known technology. A digital image input device 168 can be a digital camera which is coupled to an I/O controller 170 in order to allow images from the digital camera to be input into the computer system 154.

The non-volatile storage 166 is often a magnetic hard disk, an optical disk, or another form of storage for large amounts of data. Some of this data is often written, by a direct memory access process, into memory 164 during execution of software in the computer system 154. One of skill in the art will immediately recognize that the terms "machine-readable medium" or "computer-readable medium" includes any type of storage device that is accessible by the processor 156 and also encompasses a carrier wave that encodes a data signal.

The computer system 154 is one example of many possible computer systems which have different architectures. For example, personal computers based on an Intel microprocessor often have multiple buses, one of which can be an input/output (I/O) bus for the peripherals and one that directly connects the processor 156 and the memory 164 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 164 for execution by the processor 156. A Web TV system, which is known in the art, is also considered to be a computer system according to the present invention, but it may lack some of the features shown in FIG. 8, such as certain input or output devices. A typical computer system will usually include at least a processor, memory, and a bus coupling the memory to the processor.

In addition, the computer system 154 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of an operating system software with its associated file management system software is the LINUX operating system and its associated file management system. The file management system is typically stored in the non-volatile storage 166 and causes the processor 156 to execute the various acts required by the operating system to input and output data and to store data in memory, including storing files on the non-volatile storage 166.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMS, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

The systems described in FIGS. 7-9 are therefore capable of enabling the methods described herein regarding the identification and tracking of media files, and enable the interface screens provided to both retailers and rights-holders as subsequently described.

Figure 10:
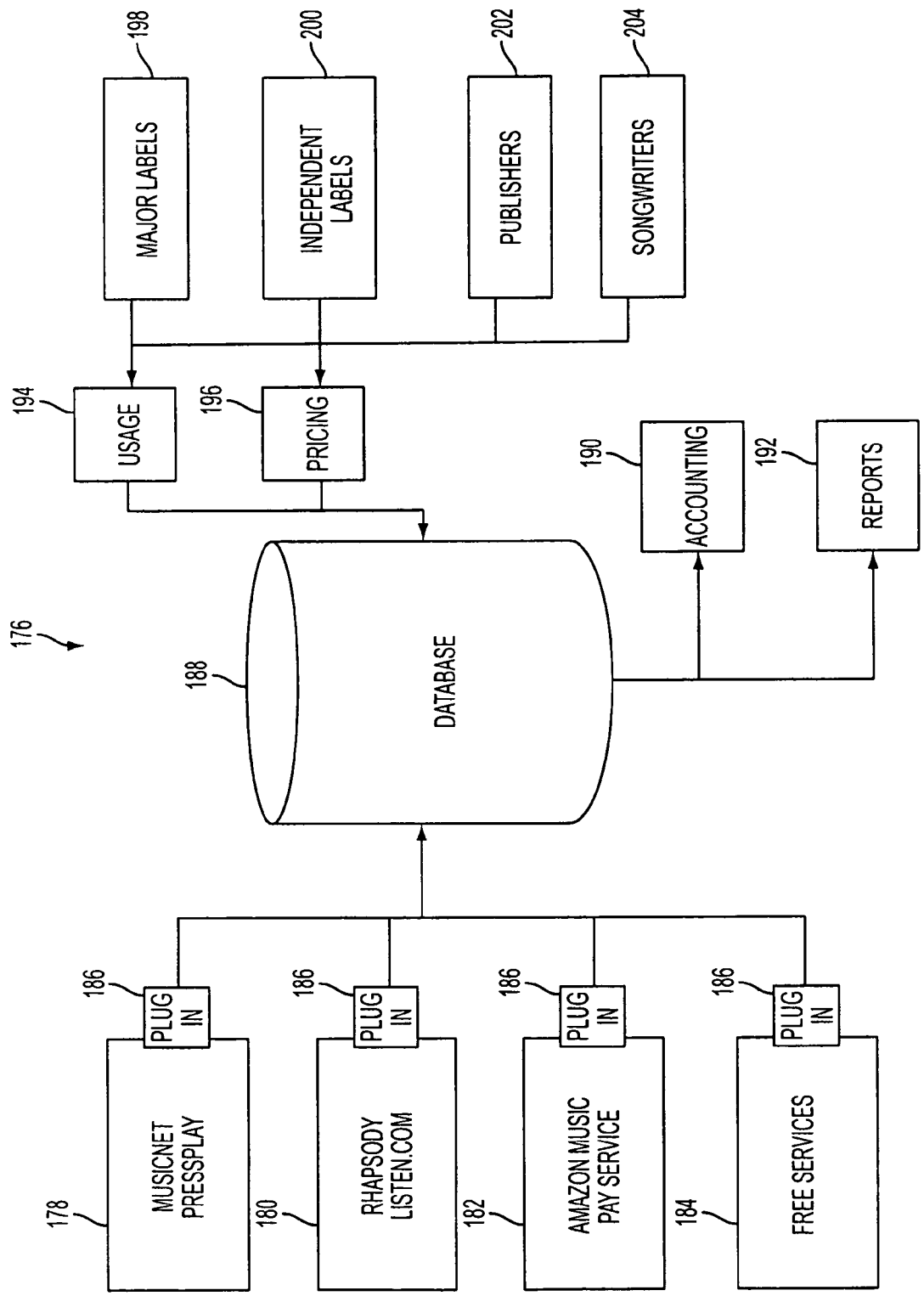
FIG. 10 illustrates an alternate embodiment of a system for controlling access to content.

The database system of FIG. 10 is another exemplary embodiment of a complete open online licensing and royalty distribution system 176 for digital media. Such a database system, in some embodiments, provides a centralized clearinghouse for all digital media. The system may enable content owners to protect the content owner's intellectual property rights associated with the content. The system can also provide authentication services, as well as tracking and reporting services associated with the management of the distribution of content.

In further detail, the system 176 includes a database 188 that stores data related to rights-holders 198, 200 202, 204, distributors such as content retailers or outlets 178, 180, 182, or 184 for example, and media files related to content (such as attributes or actual content for example). As illustrated, distributors 178, 180, 182 and 184 each use a plug-in 186 to interface with database 188, thereby allowing for requests for permission to distribute content and responses including denial, unconditional permission, restricted permission, known good copies, or lack of data related to the content. Moreover, the plug-in 186 may function to monetize content transactions, allowing for use of the database 188 as a clearinghouse for royalties for example.

Rights-holders 198, 200, 202, and 204 each claim rights through usage module 194 and set pricing or other restrictions through pricing module 196 for example. Data from modules 194 and 196 may be some or all of the data stored or encoded in database 188. Accounting module 190 provides an interface to database 188 allowing for financial examination and control of database 188. Similarly, reports module 192 provides an interface to database 188 allowing for production of visually perceptible presentations of data from database 188, such as activity or commercial charts for example.

Figure 11:
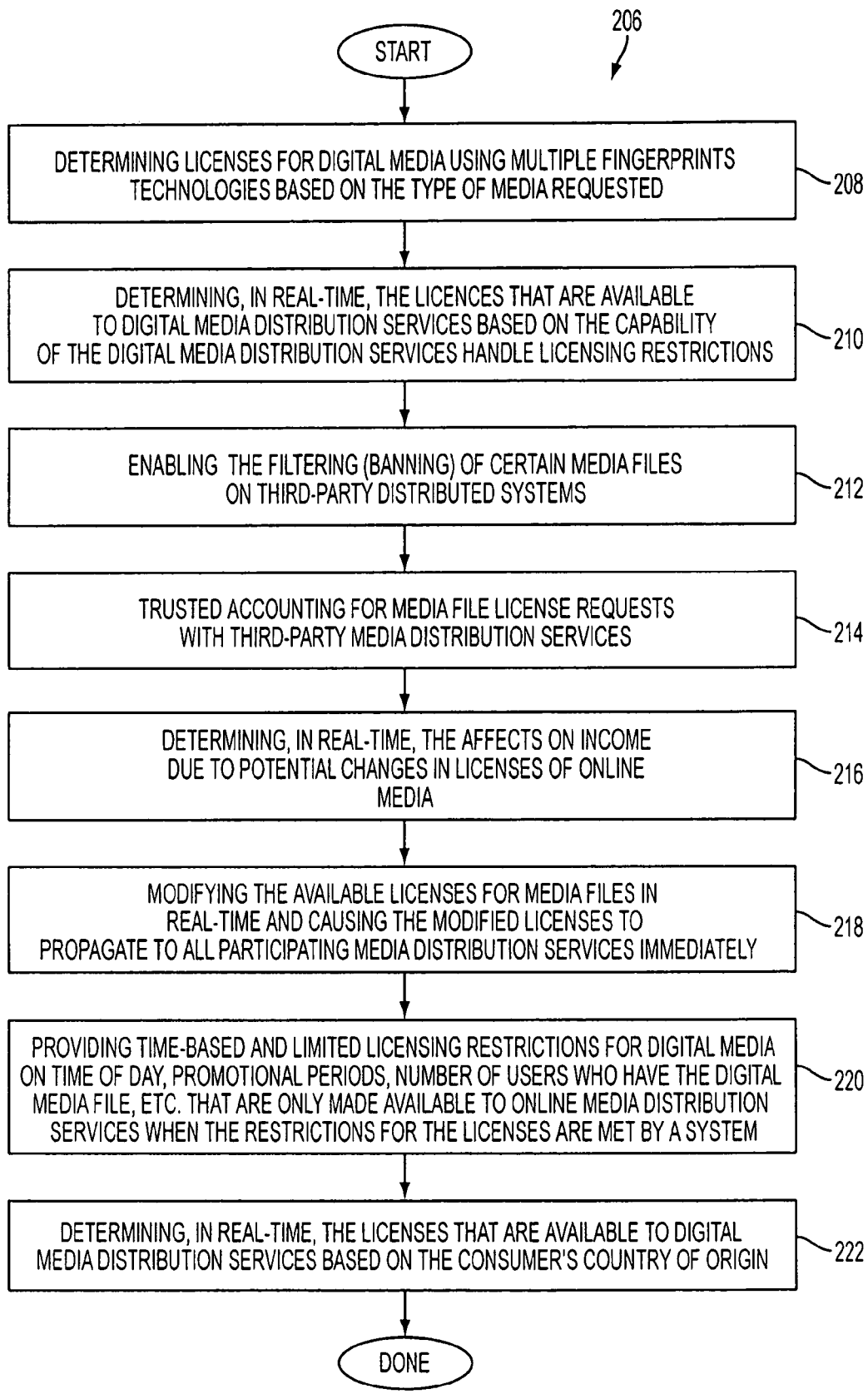
FIG. 11 illustrates a method for controlling access to content.

The exemplary system 176 provides numerous methods that allow both users and rights-holders to interact with the database 188. FIG. 11 illustrates an exemplary process 206 provided by the system 176. As described above, the modules set forth in the processes described herein may be enacted in a parallel (simultaneous) or serial (one at a time) manner. In module 208 the system determines licenses for digital media using multiple fingerprint technologies based on the type of media requested. In module 210 it is determined, in real-time, the licenses that are available to digital media distribution services based on the capability of the digital media distribution services to handle licensing restrictions. In module 212 the system enables the filtering (banning) of certain media files on third-party distributed systems. In module 214 the system enacts trusted accounting for media file license requests with third-party media distribution services. In module 216 it is determined, in real-time, the effects on income due to potential changes in licenses of online media. In module 218 the system modifies the available licenses for media files in real-time and causing the modified licenses to propagate to all participating media distribution services immediately. In module 220 the system provides time-based and limited licensing restrictions for digital media based on time of day, promotional periods, number of users who have the digital media file, etc. that are only made available to online media distribution services when the restrictions for the licenses are met by a system. In module 222 the system determines, in real-time, the licenses that are available to digital media distribution services based on the consumer's country of origin. The processes in the above modules are further enhanced by the interfacing techniques of the present invention as shown in FIGS. 23-33.

Figure 12:
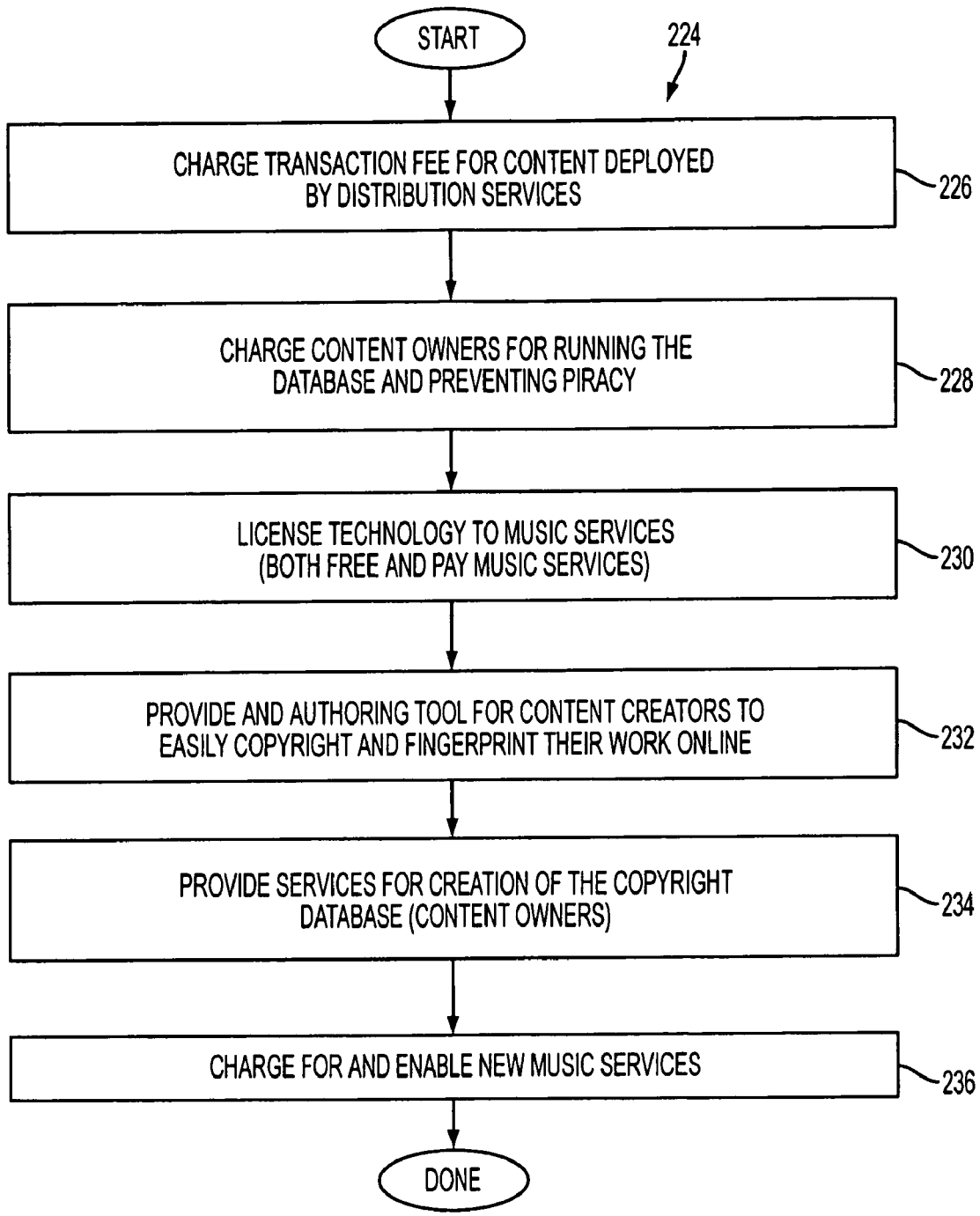
FIG. 12 illustrates a method for billing rights-holders of content.

In addition to providing services to both users and rights-holders, the exemplary system 176 provides additional methods to generate revenue. FIG. 12 illustrates an exemplary method 224, wherein the system collects income from a variety of sources. In module 226 the system charges transaction fees for content deployed by distribution services. In module 228 the system charges content owners for running the database and preventing piracy. In module 230 the system licenses technology to music services for both free and pay music services. In module 232 the system provides an authoring tool such as an interface for content creators to easily copyright and fingerprint their work online. In module 234 the system provides services for creation of the copyright database to the content owners. In module 236 the system charges for and enables new music services.

Figure 13:
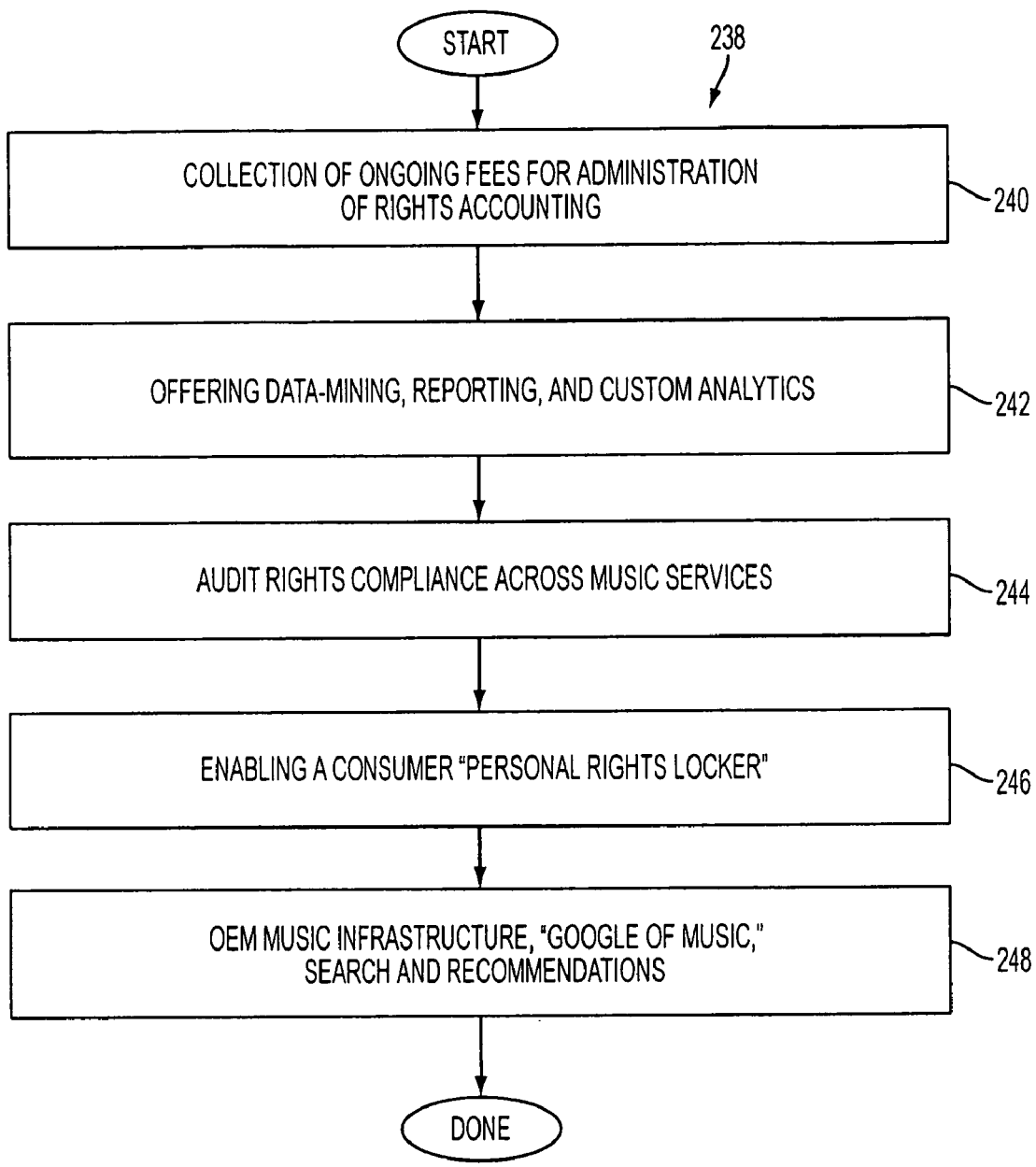
FIG. 13 illustrates another method for billing rights-holders of content.

Regarding the new music services provided by the exemplary system 176, FIG. 13 shows another exemplary process 238. In module 240 the system collects ongoing fees for administration of rights accounting. In module 242 the system offers data-mining, reporting, and custom analytics. In module 244 the system audits rights compliances across music services. In module 246 the system enables a consumer "personal rights locker". In module 248 the system provides an OEM music infrastructure, "Google of music", searches and recommendations.

Figure 14:
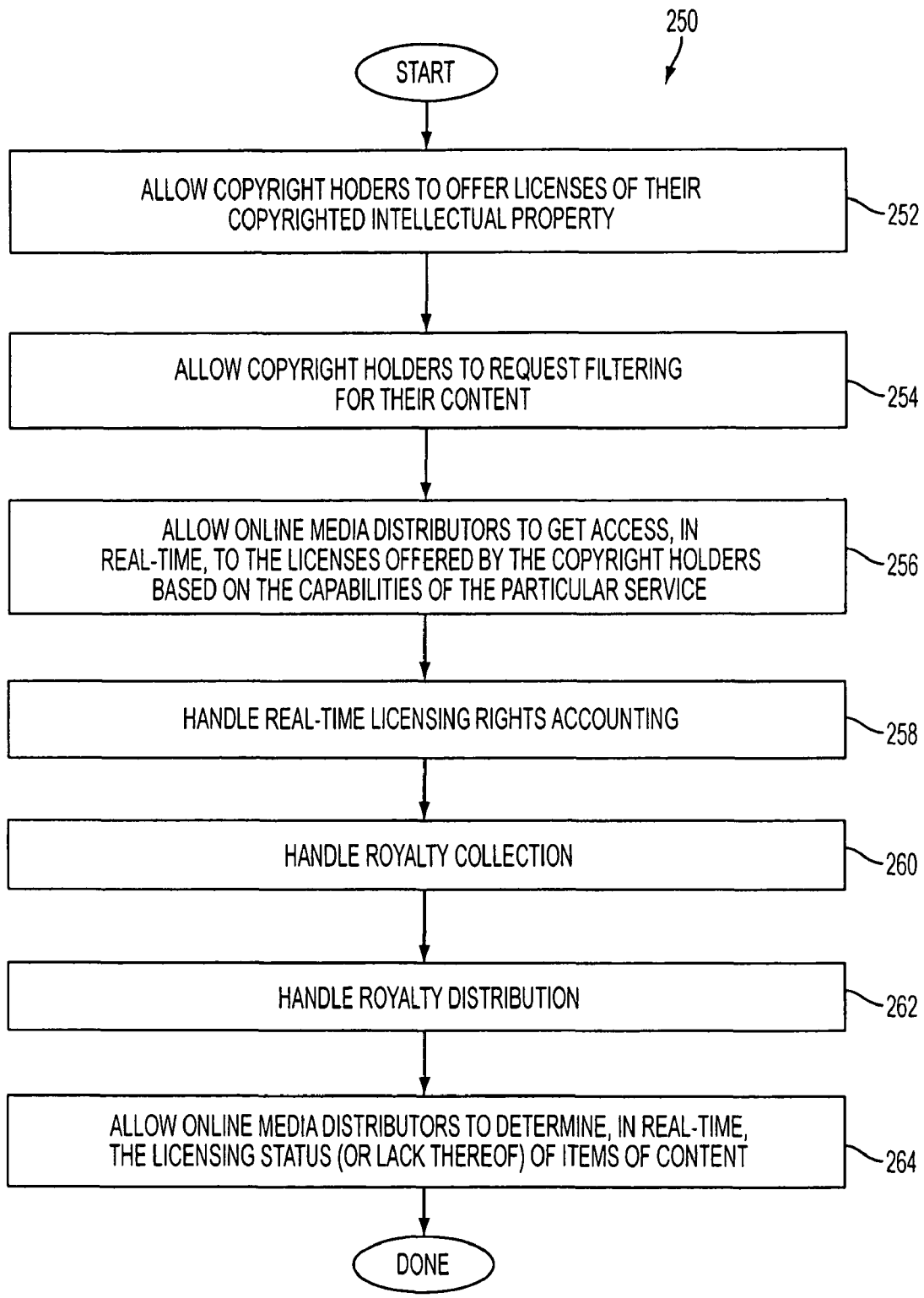
FIG. 14 illustrates a method of royalty collection and distribution to rights-holders of content.

The system 176 also provides another exemplary process 250, to provide a centralized system for the following functions as shown in FIG. 14. In module 252 the system allows copyright holders to offer licenses of their copyrighted intellectual property. In module 254 the system allows copyright holders to request filtering for their content. In module 256 the system allows online media distributors to get access, in real-time, to the licenses offered by the copyright holders based on the capabilities of the particular service. In module 258 the system handles real-time licensing rights accounting. In module 260 the system handles royalty collection. In module 262 the system handles royalty distribution. In module 264 the system allows online media distributors to determine, in real-time, the licensing status (or lack thereof) of items of content.

The exemplary system 176 may eliminate the barrier that prevents content from getting into the media distribution market. At the same time, the system may allow the content industries to leverage the system to filter out, in real-time, the content of illicit distribution services.

Figure 15:
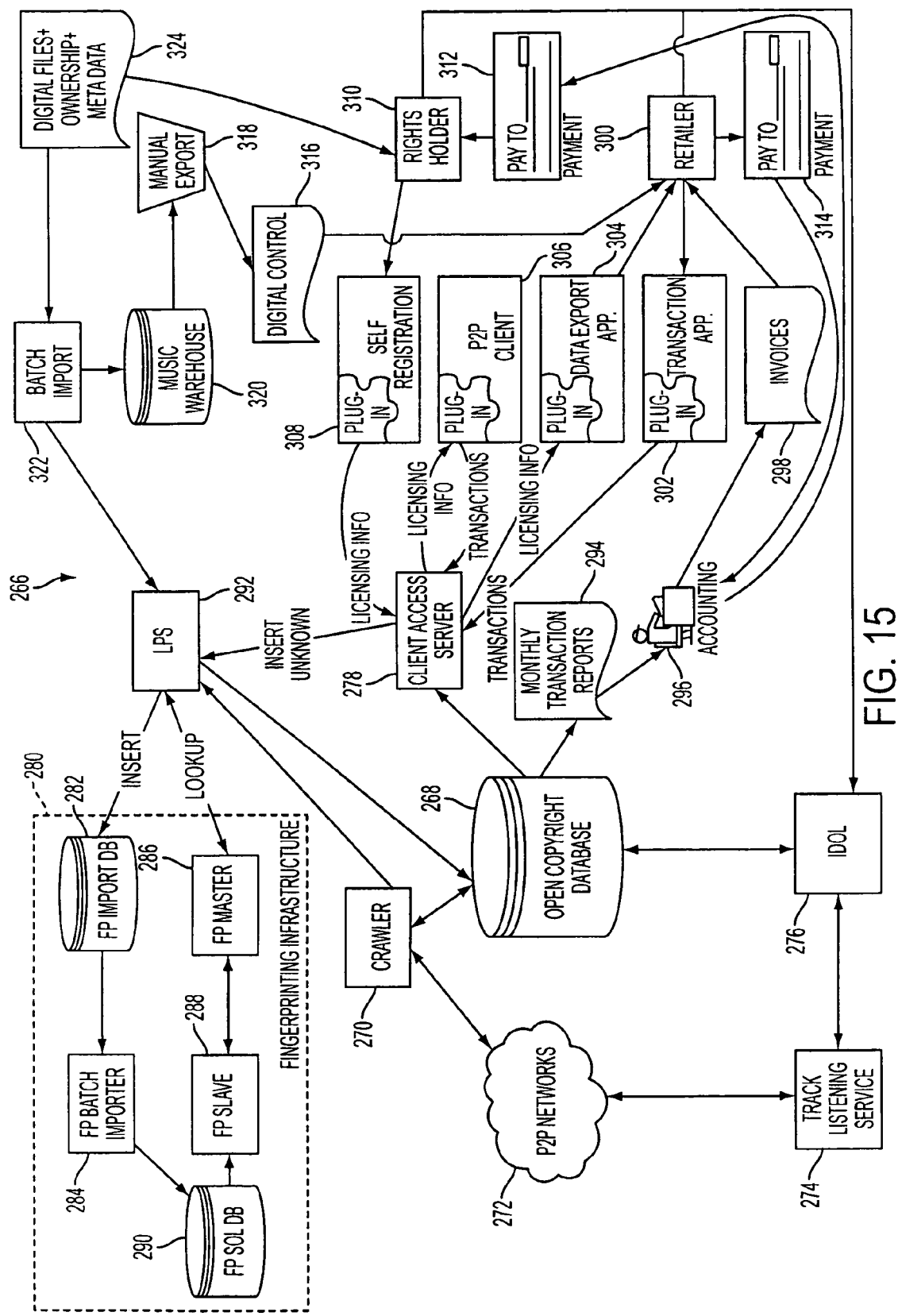
FIG. 15 illustrates an embodiment of a system for tracking, storing and monitoring content for rights-holders and retailers.

FIG. 15 is a block diagram that illustrates another exemplary embodiment of a media file tracking and management system 266. Copyright-holders (rights-holders), such as labels, studios and artists publish on the system (in the database for example), the terms associated with digitally distributing the content owned by the copyright-holders. Distributors of digital media can then secure and pay for the content and media files on the system. This allows the consumer to get the full-breadth of high quality content (digital media) in a seamless and legal manner. In certain embodiments, the system employs a plug-in architecture that enables essentially instant access to a legitimate library of digital media.

According to certain embodiments, an apparatus is configured to accept, in real-time, licensing information about digital media from copyright holders or from owners of licensing rights, and allow third-party media distribution services to select, in real-time, the licenses for digital media that the media distribution services are interested in distributing. The apparatus, in some embodiments, may also be configured to process, in real-time, license requests for digital media from online media distribution services and to account for, in real-time, each license that is accessible. Further embodiments allow for real-time financial analysis and real-time overviews of a rights-holders portfolio of media files.

FIG. 15 shows a digital rights management system 266 that contains a centralized open copyright database 268, a web crawler 270, peer to peer (p2p) networks 272, a track listening service 274, an IDOL 276, and a client access server 278. Fingerprinting infrastructure 280, is comprised of a fingerprint import database 282, a fingerprint batch importer 284, a fingerprint master 286, a fingerprint slave 288, and a fingerprint SQL database 290. The fingerprinting infrastructure 280 is connected to the copyrights database 268 through an LPS 292.

Regarding the business perspective of the system 266, monthly transaction reports 294, are sent to accounting 296, where invoices 298 may be generated. Regarding the retailers 300, and rights-holders 310, they may access the system 266 through the use of interfaces such as transaction applications 302, data export applications 304, and a self-registration interface 308. Rights-holders 310 may receive payments 312 from accounting 296, while retailers make payments 314 to accounting 296.

Regarding the registration of digital files within the system 266, ownership and metadata information 324 are entered by the rights-holders into the system 266. A batch import 322 further loads content into a music warehouse 320 for manual export 318 of digital content 316. In addition to files being registered and fingerprinted by rights-holders, the fingerprinting infrastructure 280 allows files uncovered in the p2p networks 272 to be fingerprinted and entered into the database 268. In this embodiment a media file such as a song is stored in the music warehouse 320, while the metadata file information that allows access to the song (as shown in FIG. 6) is stored in the database 268.

The system 266 operates in real-time or near real-time. For example, a query may be sent by a rights-holder 310 to the open copyright database 268, with a response from the database 268 delivered via the client access server 278 with minimal delay based on results of the query. This may be achieved in part based on local caching of responses at the client access server 278. This may also be achieved through use of known database technology. The rights-holders 310 also have immediate access to the database through the use of numerous interfaces as subsequently described.

Database 268 includes attributes and file information related to the content of the media file. For example, a media file may have attributes for title, author, performer, rights-holders, size/length, type of content, digital fingerprint, rights restrictions, and other attributes. Moreover, a file may have an authorized copy of the content, and the authorized copy may incorporate digital rights management or other restrictive parameters used to implement rights restrictions specified by rights-holders.

When a user on the p2p network 272 requests a media file such as song or other content for download, it may query database 268 and determine restrictions on the content. If the content in question is identifiable in comparison to content for which attributes are stored in the database 268, then other attributes of the content will provide information about restrictions on the content (such as limited copying, play-only versions, limited-use versions for example). These restrictions may then be embedded with the content which is provided for download by the content outlet. Alternatively, an authorized copy of content may be provided, thereby embedding desired restrictions and preserving quality at a certain level. Using the fingerprinting infrastructure 280, the system 266 is also capable of fingerprinting and identifying unauthorized content outlet sources.

Determining the restrictions on content requires an identification of the file and determining who owns or has rights to the content (the rights-holders). The client access server 278 provides interfaces 302, 304, 306 and 308, that allow access to the database 268 by rights-holders 310 and retailers 300. Rights-holders 310 may all use the self registration interface 308 to assert ownership or other rights in content. Preferably, rights-holders 310 provide content which they have rights in, and that content may then be evaluated to determine attributes such as title, type of content, and digital fingerprint. Alternatively, content may be discovered on the Internet or other p2p networks 272, and rights-holders 310 may then use the system interfaces to assert rights in the work embodied in the content so discovered. For example, the crawler 270 may be implemented to traverse links on the World Wide Web and thereby discover content, which may then be evaluated by rights-holders 310 to determine whether anyone has a claim to ownership of the content.

Note, in some embodiments, the interfaces or applications 302, 304, 306, and 308 may be a variety of programmed interfaces that may operate in a variety of ways. For example, it may be a graphical user interface, allowing for entry of information about content, such as attributes including author, title, performer, for example. FIGS. 23-33 also provide exemplary interface screens provided by the system 266. Information entered through these interfaces may be used to query database 268 to determine if such content is known to the database 268, or it may be used to enter these attributes into the database 268. The system 266 is also implemented for some form of bulk or batch data entry 322, whereby a stream or file of data is provided to the interfaces related to numerous separate or related pieces of content, either for query purposes or for data entry purposes for example. Moreover, the interfaces also allow for entry of actual content into the database 268. Whether actual content or a digital fingerprint of the content (or both) is stored, querying the database 268 based on content may occur by comparing digital fingerprints.

Another feature of the system 266 is the ability to handle and resolve situations where a plurality of rights-holders 310 may assert multiple conflicting claims of ownership to a single media file of content. Not all multiple claims will conflict. For example, authorship and performance of a song may both provide copyright rights for a separate author and performer, without an outright conflict. That the two rights-holders 310 disagree about how to handle content is not the same as a conflict where two entities purport to be the owner of an authorship copyright on a song. When the same rights are asserted by multiple parties, some form of conflict resolution may be necessary. Royalties may be held in trust, or the song (or other content) may be restricted from any copying. Alternatively, ownership conflicts may be initially decided based on a reputation rating maintained by the claim interface, with high reputation rankings assigned to reputable companies or companies having previously proven content ownership, and low rankings assigned to those having asserted false claims or with little prior experience. Preferably, an appeal process may be implemented to allow for human intervention after a determination based on reputation rankings occurs. For example, a reputable label may assert claims to its catalog as it stood on a particular date. Another small label may assert claims to a set of songs within this catalog. The reputations may be such that the reputable label wins. However, the small label may be able to show an assignment of rights to a human and thus prove its claims. Alternatively, the small label may be acting improperly, and thus correctly have its claims rejected. FIGS. 37-48 detail exemplary processes of rights and retail interactions with the system 266.

Further operations and features of the system 266 are subsequently described referencing the processes and the interface screen shots provided by the system shown in FIGS. 16-48. Each module or step in the processes described below would be enacted by the system of FIG. 15. Note that not all of these modules may be required for a working method, as a useful method may be implemented using some subset of the modules described.

Figure 16:
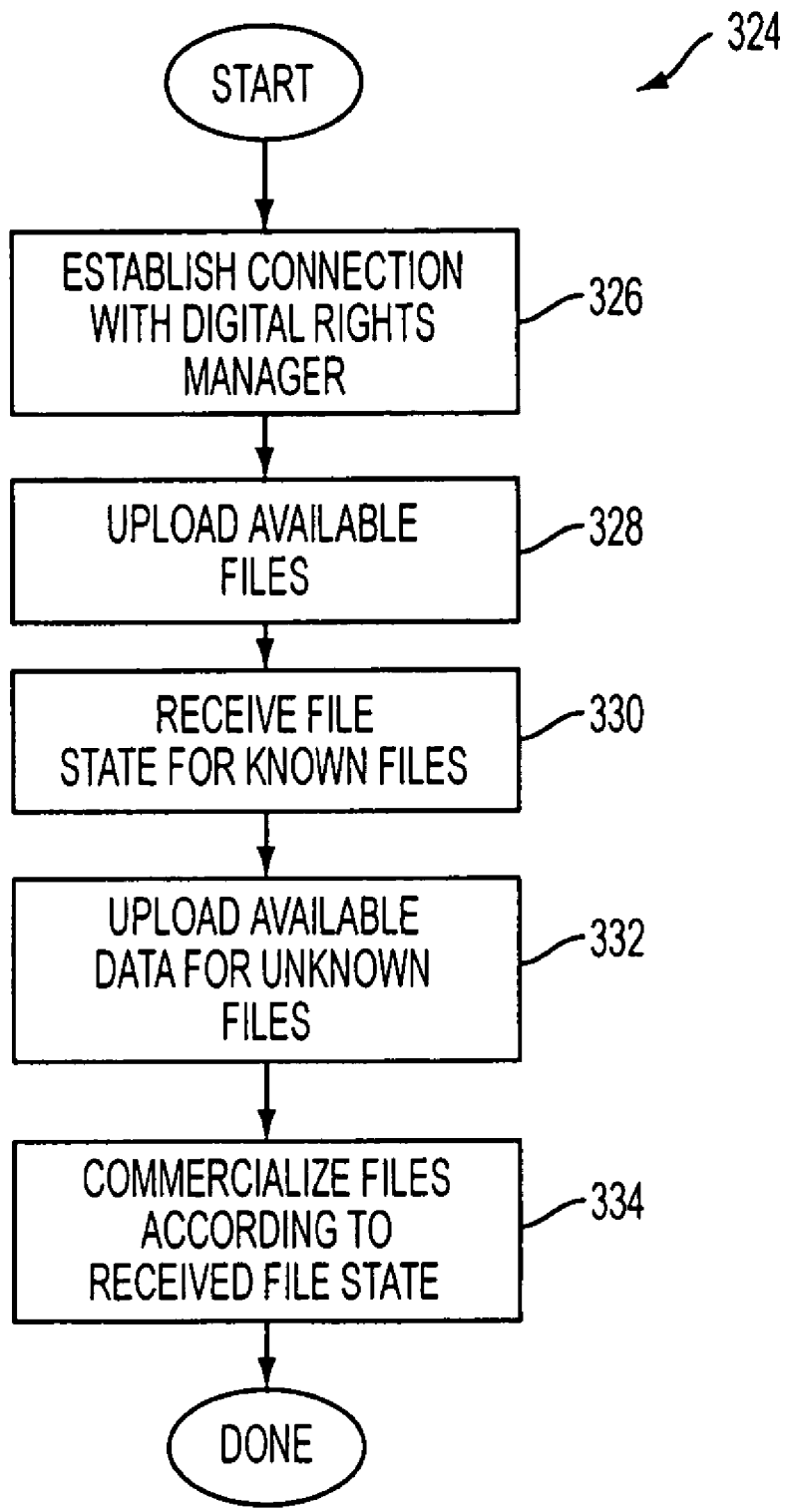
FIG. 16 illustrates an embodiment of a method of determining rights-holders of content.

FIG. 16. illustrates an exemplary process for receiving media files within the system 266. In module 326 a connection is established with a digital rights manager. In module 328 the process uploads available files. In module 330 the process receives file states for known files. In module 332 the system uploads available data for known files. In module 334 the process commercializes files according to received file state. This process may upload the files in a batch manner from a record label or may upload individual files from an individual song writer for example.

Figure 17:
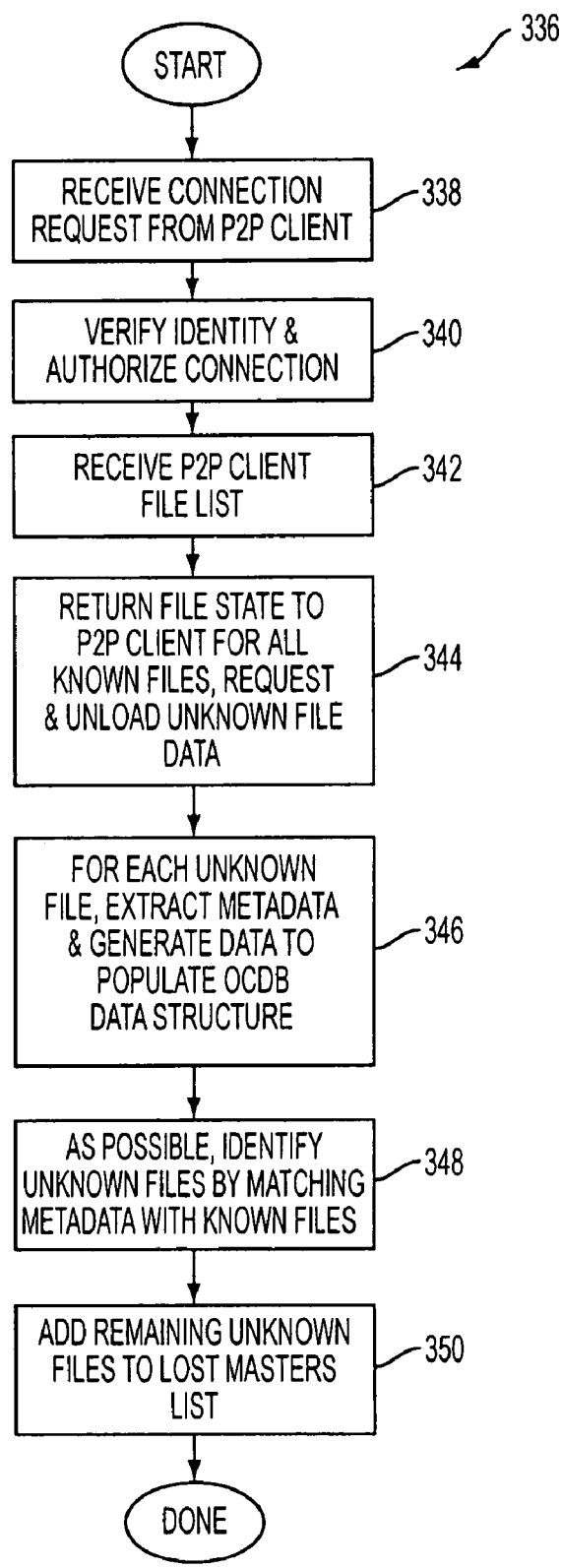
FIG. 17 illustrates an embodiment of a method of populating an open copyright database of content.

FIG. 17 illustrates another exemplary process 336 implemented by the digital rights system 266. In module 338 the process receives a connection request from a P2P client. This may be prompted by the sale of a media file for example. In module 340 the process verifies identity and authorizes connections. In module 342 the process receives a P2P client file list. In module 344 the process returns the file state to a P2P client for all known files, and then requests and uploads unknown file data. In module 346 for each known file, the system extracts metadata and generates data to populate the OCDB data structure. In module 348 the system as possible, identifies unknown files by matching metadata with known files already stored in the OCDB. In module 350 the system adds the remaining unknown files to the lost masters list. In this manner the system automatically updates the database regarding media file information and therefore allows real-time processing and tracking of digital files. This process also creates a "missing masters" list which is a list of digital files that do not contain asserted rights. This missing masters list is subsequently used and provided to rights-holders as potentially owned material as set forth and described in FIG. 21.

Figure 18:
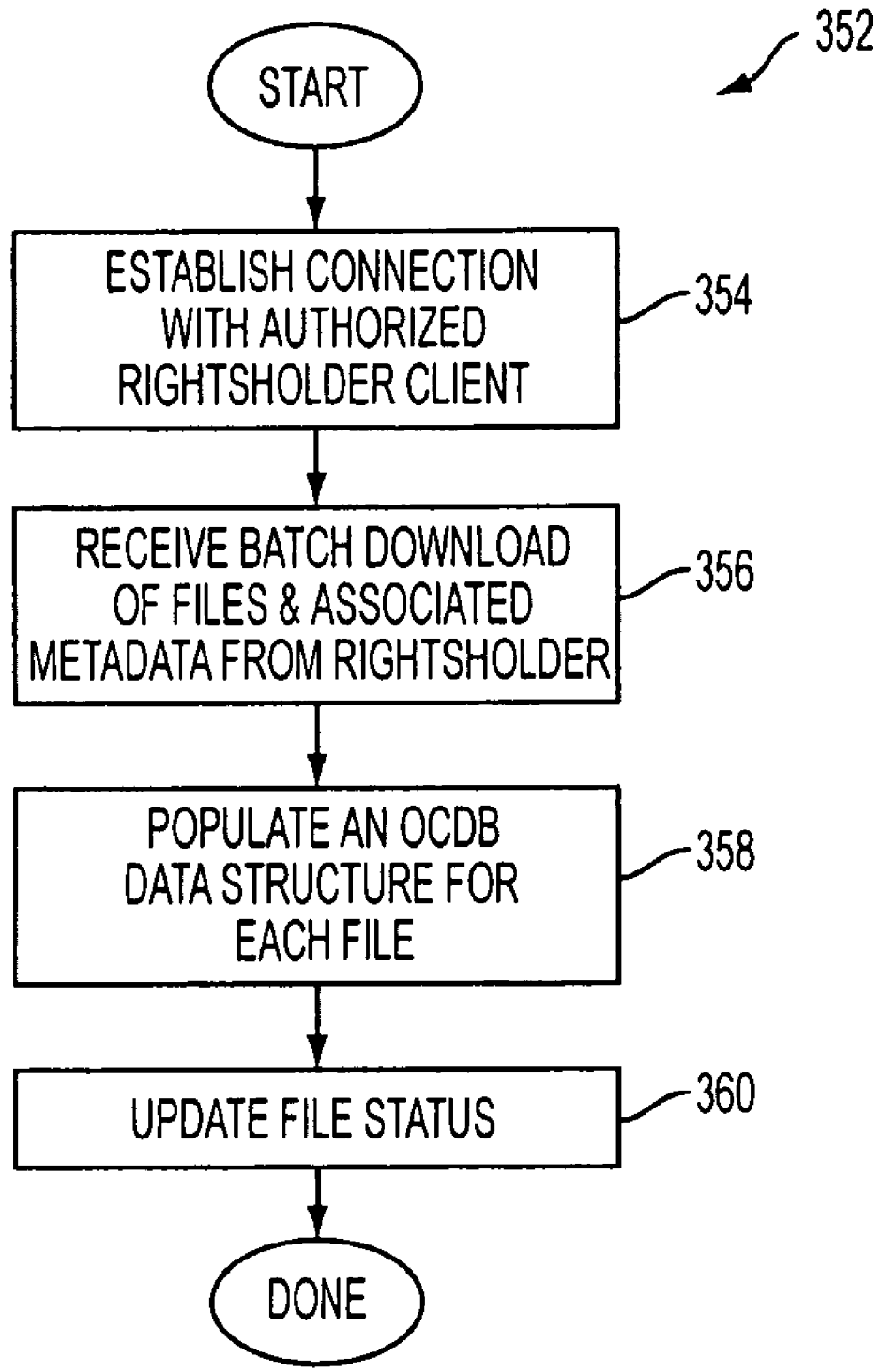
FIG. 18 illustrates an embodiment of a method of loading data into a database of content.

FIG. 18 shows another exemplary process 352 enacted by the present system. In module 354 the process establishes a connection with an authorized rights-holder client. In module 356 the system receives a batch download of files and associated metadata from a rights-holder. In module 358 the system populates the OCDB data structure for each file. In module 360 the system then updates the file states.

Figure 19:
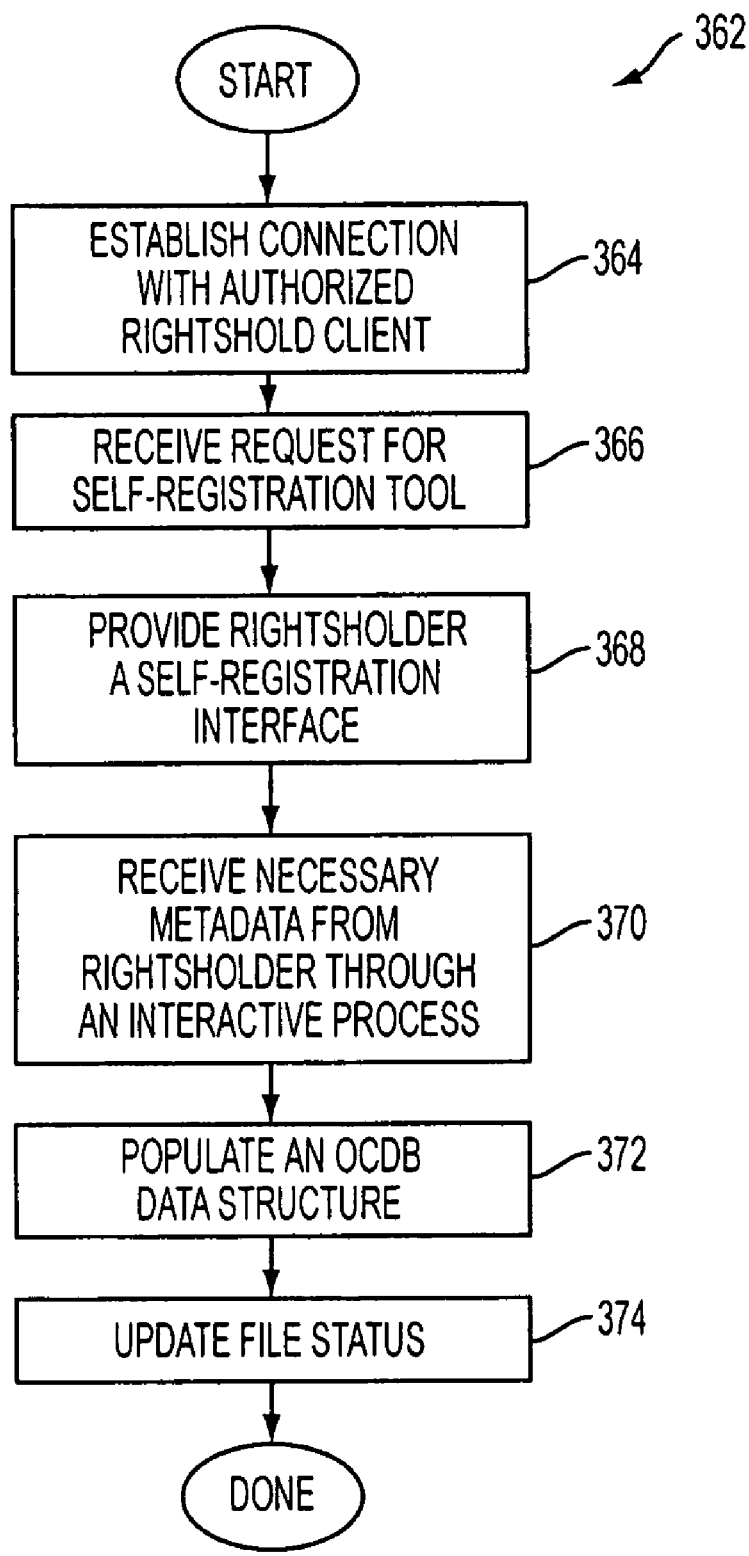
FIG. 19 illustrates an embodiment of a method of providing a self-registration interface for rights-holders of content.

FIG. 19 shows another exemplary process 362 enacted by the present system. In module 364 the process establishes a connection with an authorized rights-holder client. In module 366 the process receives a request for a self-registration tool. In module 368 the process provides the rights-holder a self-registration interface. In module 370 the process receives the necessary metadata from the rights-holder through an interactive process. In module 372 the process populate the OCDB data structure. In module 374 the process then updates the file status.

Figure 20:
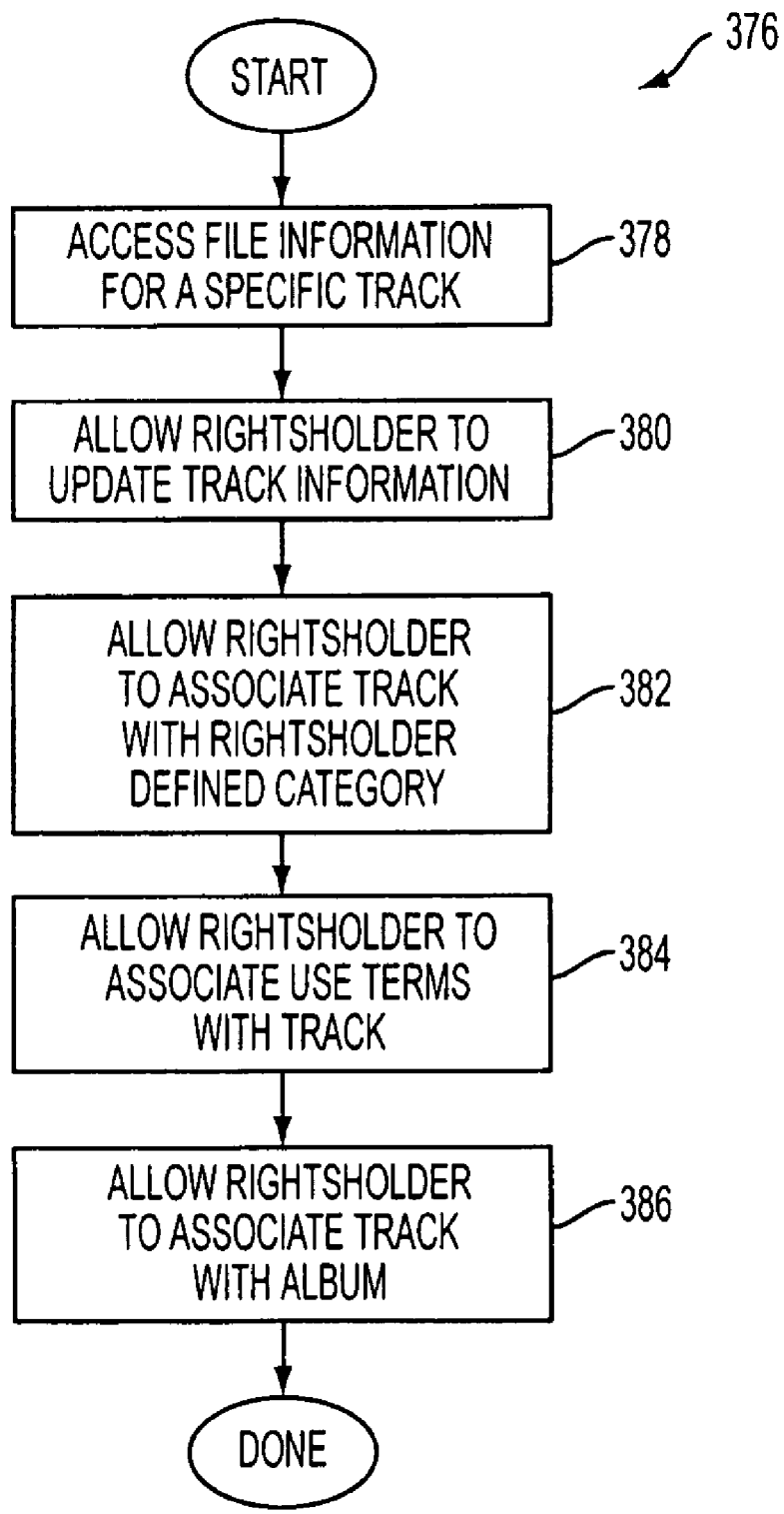
FIG. 20 illustrates an embodiment of a method of interacting with a database of content.

FIG. 20 shows another exemplary process 376 enacted by the present system. In module 378 the system accesses file information for a specific track. In module 380 the system allows a rights-holder to update track information. In module 382 the system allows the rights-holder to associate the track with a rights-holder defined category. In module 384 the system allows the rights-holder to associate use terms with the track. In module 386 the system allows the rights-holder to associate the track with an album. Associating a specific track with an album is another way to ensure files are correctly tracked and monitored by a rights-holder. The user defined categories also enable a rights-holder to search and track files in a customized manner.

Figure 21:
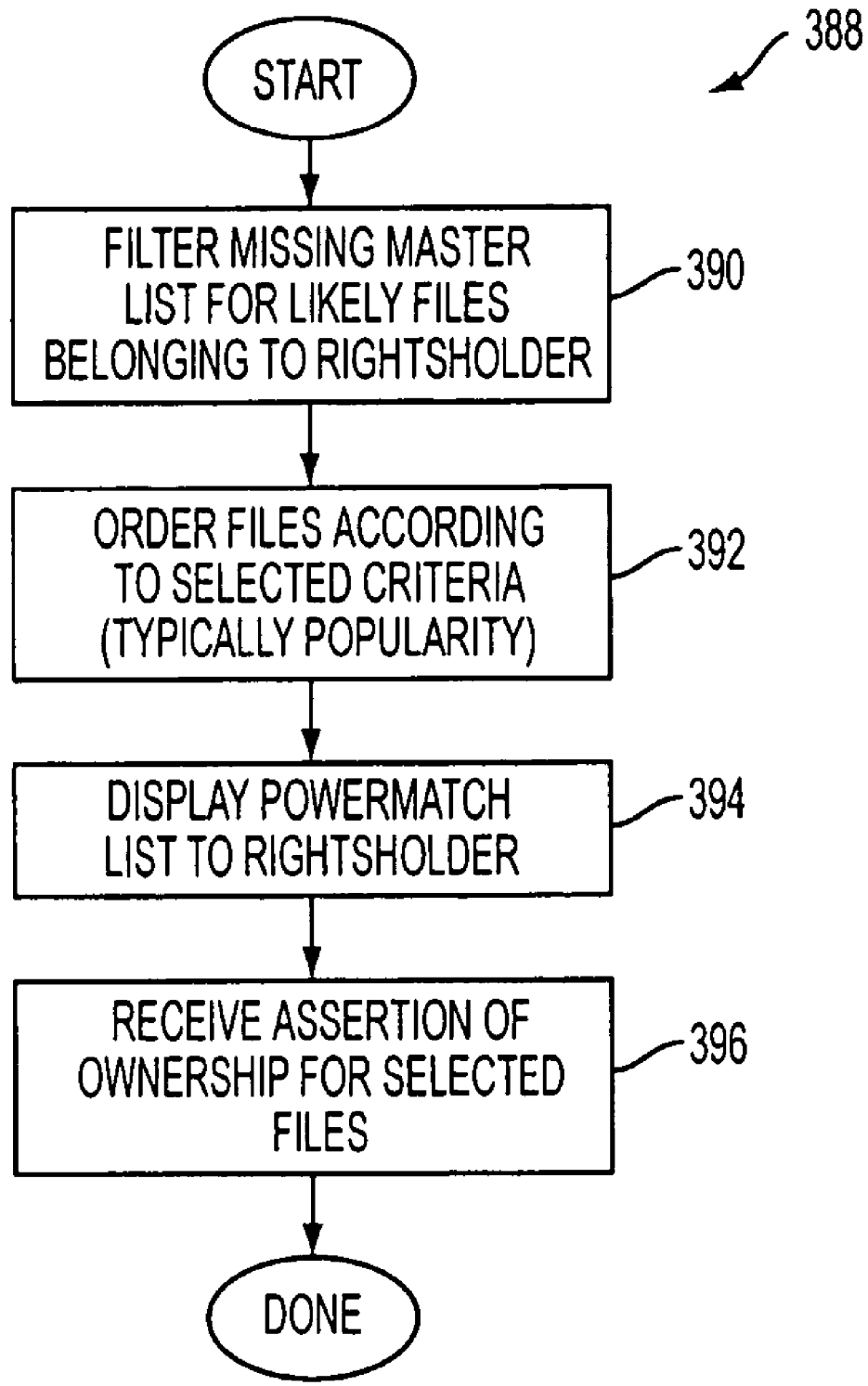
FIG. 21 illustrates an embodiment of a method of matching and comparing files within a database of content.

FIG. 21 shows another exemplary process 388 enacted by the present system. In module 390 the process filters the missing master list for likely files belonging to rights-holder. The filtering process is accomplished by comparing the metadata for files. For example song titles and artist names similar to those owned by a rights-holder would be likely to be owned by a rights-holder. In module 392 the process orders the files according to a selected criteria (typically popularity). In module 394 the process displays a power match list to the rights-holder. In module the system receives assertions of ownership for the selected files. This feature of the system automatically searches for and provides a list of potentially owned files to rights-holders. This process 388 therefore enables rights-holders to capture lost income. In order to further enhance the power matching process 388 of the present system, a track listening service is provided to play a selected track to a user so they can be assured that they do own the rights to a selected track.

Figure 22:
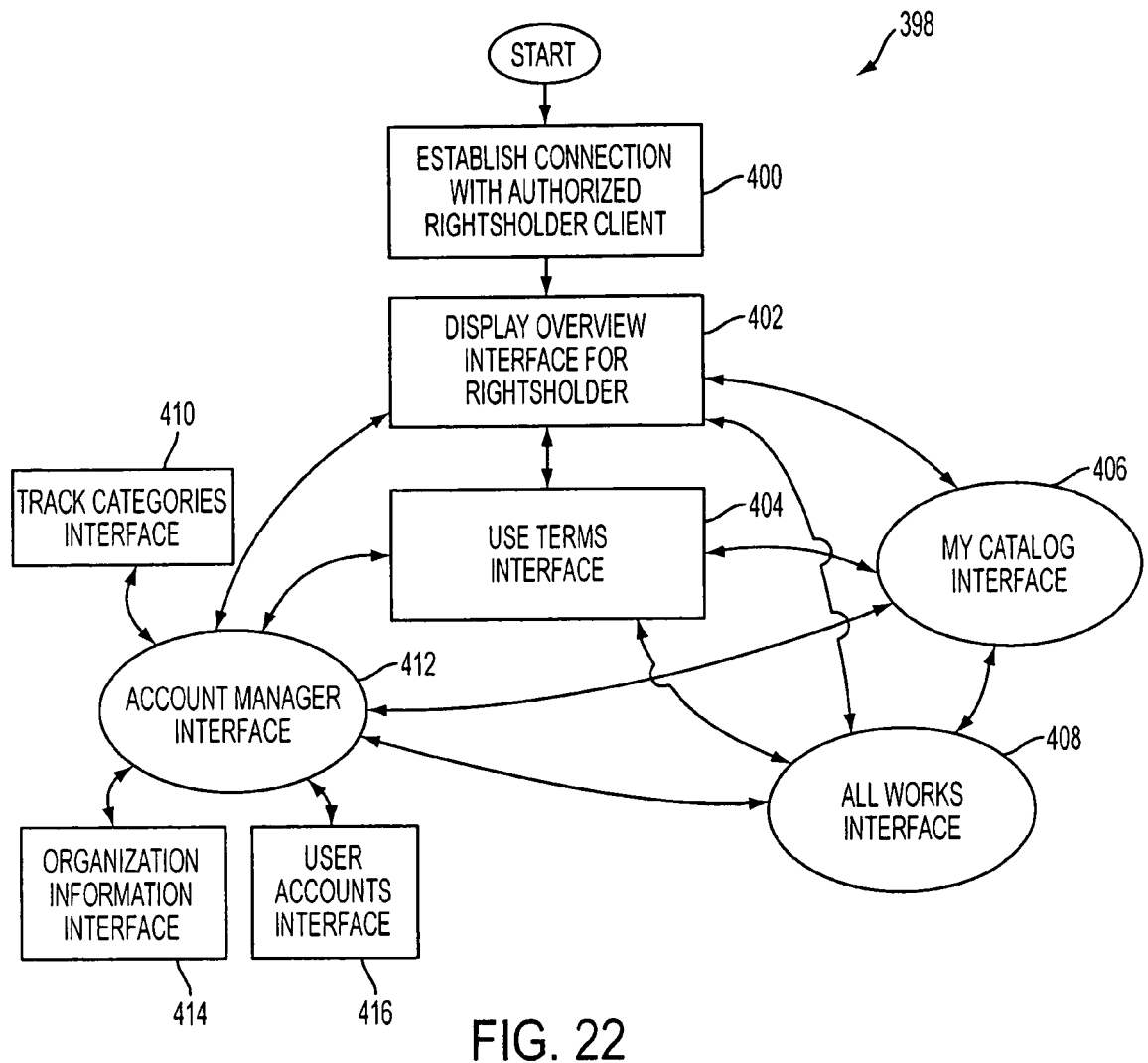
FIG. 22 illustrates an embodiment of a method of providing a plurality of interfaces to rights-holders of content.

FIG. 22 shows another exemplary process 398 enacted by the present system to provide all the necessary interfaces to the system. In module 400 the system establishes a connection with an authorized rights-holder client. In module 402 the system displays an overview interface for rights-holder. In module 404 the system displays a use terms interface. In module 410 the system provides a track categories interface. In module 406 the system provides a my catalog interface. In module 412 the system provides an account manager interface. In module 408 the system provides an all works interface. In module 414 the system provides an organization information interface. In module 416 the system provides a user accounts interface. The rights-holder is able to easily enable each of the interface screens as described above by simply clicking on selected elements within each interface screen. Each of the interfaces mentioned above is subsequently described referencing FIGS. 23-33 that show screen-shots of these interfaces.

Figure 23:
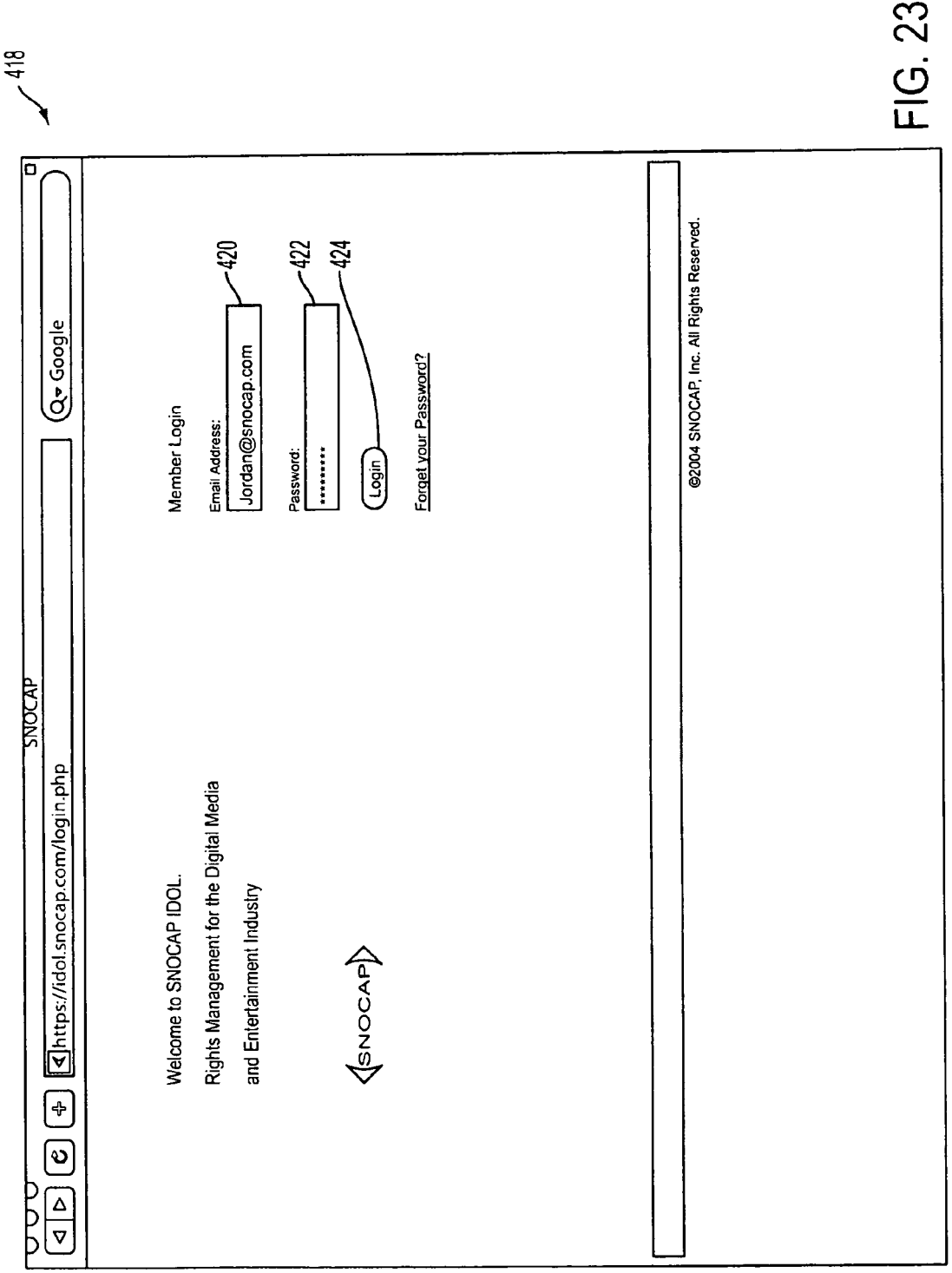
FIG. 23 is a screen shot provided by an interface of one embodiment of the present system.

FIG. 23 is an example of a screen-shot 418 provided by the interfaces of the system. A screenshot refers to the display presented to a user or rights-holder by the system using a computer monitor or display as shown in FIG. 9 for example. FIG. 23 shows a login page 418 for a registered rights-holder of the system. In this example, the rights holder enters their email address 420, their password 422, and then clicks on the login button 424. This provides a secure interface for the rights-holder to access their portfolio of tracks and register their digital media files. Once in the system a user may access any of the other subsequently described interfaces to enter data into the database and enact the system features.

Figure 24:
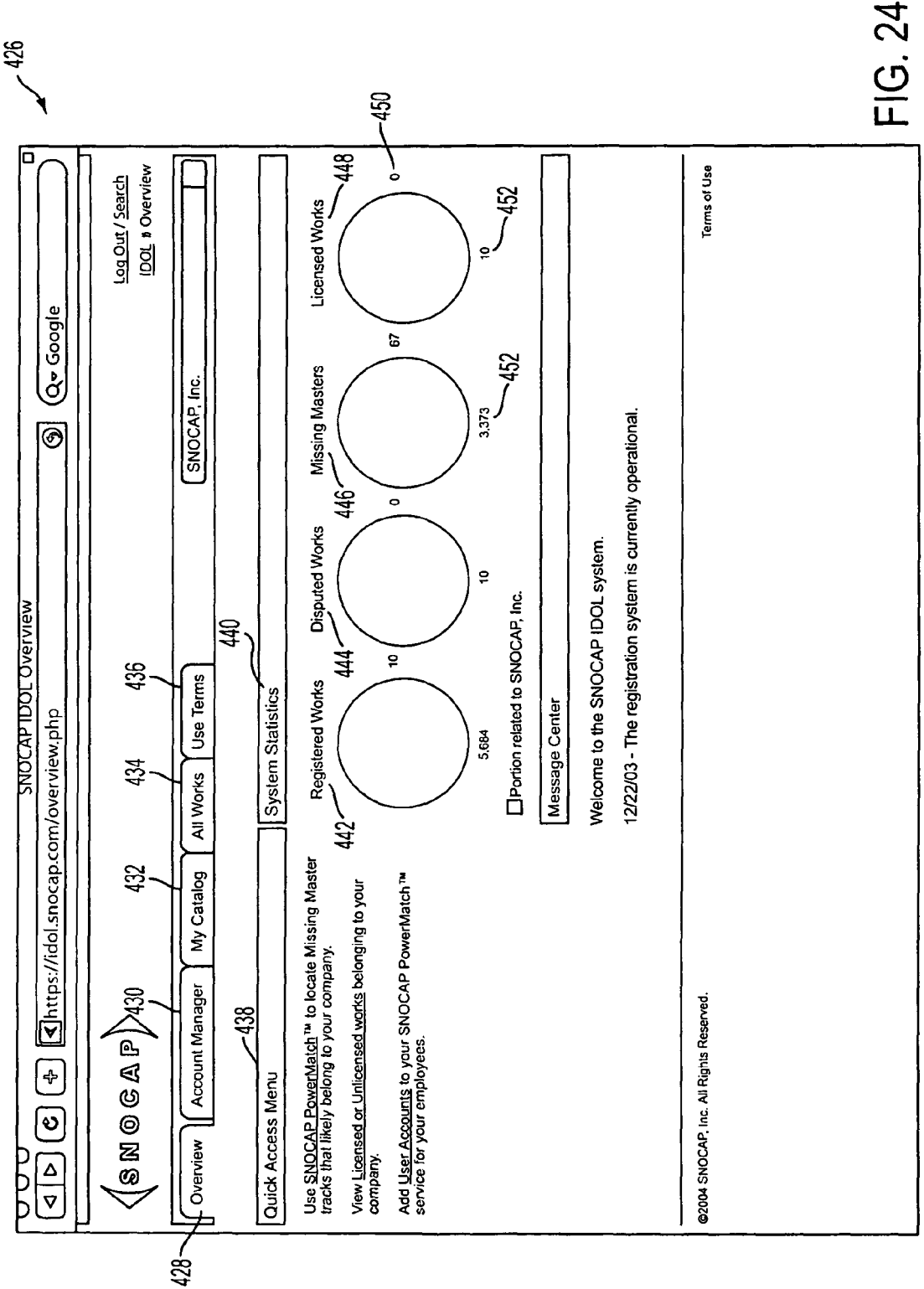
FIG. 24 is a screen shot provided by an overview interface of one embodiment of the present system of determining rights-holders of content.

FIG. 24 shows a screen-shot of an overview page 426 for a rights-holder. The options available to the rights holder are "Overview" 428, "Account Manager" 430, "My Catalog" 432, "All Works" 434, and "Use Terms" 436. In this example, the overview page 426 also offers rights holder a quick access menu of features 438 and system statistics 440. The system statistics 440, contains registered works 442, disputed works 444, missing masters 446 and licensed works 448. Each category 442-448 within the system statistics contains 2 numbers 450 and 452, one (452) that refers to the total number and the other (450) that refers to the active number within each specific category 442-448.

Each of the "Overview" 428, "Account Manager" 430, "My Catalog" 432, "All Works" 434, and "Use Terms" 436 options may be enabled by clicking on the desired link. The overview page 426 gives the rights-holder real-time information relating to the individually owned media files and the total files contained in the system. The account manager feature 430 enables the financial analysis and information to be presented to the user. The my catalog feature 432 allows access to the owned media files for interaction with the rights-holder. The all works feature 434 allows the rights-holder to access and search all the registered works within the system. The use terms function provides interfaces for entering rules and terms of use for a media file for example. All these functions are described in more detail referencing the figures below.

The quick access menu 438 offers the rights-holder choices of features such as Power Match and viewing licensed and unlicensed works. These features provide the user with a means to monitor the state of media files and determine if income is being lost due to lost royalties from the sale of files which a rights-holder may own. The features of the quick access menu are also subsequently described in greater detail.

Figure 25:
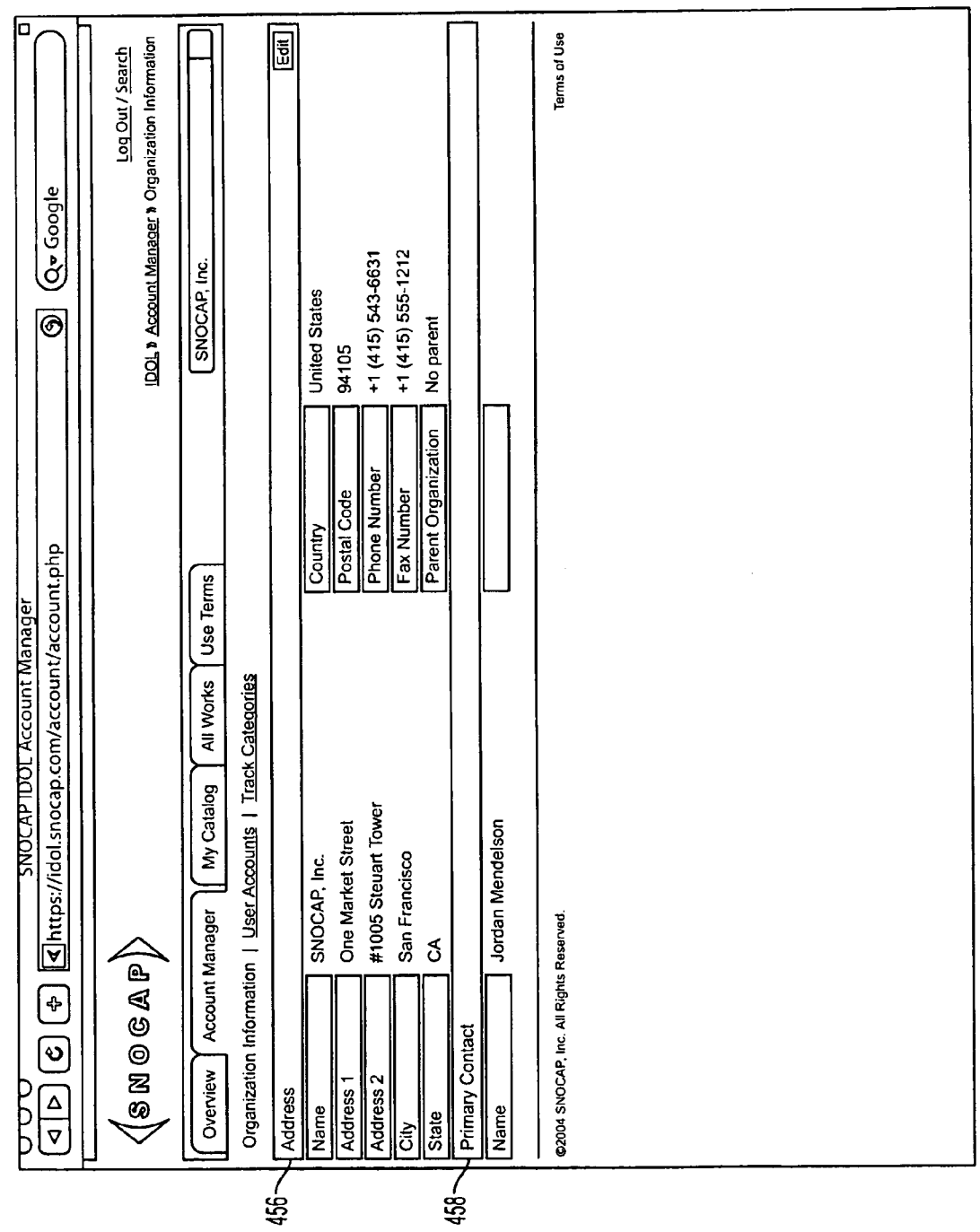
FIG. 25 is a screen shot provided by an account manager interface of one embodiment of the present system.

FIG. 25 is an example of a screen-shot 454 provided by the interfaces of the system. FIG. 25 shows an "Account Manger" page 454 for a rights-holder. In this example, the Account Manager page 454 displays the address data 456 and contact data 458 for the rights holder. The address data includes the company name, address, phone number, fax number and other pertinent data. In this example the company name is Snocap Inc. and the contact person is "Jordan Mandelson". This page 454 may be used when a rights-holder needs to contact another rights-holder for example. Having a centralized database of rights-holder information leads to quick contact and resolution of media file disputes.

FIG. 26 is an example of a screen-shot 460 of the user accounts 462 within the "Account Manger" interface for a rights-holder. In this example, the name 464, permissions 466, department 468, phone 470 and email 472 of each person on the account is displayed. This page therefore shows all the individual users who have accounts with the Snocap Inc. company. The centralized database feature of the present system allows for quick contact of rights-holders within the system.

Figure 27:
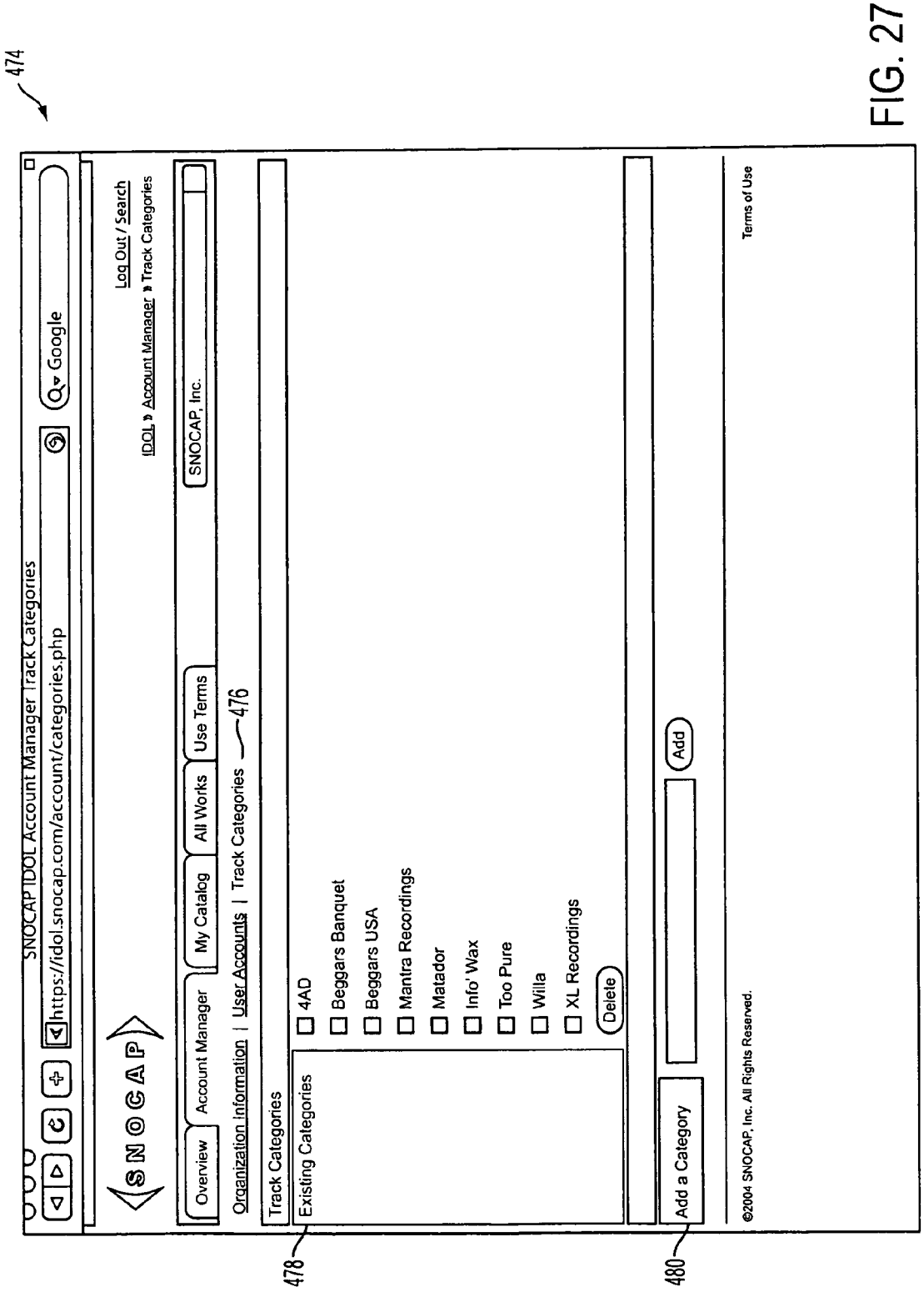
FIG. 27 is a screen shot provided by a track categories interface of one embodiment of the present system.

FIG. 27 is an example of a screen-shot 474 of the "Track Categories" 476 within the "Account Manger" interface for a rights-holder. In this example, the Existing Categories 478, are displayed to the rights holder. This allows the user to quickly search their tracks on a category basis. The "Add a Category" text box 480 also allows the rights-holder to enter new types of categories in which the tracks may be described or categorized. For example, a rights-holder may desire data relating to all the royalties obtained from the sales of media file movie soundtracks within the system. This interface screen 474 would allow the user to create a "soundtrack" category and assign this to each soundtrack file entered into the database. Subsequently the rights-holder may search their personal media files for all tracks or files that have been labeled as "soundtracks".

Figure 28:
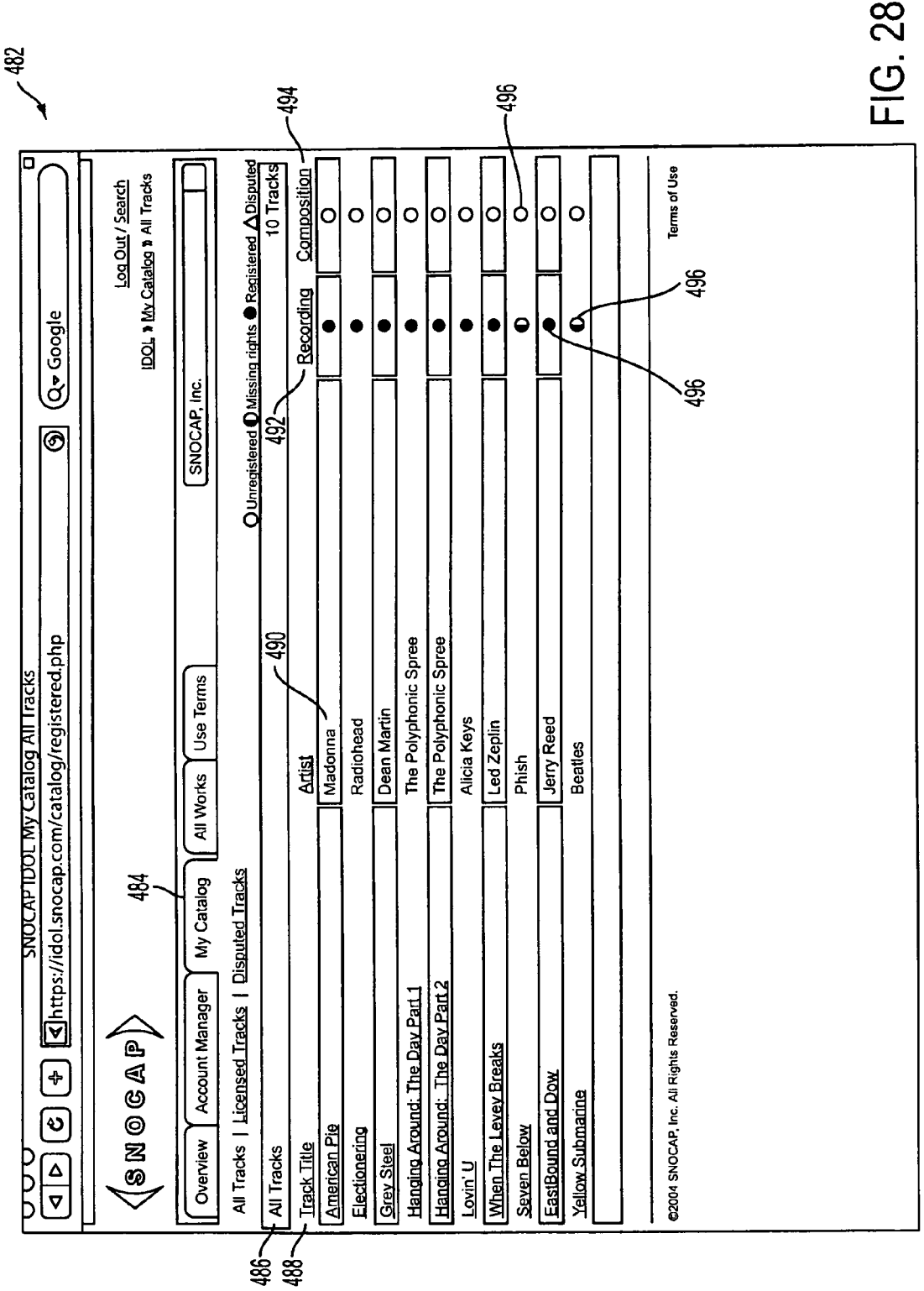
FIG. 28 is a screen shot provided by a catalog interface of one embodiment of the present system.

FIG. 28 is an example of a screen-shot 482 provided by the interface of the system. FIG. 28 shows a "My Catalog" page 484 for a rights-holder. In this example, the page 484 displays an "All Tracks" feature 486. This includes the track title 488, the artist of the media track 490, the recording 492, and the composition 494. Circles 496 are filled-in with marks to display the state of the rights as displayed above. In this example, a fully shaded in circle represents that the rights to the specific track have been registered, a blank circle indicates that the rights are unregistered, a half-shaded circle represents the rights are missing, and a triangle within the circle represents that the rights to the specific track are currently being disputed. This interface page 482 therefore automatically displays to the operator their current catalog of rights and their current status. Each media track is shown as a URL that may be clicked on by the user or rights-holder to obtain further details regarding the specific track as shown in subsequent figures.

FIG. 29 is an example of a screen-shot 498 that provides further information regarding the tracks displayed in FIG. 28 under the My Catalog heading 500. FIG. 29. shows a track information 502 that contains title, "Seven Below", performed by an artist "Phish", with a duration of 8:31 with some identification information. Within the Track Categories information 504, information that a rights-holder enters to aid in managing their portfolio of works. For example the information may include the type of music such as Rock or Rap, what rules if any should be applied to the track, when the track was registered etc. The applicable use terms 506 stores the information that relates to the rules by which the track must be used. For example, do not sell the track in Japan, or do not sell this track on Napster. If there are no rules, then the track should be blocked for transactions on the p2p network. The album information 508 stores the album that contains the media track. Also included in track information 502 are links that allow access to the Recording Rights and the Composition Rights.

FIG. 30 is an example of a screen-shot 510 provided by the interface of the system that shows "All Works" 512 contained in the system. In this example, the rights-holder may select between "Power Match Tracks", "Missing Masters" and "All Tracks". In this example the user has selected the Power-Match Tracks 514. Under the Power Match selection, are Track titles 516, Artist name 518, and the Popularity of the track 520. As described above the Power Match tracks list 514 is comprised of files that are potentially owned by a rights-holder. This list of tracks may be formed from tracks uncovered by a crawler on the peer to peer networks. The tracks are ordered by popularity, as the most popular tracks represent the greatest loss of royalty income to a rights-holder if in fact they do own the track. The system automatically provides this list of files to the rights-holder. By clicking on the track link, more information is provided regarding the track. The track itself may also be searched for and downloaded so that a rights-holder may play the track to ensure that they in fact do own the rights to the track.

Figure 31:
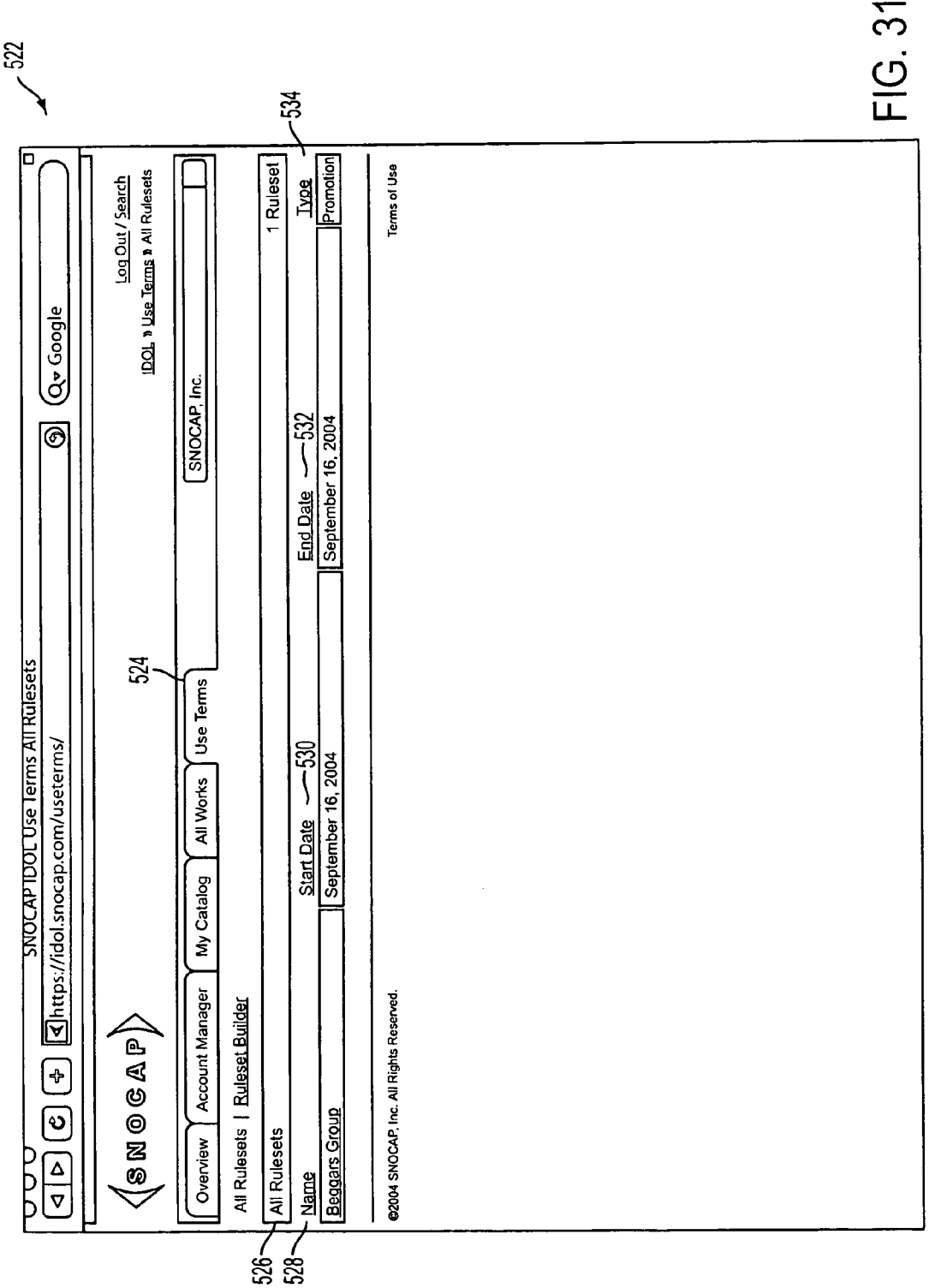
FIG. 31 is a screen shot provided by an interface of another embodiment of the system of determining rights-holders of content.

FIG. 31 is an example of a screen-shot 522 provided by the interface of the system. FIG. 31 shows a "Use Terms" page 524 for a rights-holder. In this example, the All Rulesets 526 are displayed. Name 528, start date 530, end date 532 and type 534. An example of use terms would be a restriction that the track may not be sold until Jan. 1, 2005.

Figure 32:
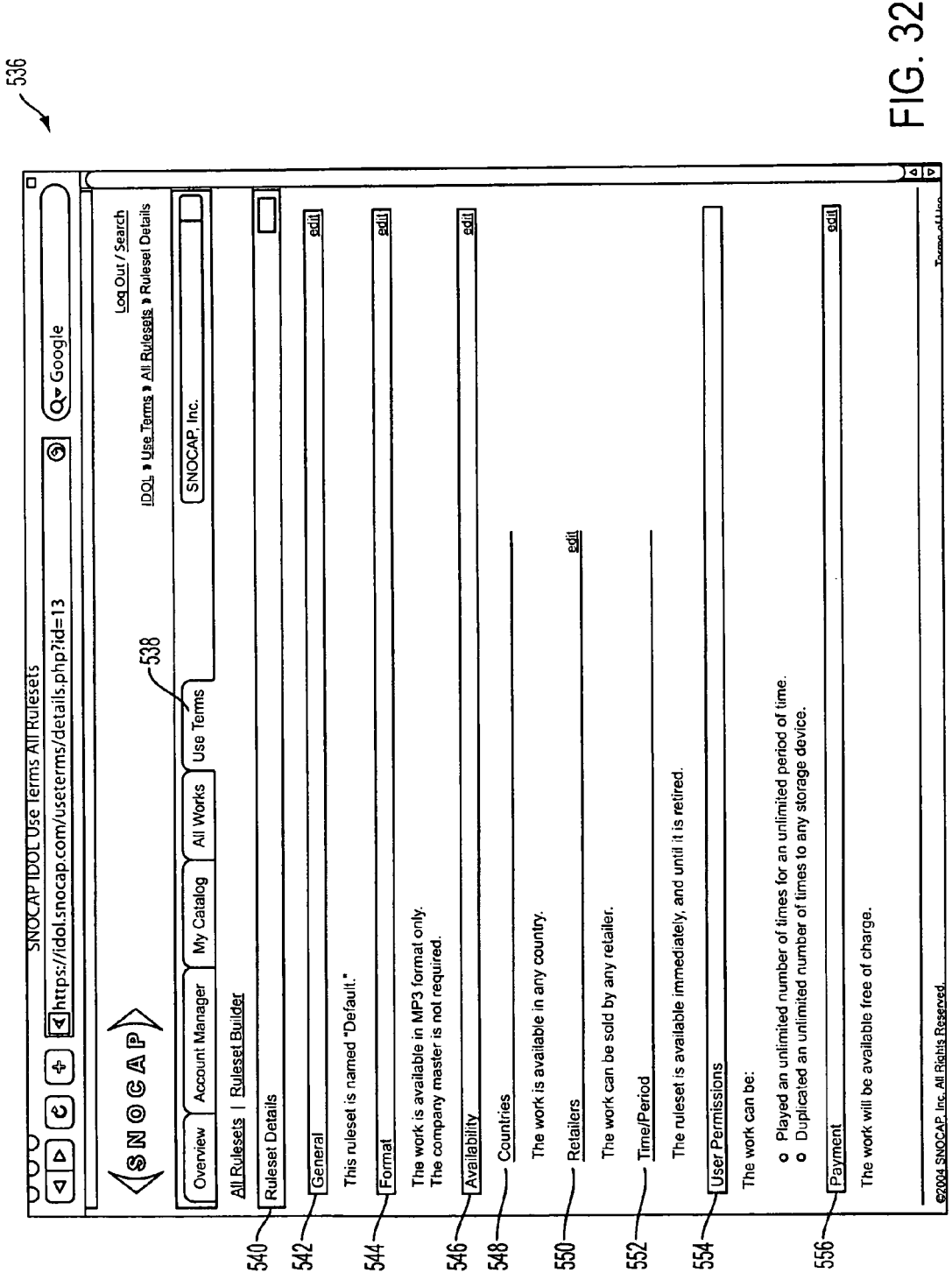
FIG. 32 is a screen shot provided by a rules interface of one embodiment of the system.

FIG. 32 is an example of a screen-shot 536 provided by the interface of the system. FIG. 32 shows a "Ruleset details" 540 within the Use Terms option 538. Ruleset details" 540 include General 542, Format 544, Availability 546. Under availability is countries 548, retailers 550, and a time period 552. User permission 554 and payment 556.

FIG. 33 is an example of a screen-shot 558 provided by the interface of the system. FIG. 33 shows an "Search" page 560 for a rights-holder. In this example, the search page 558 offers a rights holder the ability to search for an artist name 562 within a specific database 564 for a category 566. Press the search button 568. The Results 570 are displayed by track title 572, Artist 574, Popularity 576, Recording 578, Composition 580. Again circles 582 are shaded to indicate the rights status of each track. Other embodiments of the invention contemplate searching any field within the database, for example a retailer, a rule, a category etc.

Figure 34:
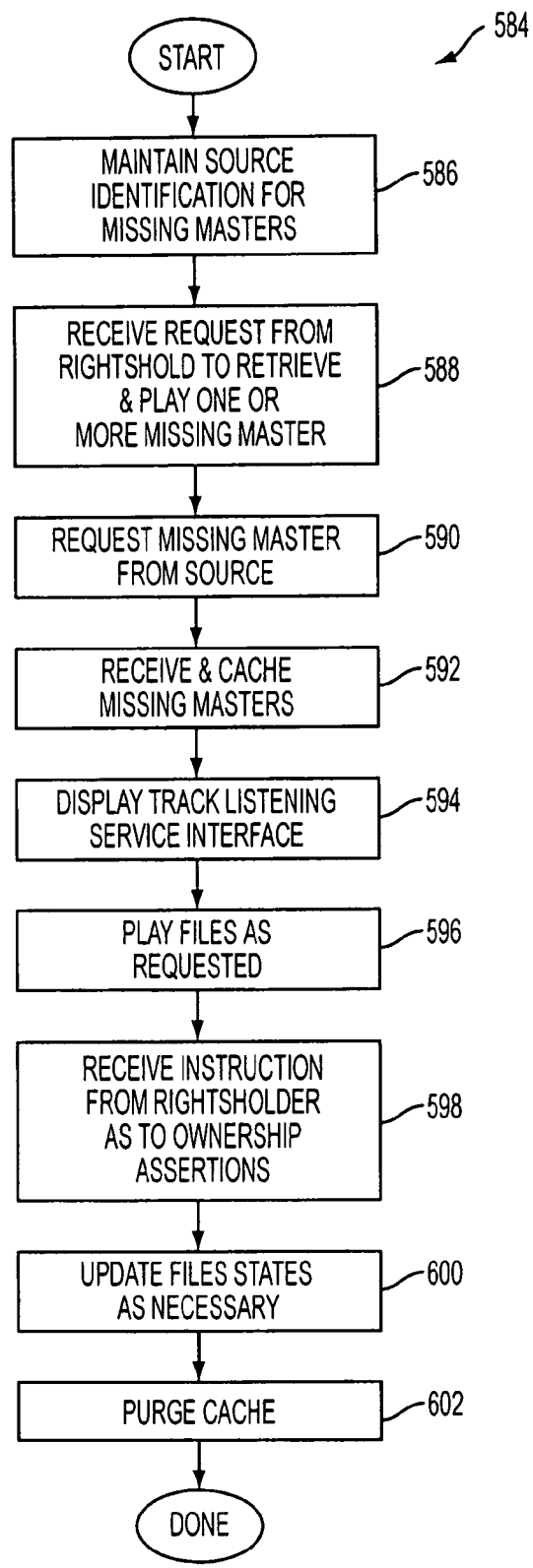
FIG. 34 illustrates an embodiment of a method of using a track listening service.

FIG. 34 illustrates another exemplary process that may be enacted by the system as described above. In module 586 the system maintains the source identification for the missing masters. In module 588 the system receives a request from a rights-holder to retrieve and play one or more of the missing master tracks. In module 590 the system requests the missing master from its source. In module 592 the system receives and caches the requested missing masters. In module 594 the system displays the track listening service interface. In module 596 the system plays files (tracks) as requested. In module 598 the system receives instructions from a rights-holder as to ownership assertion. In module 600 the system updates the file states and database as necessary. Finally in module 602 the system purges the cache.

Figure 35:
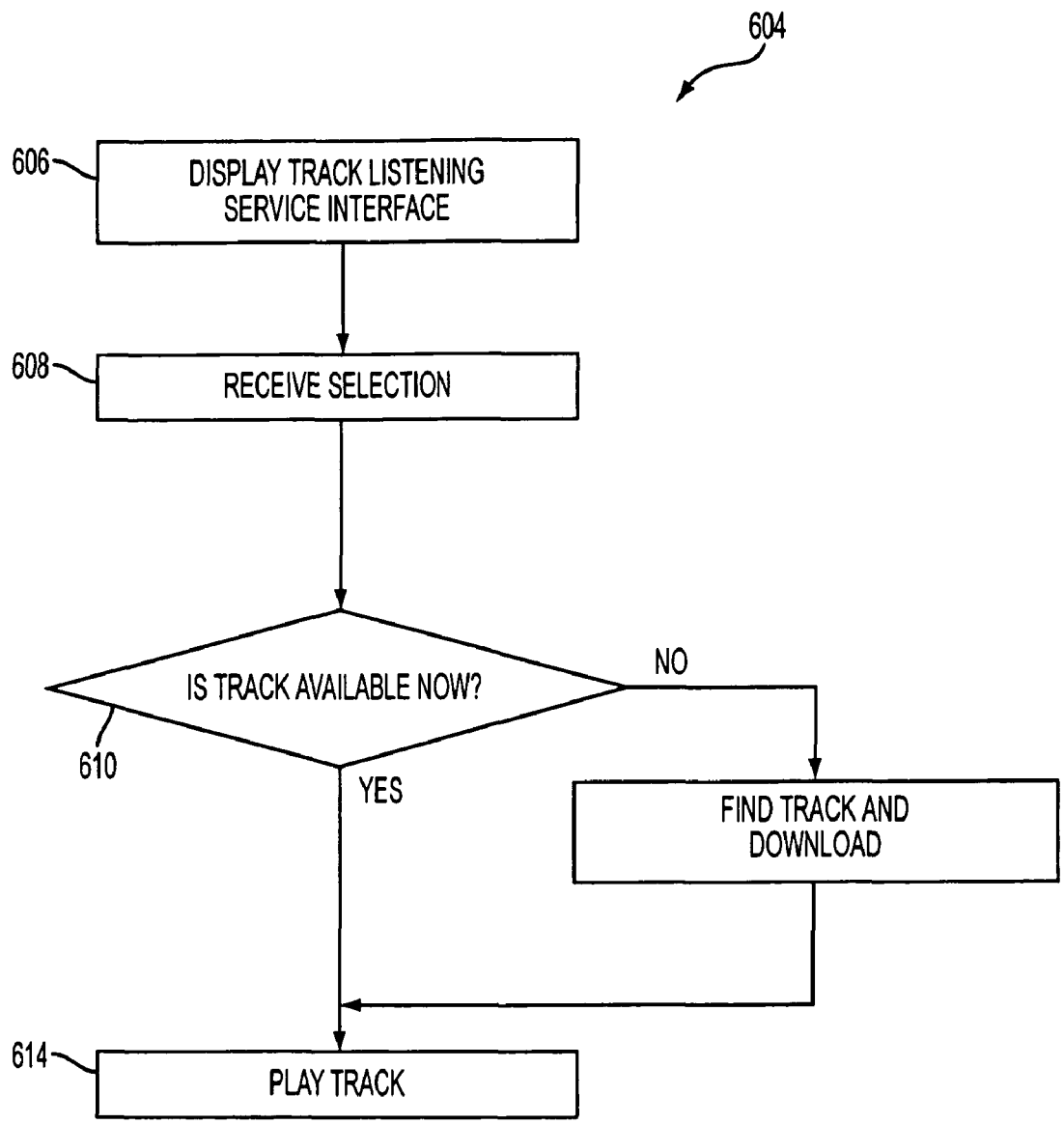
FIG. 35 illustrates an embodiment of a method of a track listening service.

FIG. 35 illustrates a method 604 of providing a track listening service to a rights-holder using the system. In module 606 the track listening service interface screen is displayed to a user. In module 608 the selection for a track is received. In module 610 it is determined if the track is immediately available. If not (NO) the process proceeds to module 612 where the track is found and then downloaded for playing. If the track is immediately available (YES) the track is played in module 614.

Figure 36:
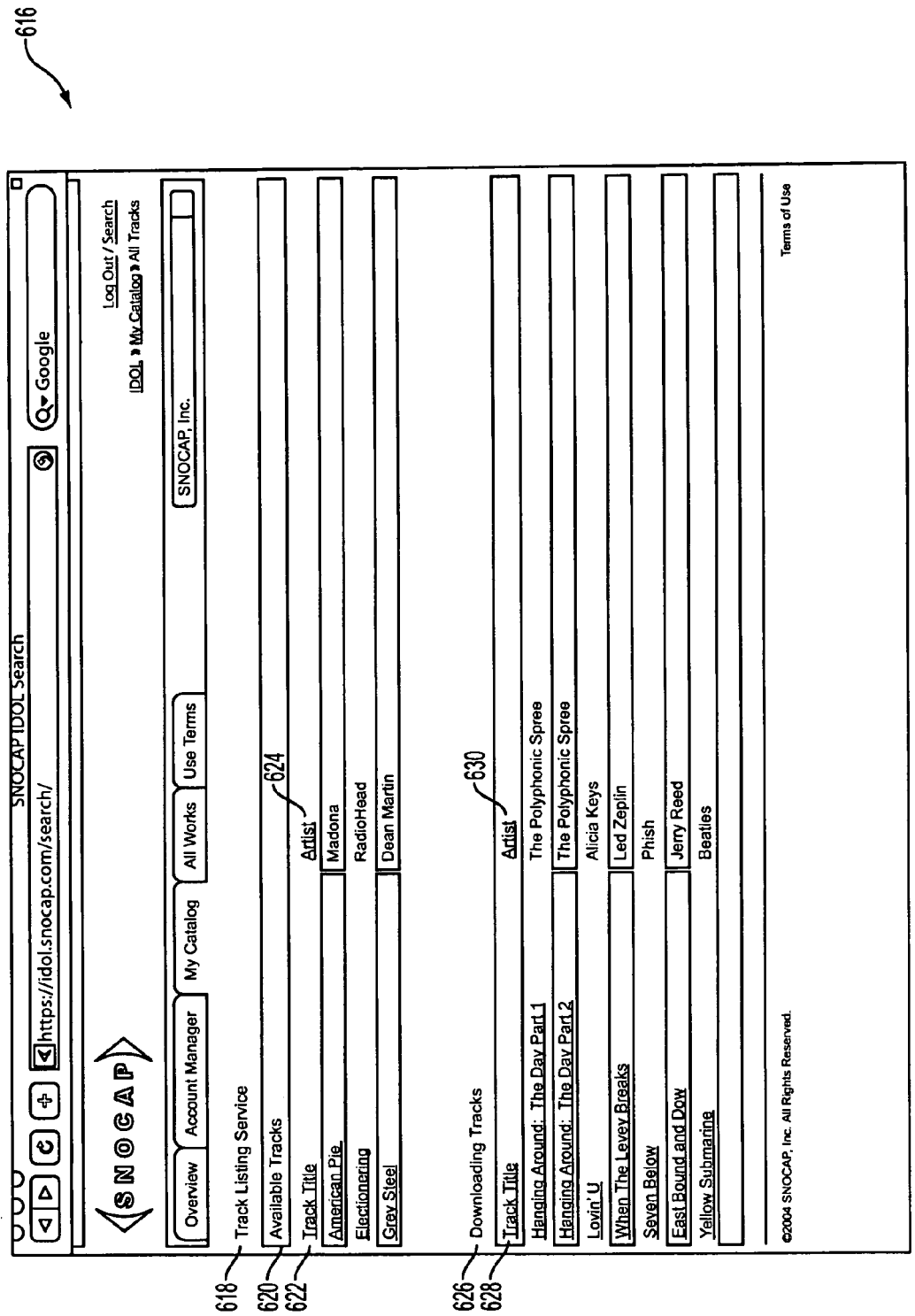
FIG. 36 is a screen shot provided by a track listening service interface of one embodiment of the system.

FIG. 36 is a screen-shot 616 of the exemplary track listening service provided in another embodiment of the invention. The track listening service 618, lists all available tracks 620, by title 622, artist 624. These immediately available tracks could be stored in the music warehouse 320 as shown in FIG. 15. The downloading tracks 626 are displayed in a second list, also by track title 628. and artist 630. Each track in both lists is displayed as a link, which when clicked on by a rights-holder, instigates the playing and listening service. The downloading tracks 626 are shown as currently being downloaded and stored locally from an external source. Once a downloading track 626 is locally stored, it is moved into the Available Tracks list 620.

FIG. 37 shows another example of data stored 632 in the copyright database 634. In this example, track information 636, retailer information 666 and system information 672 are stored. In this example various data structures may be used. The track or record 636, in one embodiment, is organized into a set of attributes 638, which may be stored as name-value pairs (or code-value pairs). Note that none of the attributes 638 are necessarily mandatory. Attributes illustrated include title 640 (title of a song for example), author 642 (author/composer of a song for example), performer 644 (performer of a song for example), fingerprint 646 (digital fingerprint of a song in digital format for example), length 648 (playing time of a song for example), authorized copy 650 (copy to be provided when content is requested for example), rights-holder 652 (first rights-holder associated with content for example), and rights-holder 654 (second rights-holder associated with content for example). Rules regarding the use or terms of sale of the track 656, the category of the track 658, a dispute flag 660, royalties collected 662, and statistics 664 and other pertinent information regarding the sale of the track.

Retailer information 666 consists of rules 668 or terms of sale for tracks and statistics regarding the retailers sales of tracks 670. System in formation 672 is also stored within the database 634.

Note that each of these attributes may also apply to a movie, comedic performance, document (maybe not the performer 644 in that case) or other form of content. Also, note that other attributes may be stored, such as restrictions for DRM purposes or prohibitions on copies for example. Similarly, other formats or relationships for the data in question may be utilized, such as formats dictated by metadata in a database for example. Thus, the data structure or record of FIG. 37 is illustrative rather than restrictive in nature.

Figure 38:
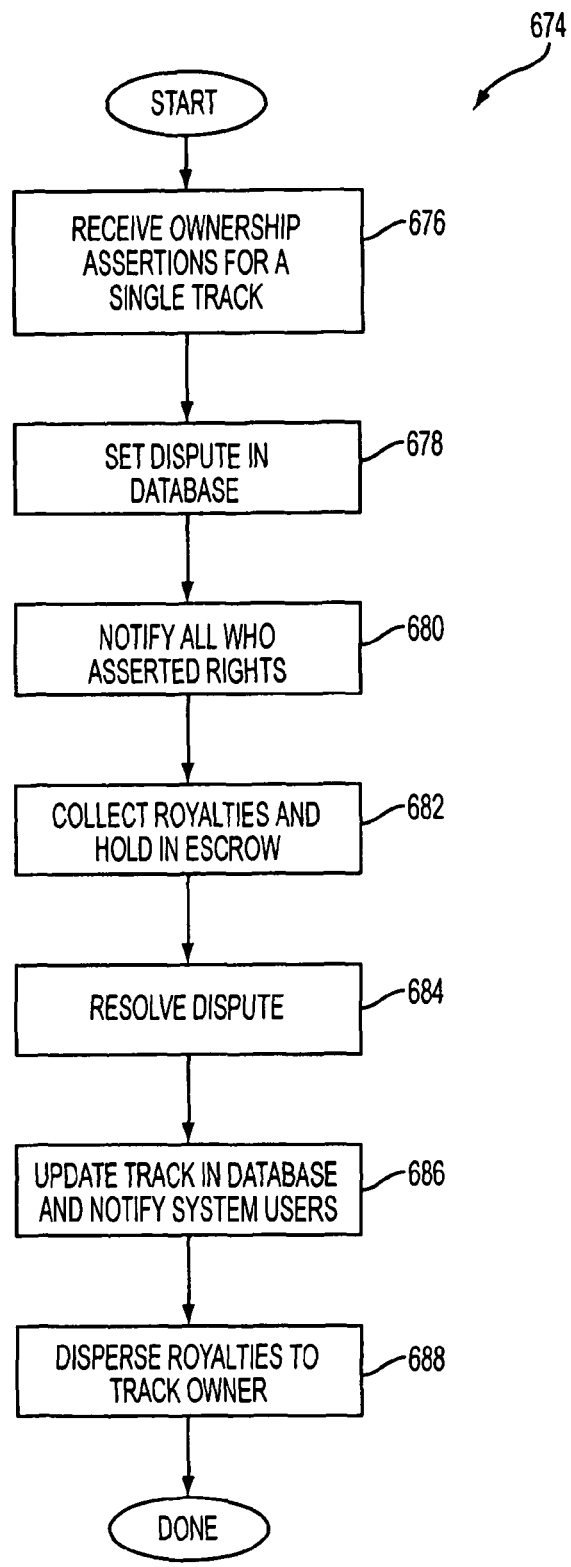
FIG. 38 illustrates a method of resolving disputes provided by one embodiment of the system of determining rights-holders of content.

FIG. 38 shows another exemplary process 674 enacted by the present system to provide dispute resolution services to rights-holders using the system. In module 676 the system receives multiple ownership assertions for a single track. This may occur from multiple rights-holders self registering the same track, or from crawling the p2p networks and discovering a track being sold that has multiple parties asserting rights. In module 678 the system stores in the database memory that the rights are disputed. In module 680 the system displays to all parties asserting rights, the information that the rights to a specific track are being disputed. In module 682 the system collects royalties from the disputed track and places the royalties in escrow. In module 684 the dispute is resolved and this information is entered into the system. In module 686 the system updates the open copyright database with the correct rights-holder information and notifies all users. In module 688 the system disburses royalties held in escrow and continues to bill and collect royalties as per the resolution of the rights now provided to the system.

Figure 39:
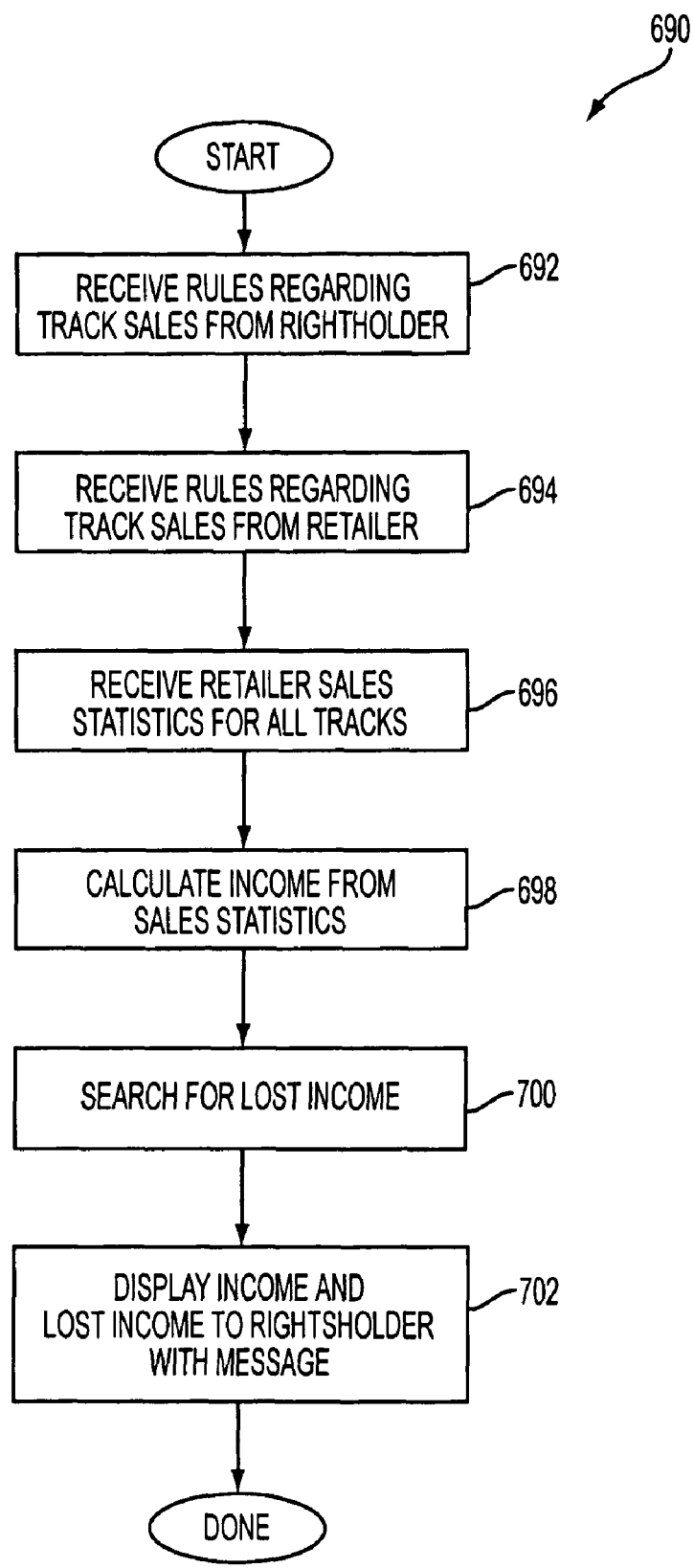
FIG. 39 illustrates a method of providing retail information using one embodiment of the system of determining rights-holders of content.

FIG. 39 shows another exemplary process 690 enacted by the present system to provide information related to retail information of a track. In module 692 the system receives rules regarding the sale of a track from an authorized rights-holder client. In module 694 the system receives rules and information regarding sales of tracks from a retailer. In module 696 the system receives all individual track sales statistics from all retailers connected to the system. In module 698 the system calculates income from the sales of a track. In module 700 the system compares retailer and rights-holder rules for the sale of a track that are not in agreement, that result in unrealized or lost income, and finally the system calculates lost income based on the sales statistics provided by the retailers to the system. In module 702 the system displays to the rights-holder earned income and the calculated lost income for a track and a message relating to the rule discrepancies related to the sale of the track. For example the rule discrepancy may be that if the track is not available in Japan. Based on retailers market share and the popularity of the track, an estimated 137,000.00 dollars may be generated if the track was available and sold in Japan.

Figure 40:
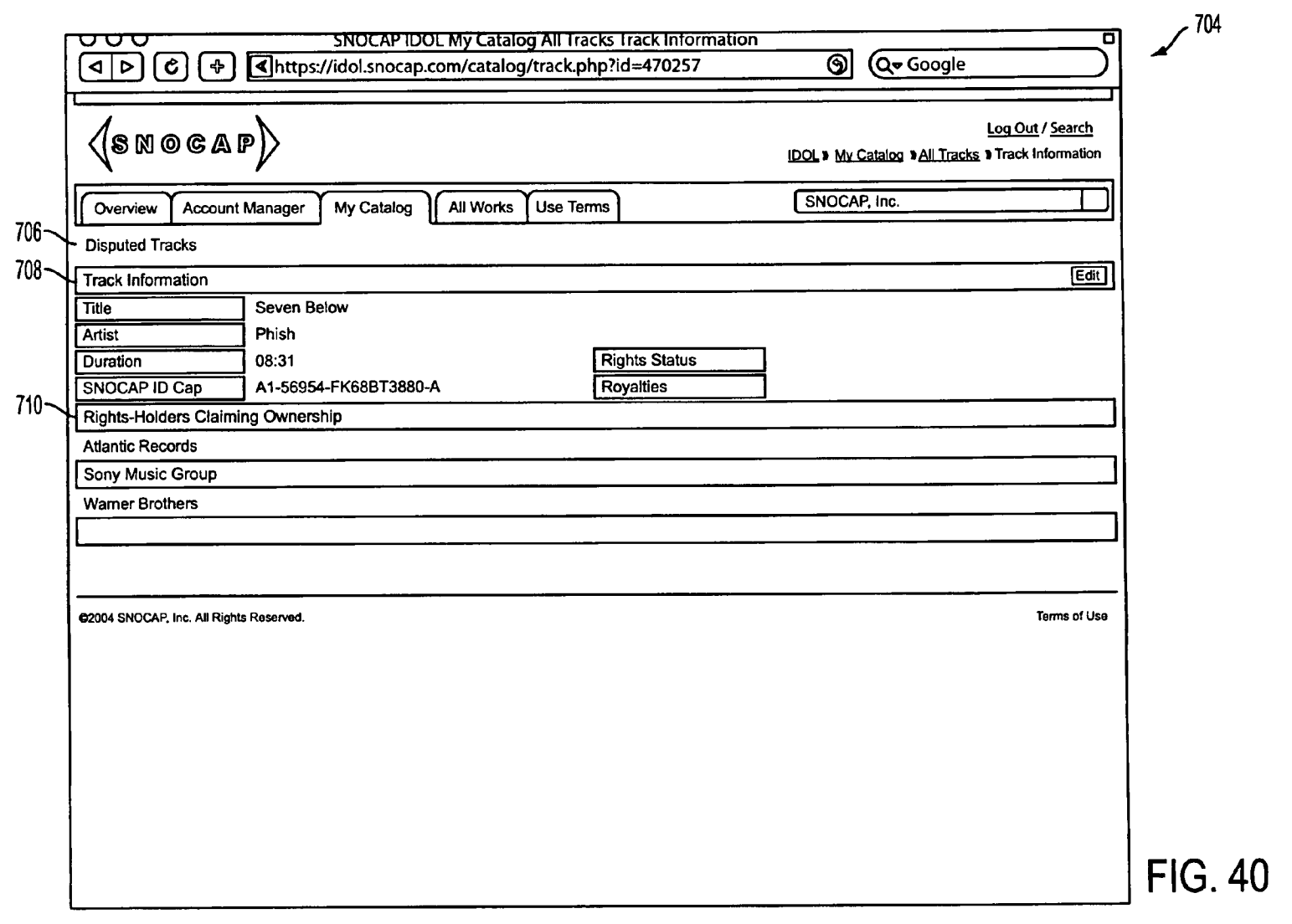

FIG. 40 is another example of a screen-shot 704 provided by the interfaces of the system. In this example, the page 704 displays an "Disputed Tracks" feature 706. For each disputed track this interface screen 704 provides track information 708 including the track title and the artist of the media track, the duration of the song and the ID number of the track. Information 710 displays all the rights-holders who have asserted rights to or claimed ownership of the displayed track. In this example Atlantic Records, Sony Music Group, and Warner Brothers have all entered data into the system indicating potential ownership of the track. The media track is shown as a URL that may be clicked on by the user or rights-holder to obtain further details regarding the specific track.

Figure 41:
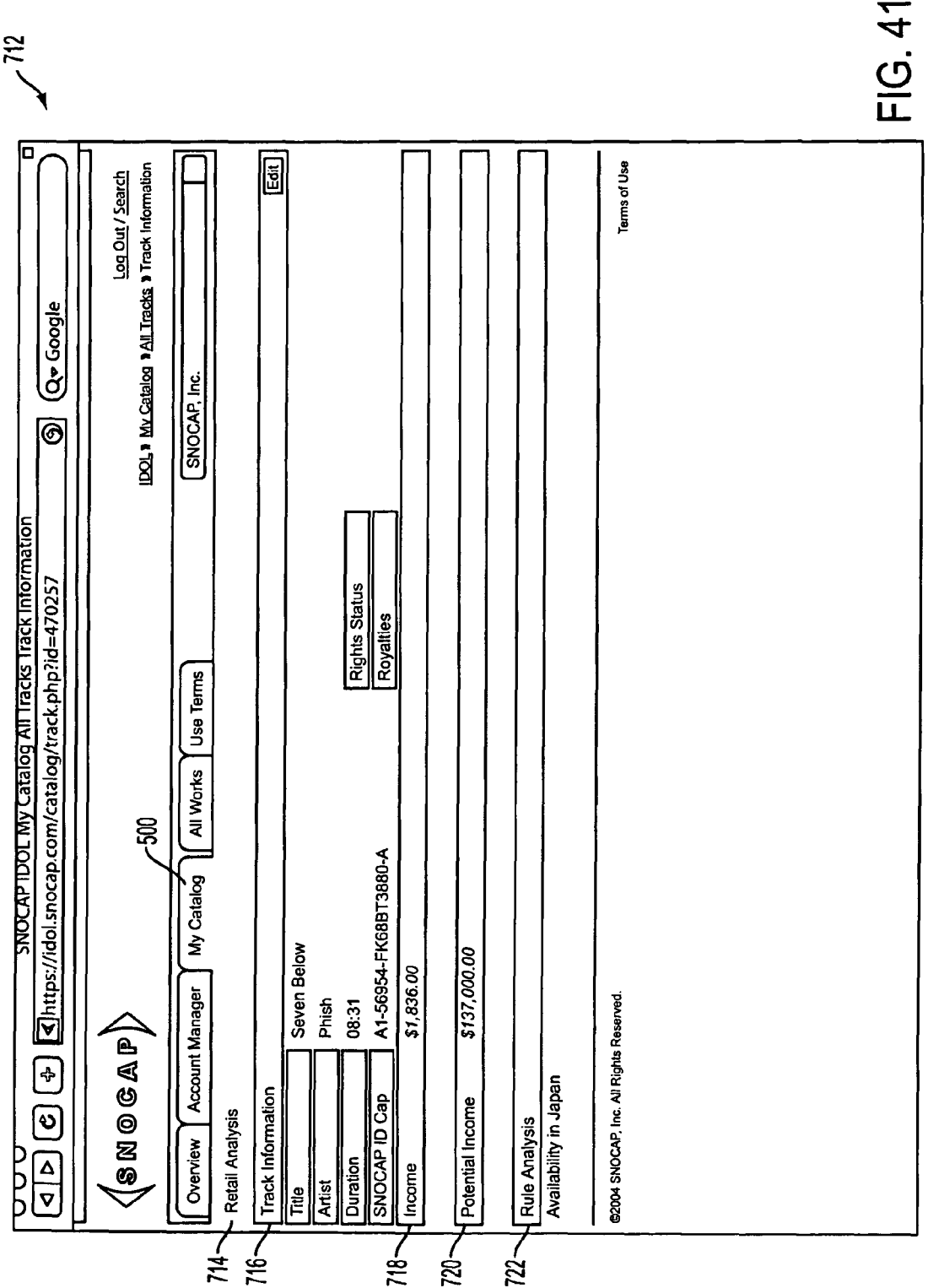
FIG. 41 is a screenshot provided by a retail analysis interface of one embodiment of the system.

FIG. 41 is an example of a screen-shot 712 that provides retail information and a financial analysis regarding a track. Displayed in FIG. 41 under the Retail Analysis 714 is the track title and the artist of the media track, the duration of the song and the ID number of the track. Information 718 displays the income earned from royalties, in this example $1836.00. A potential income 720 is calculated from the retailer statistics stored in the database such as track popularity and retailer market share etc, and in this example, a potential income is estimated at $137,000.00 if the track were available for sale in Japan. A rule analysis message 722 is displayed to the rights-holder regarding the rules that currently prohibit the generation of additional income. In this example the message is "Availability in Japan".

Figure 42:
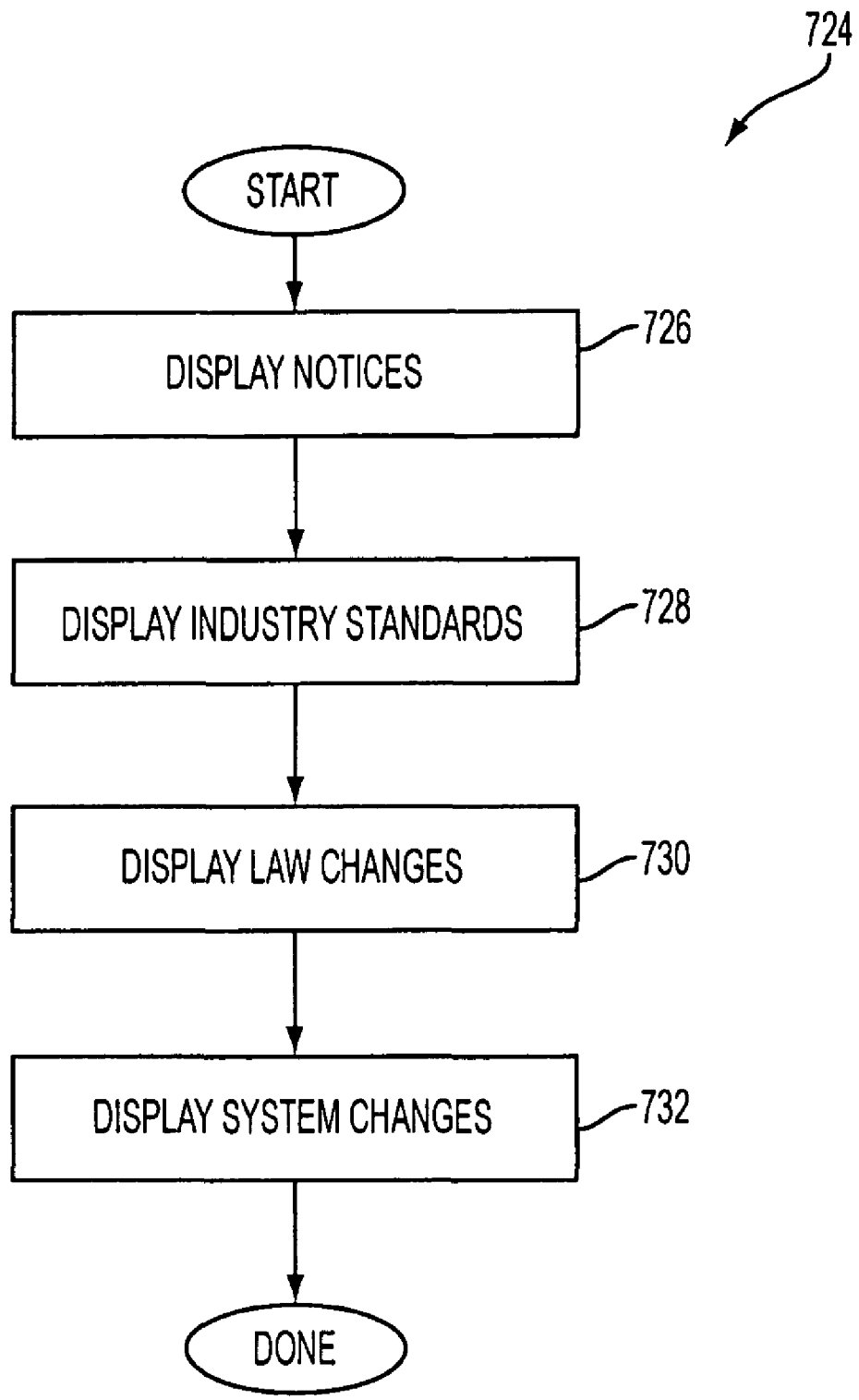
FIG. 42 illustrates a method of providing notices using an interface of one embodiment of the system.

FIG. 42 shows another exemplary process 724 enacted by the present system to provide a bill for services to the rights-holders using the system. In module 726 the system displays all notices to the users. In module 728 the system displays industry standards to the rights-holders. In module 730 the system displays any law changes that may affect the rights-holders. In module 732 the system displays any changes to the system itself. For example, if the system changes royalty collections and payments from a bi-weekly basis to a monthly basis, this system change would be displayed in module 732.

Figure 43:
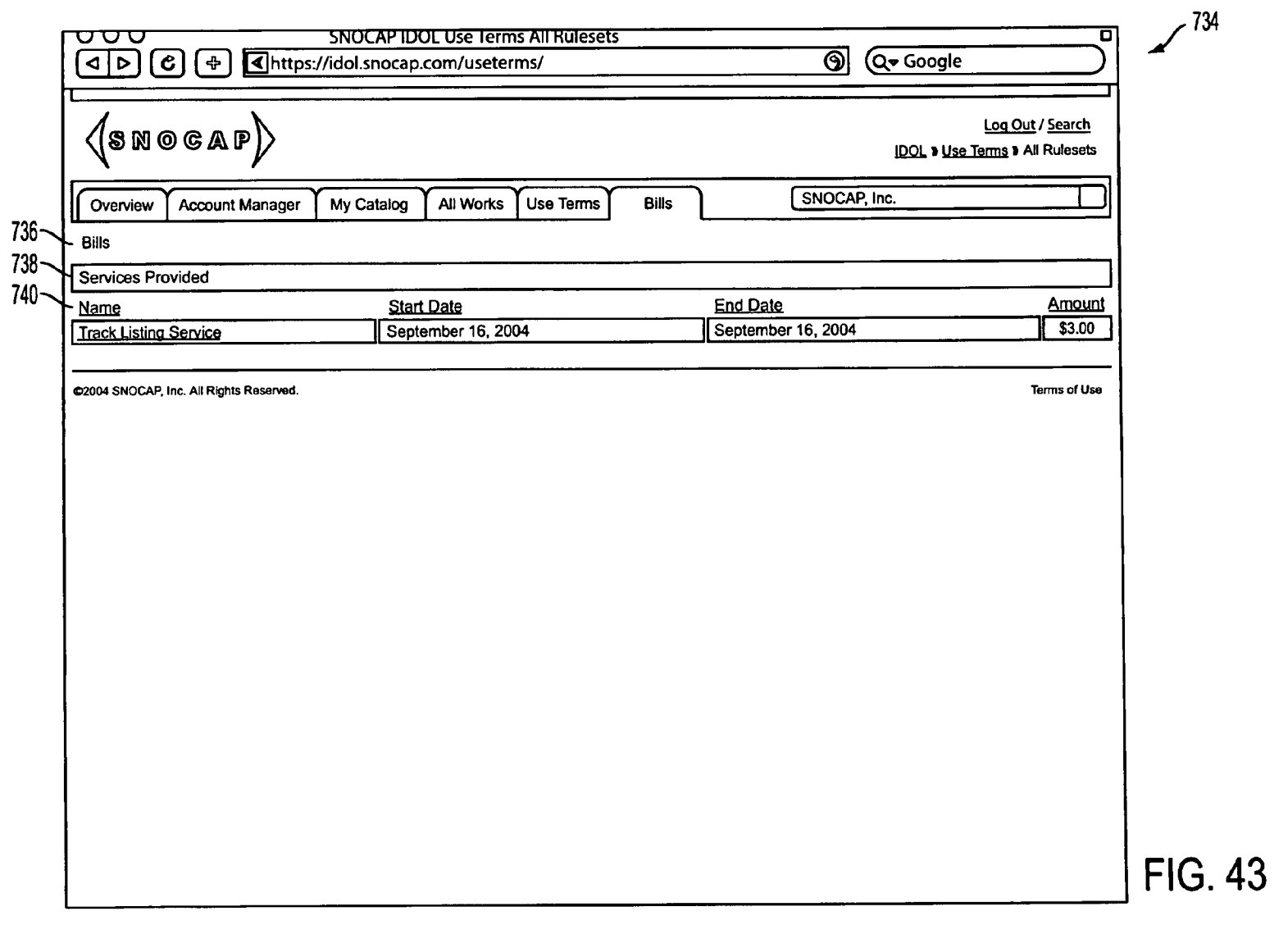

FIG. 43 is an example of a screen-shot 734 provided by the interfaces of the system. FIG. 43 shows billing information 736 for a rights-holder. In this example, the page 734 displays bills for services provided 738. In this example the name of the service provided 740 is the Track Listening Service, and the bill for the service is $3.00, that occurred on Sep. 16, 2004.

Figure 44:
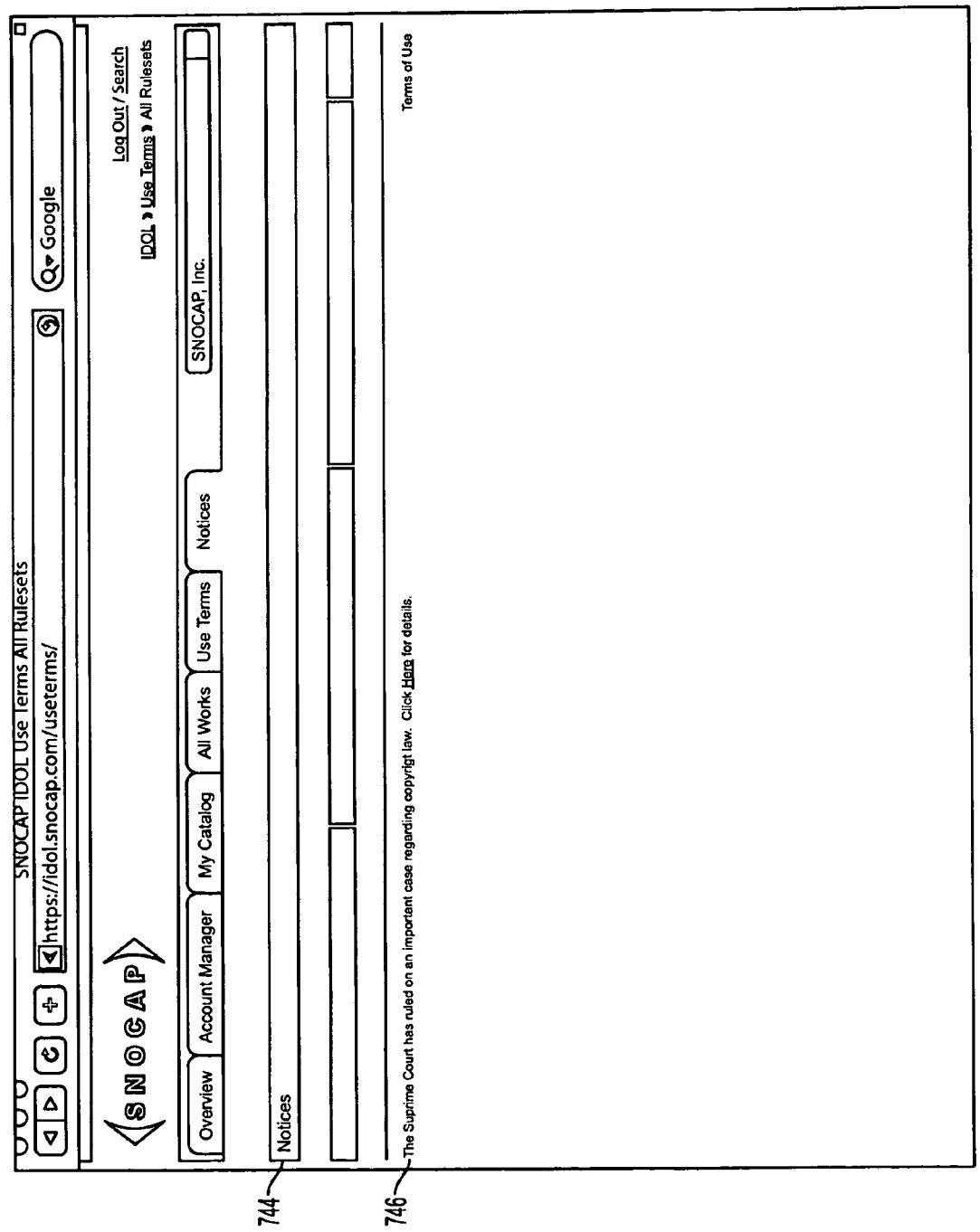
FIG. 44 is a screenshot of a notices interface provided by the present system.
Figure 45:
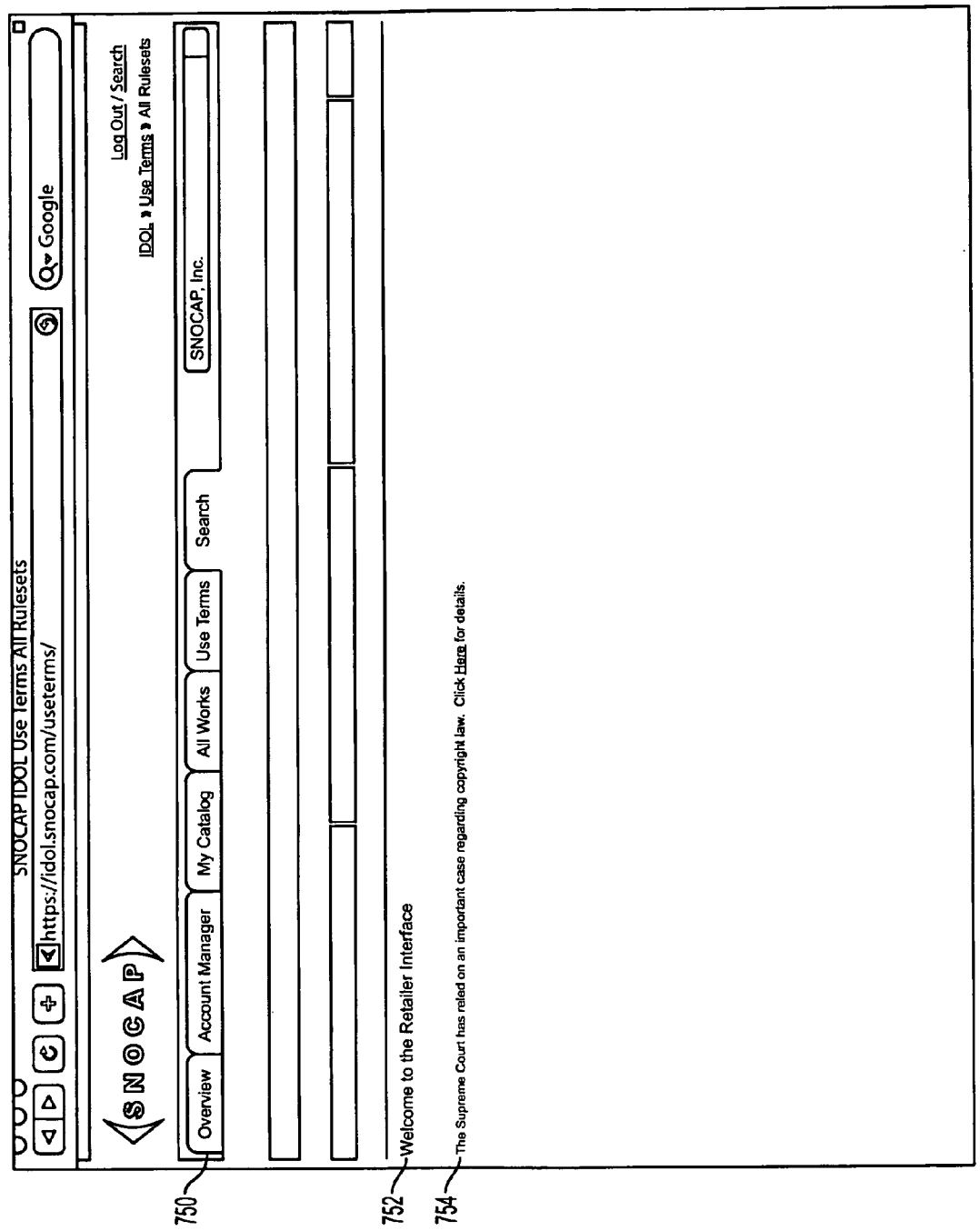
FIG. 45 is a screen shot provided by a searching interface of one embodiment of the system.

FIG. 44 is an example of a screen-shot 742 that provides notices information to rights-holders using the system. Displayed under the Notice information 744 is the system notice 746, "The Supreme Court has ruled on an important case regarding copyright law. Click Here for details". This notice therefore provides pertinent information to rights-holders regarding their portfolio of media tracks FIG. 45 is an example of a screen-shot 748 that provides a retailer interface for the system. The page 748 is an overview 750 of all the functions provided to the retailers. The functions provided to the retailers include most of the functions that are provided to the rights-holders of the system. In this example, displayed under the notice information 752 is the system notice welcome to the retailer interface. Also shown is message 754, "The Supreme Court has ruled on an important case regarding copyright law. Click Here for details". This notice therefore provides pertinent information to retailers regarding the business operations.

Figure 46:
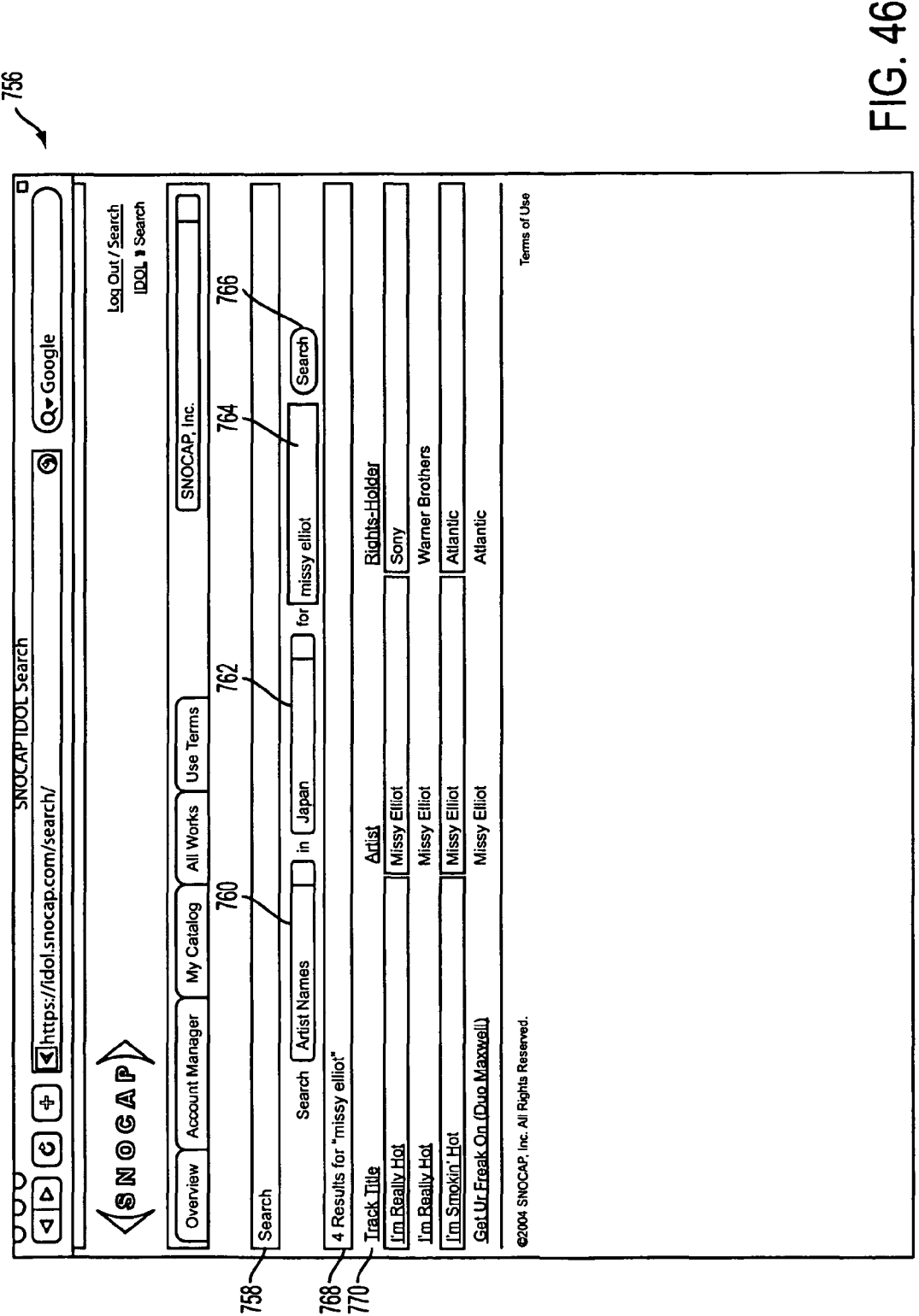
FIG. 46 is a screen shot provided by a search results interface of one embodiment of the system.

FIG. 46 is an example of a screen-shot 756 that provides a retailer interface database searching mechanism for the system. The page 756 shows the searching 758 features provided for retailers. A retailer may search the database for any stored attribute (as shown in FIG. 37) for example artist name 760, such as Missy Elliiot 764, and track availability or rules 762. The search is instigated by clicking on search button 766. The results 768 for searching Missy Elliot's available tracks in Japan are listed in 770. The information in 770 includes track title, artist name and the listed rights-holder. This provides a retailer with information regarding their query that may result in more income generated from media track sales.

Figure 47:
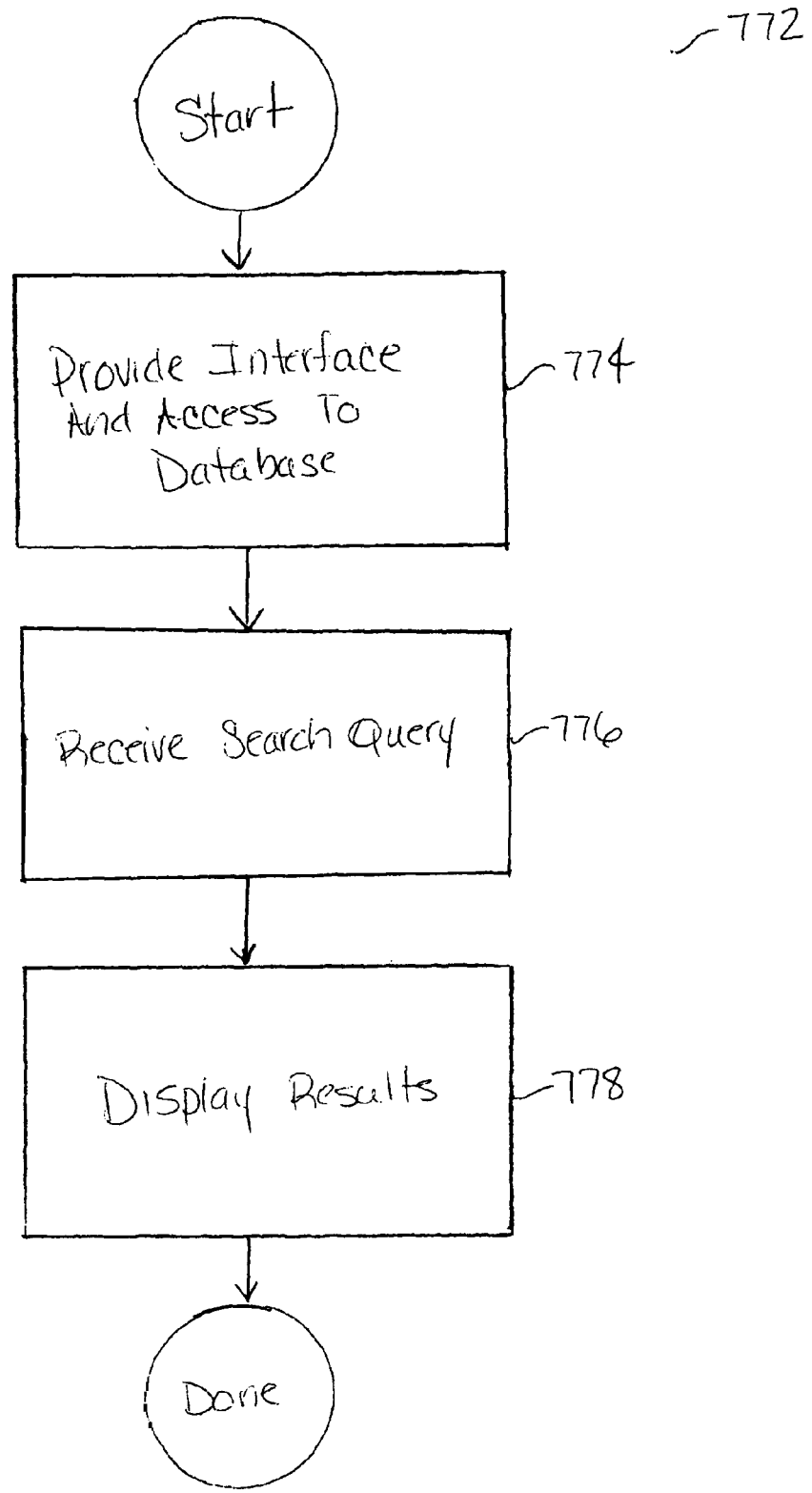
FIG. 47 illustrates a method of searching a database of content.

FIG. 47 shows another exemplary process 772 enacted by the present system to provide retailers access to the open copyright database of the system. In module 774 the system provides a searching interface as shown in FIG. 46 that allows the retailer to search any attribute within the database. In module 776 the system receives a search query. In module 778 the system displays the search results to the retailer, as shown in FIG. 46 for example. This method allows retailers to search for potential new sources of income using the present system.

Figure 48:
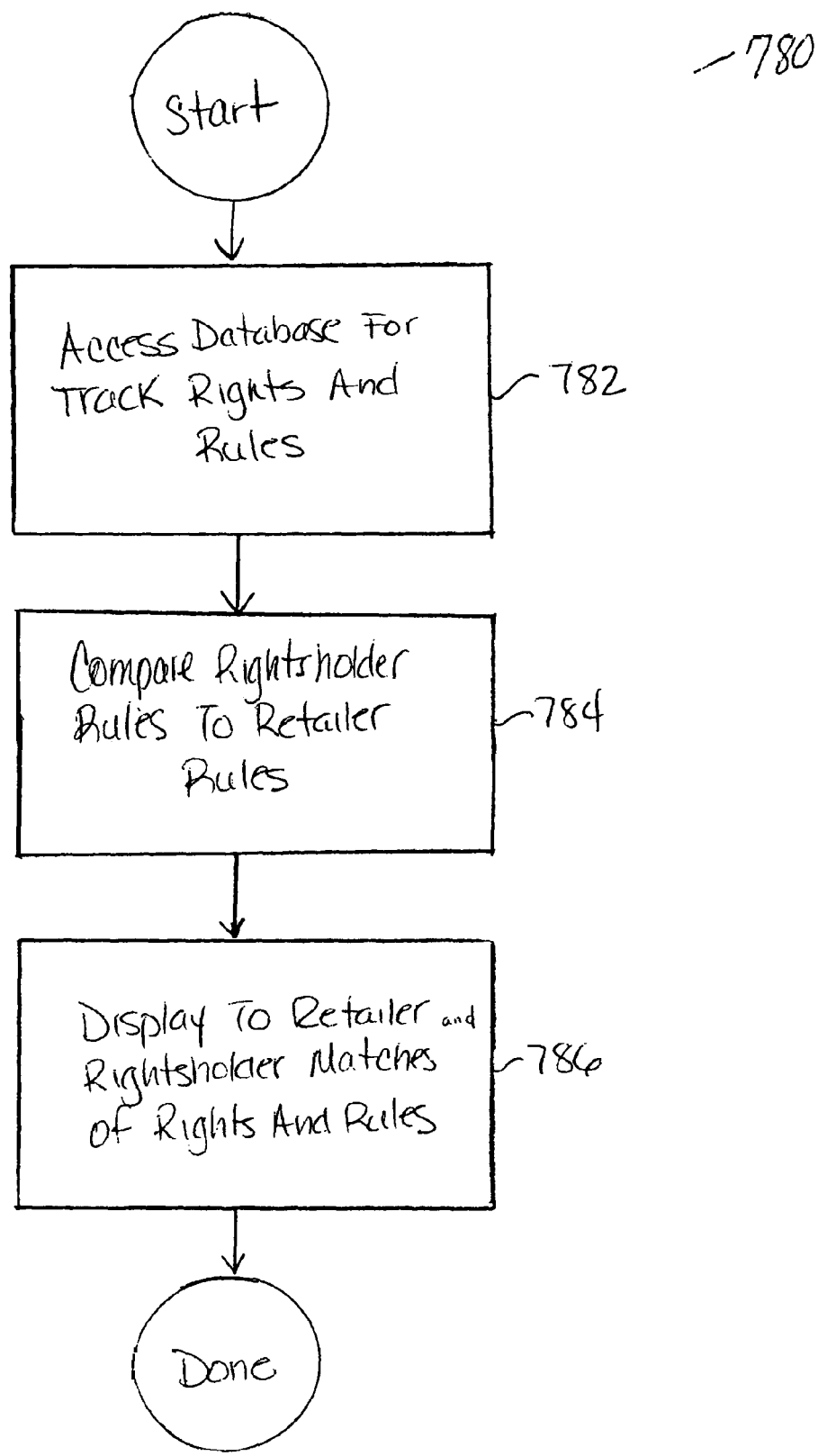
FIG. 48 illustrates a method of comparing rights-holder and retailer rules within a database of content.

FIG. 48 shows another exemplary process 780 automatically enacted by the present system to match potential agreements between rights-holders and retailers. In module 782 the system accesses the database for each track's rights and rules of sale. In module 784 the system compares the rules of the retailer and rights-holder. In module 786 the system automatically displays to the retailers and the rights-holders that a match of rights and rules exists. For example, a rights-holder is notified that Kmart's rules of sales match their desired terms, while Kmart is notified that a specific rights-holder does exists that would appear to be in agreement with Kmart's terms of sale for a specific track. This method therefore automatically provides new sources of income for both retailer and rights-holder.

From the foregoing, it will be appreciated that specific embodiments of the invention have been described herein for purposes of illustration, but that various modifications may be made without deviating from the spirit and scope of the invention. For example, the disclosed methods and apparatuses have been described primarily in terms of use with songs, while content of many different forms may be managed in the same manner. In some instances, reference has been made to characteristics likely to be present in various or some embodiments, but these characteristics are also not necessarily limiting on the spirit and scope of the invention. For example, the above discussion refers to peer to peer networks, and those skilled in the art will readily recognize that the present invention is equally applicable to any file sharing network. In the illustrations and description, structures have been provided which may be formed or assembled in other ways within the spirit and scope of the invention.

In particular, the separate modules of the various block diagrams represent functional modules of methods or apparatuses and are not necessarily indicative of physical or logical separations or of an order of operation inherent in the spirit and scope of the present invention. Similarly, methods have been illustrated and described as linear processes, but such methods may have operations reordered or implemented in parallel within the spirit and scope of the invention. Also additional methods of the present system may be comprised of multiple modules selected and enacted from the plurality of methods described above. Accordingly, the invention is not limited except as by the appended claims.

What is claimed is:

1. A method for managing digital content, comprising:

causing display of at least one interface on an apparatus, the at least one interface being configured to enable a rights-holder to cause verification of an identity of the rights-holder, wherein the verification of the identity of the rights-holder includes providing at least one login interface;

receiving, utilizing the at least one interface, a batch of data relating to a plurality of files, the batch of data relating to the plurality of files having been gathered through use of a discovery process, the discovery process being adapted to traverse at least one link on a network and to thereby discover the batch of data relating to the plurality of files;

causing display, utilizing the at least one interface, of at least a portion of the batch of data relating to the plurality of files;

receiving, utilizing the at least one interface, a selection of at least one of the plurality of the files;

receiving, utilizing the at least one interface, at least one indication of at least one descriptor;

associating the at least one descriptor with the selected at least one file for search purposes;

receiving at least one indication of at least one rule involving a pricing and at least one use restriction;

associating the at least one rule with the selected at least one file for controlling the pricing and use of the at least one file;

accessing at least one database, the at least one database including file information relating to the plurality of files, the file information including the data relating to the plurality of files, the at least one descriptor, the at least one rule, and the association;

receiving at least one search criteria;

searching the at least one database utilizing the search criteria;

causing display of results of the search on the apparatus;

accessing the file information for a selected file, based on a selection in response to the causing display of the results of the search;

updating at least a portion of the file information;

storing the updated file information;

tracking licensing associated with at least one file of the plurality of files;

receiving accounting information, the accounting information related to monetary payment associated with the licensing; and reporting, utilizing the at least one interface, to the rights-holder, accounting reporting information, the accounting reporting information related to the monetary payment to the rights-holder in association with the licensing;

wherein the rights-holder is allowed to modify the at least one rule involving the pricing and the at least one use restriction.

2. The method of claim 1, wherein the data includes the files themselves.

3. The method of claim 1, wherein the data includes metadata associated with the files.

4. The method of claim 1, wherein the data includes at least one fingerprint associated with the files.

5. The method of claim 1, wherein the at least one interface includes a self-registration interface.

6. The method of claim 1, and further comprising causing display of at least one additional interface configured to report to the rights-holder.

7. The method of claim 6, wherein the at least one additional interface displays financial data based on individual track sales statistics.

8. The method of claim 6, wherein the at least one additional interface displays financial data based on unrealized or lost income.

9. The method of claim 6, wherein the at least one additional interface displays financial data based on receipt of individual file sales statistics, calculation of income from sales of the individual file, and a comparison of retailer and rights-holder rules for the sale of the individual file that are not in agreement.

10. The method of claim 1, wherein the descriptor includes a category.

11. The method of claim 10, wherein the category includes a rights-holder-defined category.

12. The method of claim 10, wherein the category indicates a style of music.

13. The method of claim 1, wherein the network includes the Internet.

14. The method of claim 1, wherein the files include music files.

15. A computer program product embodied on a non-transitory computer-readable medium for managing digital content, the computer program product comprising computer code that, when executed:
causes display of at least one interface, the at least one interface being configured to verify an identity of a rights-holder, wherein the verification of the identity of the rights-holder includes providing at least one login interface;
allows receipt of a set of data relating to a plurality of files, the set of data relating to the plurality of files being received through use of a discovery process, the discovery process being adapted to traverse at least one location on a network and to thereby discover the set of data relating to the plurality of files;
causes display of at least a portion of the set of data relating to the plurality of files;
allows receipt of at least one indication of at least one descriptor;
causes an association of the at least one descriptor with at least one of the plurality of files, for search purposes;
allows receipt of at least one indication of at least one rule involving a pricing and at least one use restriction;
causes an association of the at least one rule with at least one of the plurality of files for controlling the pricing and use thereof;
allows access to at least one database, the at least one database including file information relating to the plurality of files, the file information including the data relating to the plurality of files, the at least one descriptor, the at least one rule, and the association;
allows receipt of at least one search criteria;
allows access to the at least one database utilizing the search criteria;
causes display of search results;
causes display of at least a portion of the file information for a particular one or more of the plurality of files, based on a selection in response to the display of the search results;
causes an update to at least a portion of the file information;
causes storage of the updated file information;
causes tracking of licensing associated with at least one file of the plurality of files;
allows receipt of accounting information, the accounting information related to monetary payment associated with the licensing; and
causes reporting, to the rights-holder, of accounting reporting information, the accounting reporting information related to the monetary payment associated with the licensing;
wherein the computer program product is operable such that the rights-holder is allowed to modify the at least one rule involving the pricing and the at least one use restriction.

16. The computer program product of claim 15, wherein the data includes the files themselves.

17. The computer program product of claim 15, wherein the data includes metadata associated with the files.

18. The computer program product of claim 15, wherein the data includes at least one fingerprint associated with the files.

19. The computer program product of claim 15, wherein the at least one interface includes a self-registration interface.

20. The computer program product of claim 15, and further comprising computer code that causes a device to display at least one additional interface configured to report to the rights-holder.

21. The computer program product of claim 20, wherein the at least one additional interface displays financial data based on individual track sales statistics.

22. The computer program product of claim 20, wherein the at least one additional interface displays financial data based on unrealized or lost income.

23. The computer program product of claim 20, wherein the at least one additional interface displays financial data based on receipt of individual file sales statistics, calculation of income from sales of the individual file, and a comparison of retailer and rights-holder rules for the sale of the individual file that are not in agreement.

24. The computer program product of claim 15, wherein the descriptor includes a category.

25. The computer program product of claim 24, wherein the category includes a rights-holder-defined category.

26. The computer program product of claim 24, wherein the category indicates a style of music.

27. The computer program product of claim 15, wherein the network includes the Internet.

28. The computer program product of claim 15, wherein the files include music files.

29. The computer program product of claim 15, wherein the computer code is adapted for being resident on different components.

30. The computer program product of claim 15, wherein the criteria is a term.

31. A system for managing digital content, the system comprising:

a monitor able to display at least one interface, the at least one interface being configured to verify an identity of a rights-holder, wherein the verification of the identity of the rights-holder includes providing at least one login interface;

a processor able to allow receipt of a set of data relating to a plurality of files, the set of data relating to the plurality of files being gathered through use of a discovery process, the discovery process being adapted to traverse at least one link on a network and to thereby discover the set of data relating to the plurality of files;

the system able to display of at least a portion of the set of data relating to the plurality of files;

the system able to allow receipt of a selection of at least one of the plurality of the files;

the system able to allow receipt of at least one indication of at least one descriptor;

the system able to cause an association of the at least one descriptor with the selected at least one file, for search purposes;

the system able to allow receipt of at least one indication of at least one rule involving a pricing and at least one use restriction;

the system able to cause an association of the at least one rule with the selected at least one file for controlling the pricing and use of the at least one file;

the system able to allow access to at least one database, the at least one database including file information relating to the plurality of files, the file information including the data relating to the plurality of files, the at least one descriptor, the at least one rule, and the association;

the system able to allow receipt of at least one search criteria;

the system able to allow access to the at least one database utilizing the search criteria;

the system able to display of search results;

the system able to display of at least a portion of the file information for a particular one or more of the plurality of files, based on a selection in response to the display of the search results;

the system able to cause an update to at least a portion of the file information;

the system able to cause storage of the updated file information;

the system able to track licensing associated with at least one file of the plurality of files;

the system able to allow receipt of accounting information, the accounting information related to monetary payment associated with the licensing; and the system able to report, to the rights-holder, of accounting reporting information, the accounting reporting information related to the monetary payment to the rights-holder in association with the licensing;

wherein the system is operable such that the rights-holder is allowed to modify the at least one rule involving the pricing and the at least one use restriction.

32. The computer program product of claim 15, wherein the at least one rule includes a pricing rule.

33. The computer program product of claim 15, wherein the at least one rule includes a use restriction rule.

34. The computer program product of claim 15, wherein the at least one rule includes a pricing rule and a use restriction rule.

35. The method of claim 1, wherein the apparatus includes a server including computer code for the causing display.

* * * * *